US012406613B2

(12) United States Patent
Lee et al.

(10) Patent No.: US 12,406,613 B2
(45) Date of Patent: Sep. 2, 2025

(54) ELECTRONIC DEVICE INCLUDING DISPLAY AND CAMERA AND METHOD CONTROLLING THEREOF

(71) Applicant: Samsung Electronics Co., Ltd., Gyeonggi-do (KR)

(72) Inventors: Seungeun Lee, Gyeonggi-do (KR); Chakyum Kim, Gyeonggi-do (KR); Minseok Kang, Gyeonggi-do (KR); Byeungwoong Han, Gyeonggi-do (KR); Changryong Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 17/977,059

(22) Filed: Oct. 31, 2022

(65) Prior Publication Data

US 2023/0054033 A1   Feb. 23, 2023

Related U.S. Application Data

(63) Continuation of application No. PCT/KR2022/011918, filed on Aug. 10, 2022.

(30) Foreign Application Priority Data

Aug. 10, 2021 (KR) .................. 10-2021-0105186
Jan. 14, 2022 (KR) .................. 10-2022-0005759

(51) Int. Cl.
*G06F 3/04886* (2022.01)
*G06F 1/18* (2006.01)
(Continued)

(52) U.S. Cl.
CPC .......... *G09G 3/2096* (2013.01); *G06F 1/181* (2013.01); *G06F 3/04817* (2013.01);
(Continued)

(58) Field of Classification Search
CPC ................ G09G 3/2096; G09G 3/035; G09G 2340/0464; G09G 2340/14;
(Continued)

(56) References Cited

U.S. PATENT DOCUMENTS

| 8,723,824 B2 | 5/2014 | Myers et al. |
| 10,019,940 B2 | 7/2018 | Rappoport et al. |
| 10,416,843 B2 | 9/2019 | Hong et al. |
| 10,482,309 B2 | 11/2019 | Zhang et al. |

(Continued)

FOREIGN PATENT DOCUMENTS

| CN | 112311998 A | 2/2021 |
| EP | 3859724 A1 | 8/2021 |

(Continued)

OTHER PUBLICATIONS

WO 2019/154072 (Eng Translation) publihsed on Aug. 15, 2019.*
International Search Report dated Nov. 22, 2022.
Extended European Search Report dated Sep. 5, 2024.

*Primary Examiner* — Rinna Yi
(74) *Attorney, Agent, or Firm* — Cha & Reiter, LLC.

(57) ABSTRACT

An electronic device and method are disclosed. The electronic device includes a first camera; a first display panel including multiple pixels and disposed to overlap the first camera, in at least a partial region thereof; and a processor. The processor implements the method, including: displaying, on a first display panel, a graphic user interface; activating, via at least one processor, a first camera, wherein the first display panel includes multiple pixels, and is disposed to overlap the first camera in at least a partial region thereof; deactivating, via the at least one processor, at least one pixel disposed within a first region of the first display panel, wherein the first region is included in the partial region; and changing the graphic user interface to be displayed at least in part to a second region of the first display panel, wherein the second region is in contact with the first region.

20 Claims, 23 Drawing Sheets

(51) Int. Cl.
  *G06F 3/04817* (2022.01)
  *G06F 3/04845* (2022.01)
  *G09G 3/00* (2006.01)
  *G09G 3/20* (2006.01)
  *H04N 23/90* (2023.01)

(52) U.S. Cl.
  CPC ...... *G06F 3/04845* (2013.01); *G06F 3/04886* (2013.01); *G09G 3/035* (2020.08); *H04N 23/90* (2023.01); *G09G 2340/0464* (2013.01); *G09G 2340/14* (2013.01); *G09G 2354/00* (2013.01)

(58) Field of Classification Search
  CPC ............. G09G 2354/00; G09G 3/2092; G09G 2300/0426; G09G 2300/0439; G09G 2380/02; G06F 1/181; G06F 3/04817; G06F 3/04845; G06F 3/04886; G06F 1/1637; G06F 1/1652; G06F 1/1686; H04N 23/90; H04M 1/0214; H04M 1/0266; H04M 2250/52; H04M 1/0264
  See application file for complete search history.

(56) References Cited

U.S. PATENT DOCUMENTS

| | | | |
|---|---|---|---|
| 10,733,931 | B2 | 8/2020 | Jung et al. |
| 11,158,230 | B2 | 10/2021 | Lee et al. |
| 11,233,923 | B2 | 1/2022 | Nicholson et al. |
| 11,283,971 | B2 | 3/2022 | Moon et al. |
| 11,412,146 | B2 | 8/2022 | Miao |
| 2016/0132192 | A1 | 5/2016 | Sutton et al. |
| 2019/0130822 | A1* | 5/2019 | Jung ............... G09G 3/3208 |
| 2020/0183450 | A1* | 6/2020 | Jang ............... H04M 1/0216 |
| 2020/0329178 | A1 | 10/2020 | Moon et al. |
| 2020/0342800 | A1 | 10/2020 | Li et al. |
| 2022/0182549 | A1 | 6/2022 | Zhang |

FOREIGN PATENT DOCUMENTS

| | | | |
|---|---|---|---|
| JP | 2021-508855 | A | 3/2021 |
| KR | 10-2016-0062414 | A | 6/2016 |
| KR | 10-2017-0113066 | A | 10/2017 |
| KR | 10-1800669 | B1 | 12/2017 |
| KR | 10-2019-0101148 | A | 8/2019 |
| KR | 10-2020-0119639 | A | 10/2020 |
| KR | 10-2397044 | B1 | 5/2022 |
| WO | 2019/154072 | A1 | 8/2019 |
| WO | 2020/209646 | A1 | 10/2020 |

* cited by examiner

ELECTRONIC DEVICE INCLUDING DISPLAY AND CAMERA AND METHOD CONTROLLING THEREOF

CROSS-REFERENCE TO RELATED APPLICATION(S)

This application is a continuation of International Application No. PCT/KR2022/011918, which was filed on Aug. 10, 2022, and claims priority to Korean Patent Application No. 10-2021-0105186, filed on Aug. 10, 2021, and to Korean Patent Application No. 10-2022-0005759, filed on Jan. 14, 2022, in the Korean Intellectual Property Office, the disclosures of which are incorporated by reference herein their entireties.

BACKGROUND

Technical Field

Certain embodiments disclosed herein relate to an electronic device having an under-display camera, and more particular, to altering a user interface according to usage of the under-display camera.

Description of Related Art

Ongoing development continues for under-display cameras (UDC). UDC cameras may include frontal camera disposed in a front-facing display region, and/or disposed on a back surface of the display. The usage of UDC cameras has grown in line with the gradual expansion in the display size of recent electronic devices. Optical transmittance of the display in which a UDC camera is disposed is important, because external light enters to the UDC camera through the display. To better provide a high degree of optical transmittance, attempts have been made to partially remove pixels in the particular display region in which the UDC camera is disposed, and/or to widen intervals of pixel wiring.

An electronic device including a UDC camera may display a user interface, including various objects (e.g., app icons, menus, etc.). Such objects may be utilized to display information, represent selectable elements and icons for executing various functions of the electronic device, and may also include entertainment and other aesthetic elements.

The UDC is advantageous in that more surface area can be allocated to the display, by disposing the display above the camera, rather than allocating non-display space for the camera. However, when the UDC is operated, at least some of pixels in the peripheral display regions of the camera overlapping the UDC may be deactivated, to increase the quality of image capture. In this case, display objects previously displayed in the corresponding display region are removed, which may result in the convenience and usability of the electronic device to be degraded.

SUMMARY

An electronic device is disclosed according to certain embodiments disclosed herein includes: a first camera; a first display panel including multiple pixels and disposed to overlap the first camera, in at least a partial region thereof; and a processor, wherein the processor is configured to: display a graphic user interface on the first display panel, control activation of the first camera, deactivate at least one pixel disposed within a first region of the first display panel, wherein the first region is included in the partial region, and change the graphic user interface to be displayed at least in part to a second region of the first display panel, wherein the second region is at least partially in contact with the first region A method is disclosed according to certain embodiments disclosed herein, and includes: displaying, on a first display panel, a graphic user interface; activating, via at least one processor, a first camera, wherein the first display panel includes multiple pixels, and is disposed to overlap the first camera in at least a partial region thereof; deactivating, via the at least one processor, at least one pixel disposed within a first region of the first display panel, wherein the first region is included in the partial region; and changing the graphic user interface to be displayed at least in part to a second region of the first display panel, wherein the second region is at least partially in contact with the first region.

According to certain embodiments, usability of a UDC-equipped electronic device may be improved by altering the user interface displayed on the screen, according to a present photographic mode.

According to certain embodiments, display regions the electronic device may be utilized with greater efficiency when accommodating operations of a UDC.

BRIEF DESCRIPTION OF THE DRAWINGS

In describing the drawings, identical or similar reference numerals are used to designate identical or similar elements.

DETAILED DESCRIPTION

Figure 1:
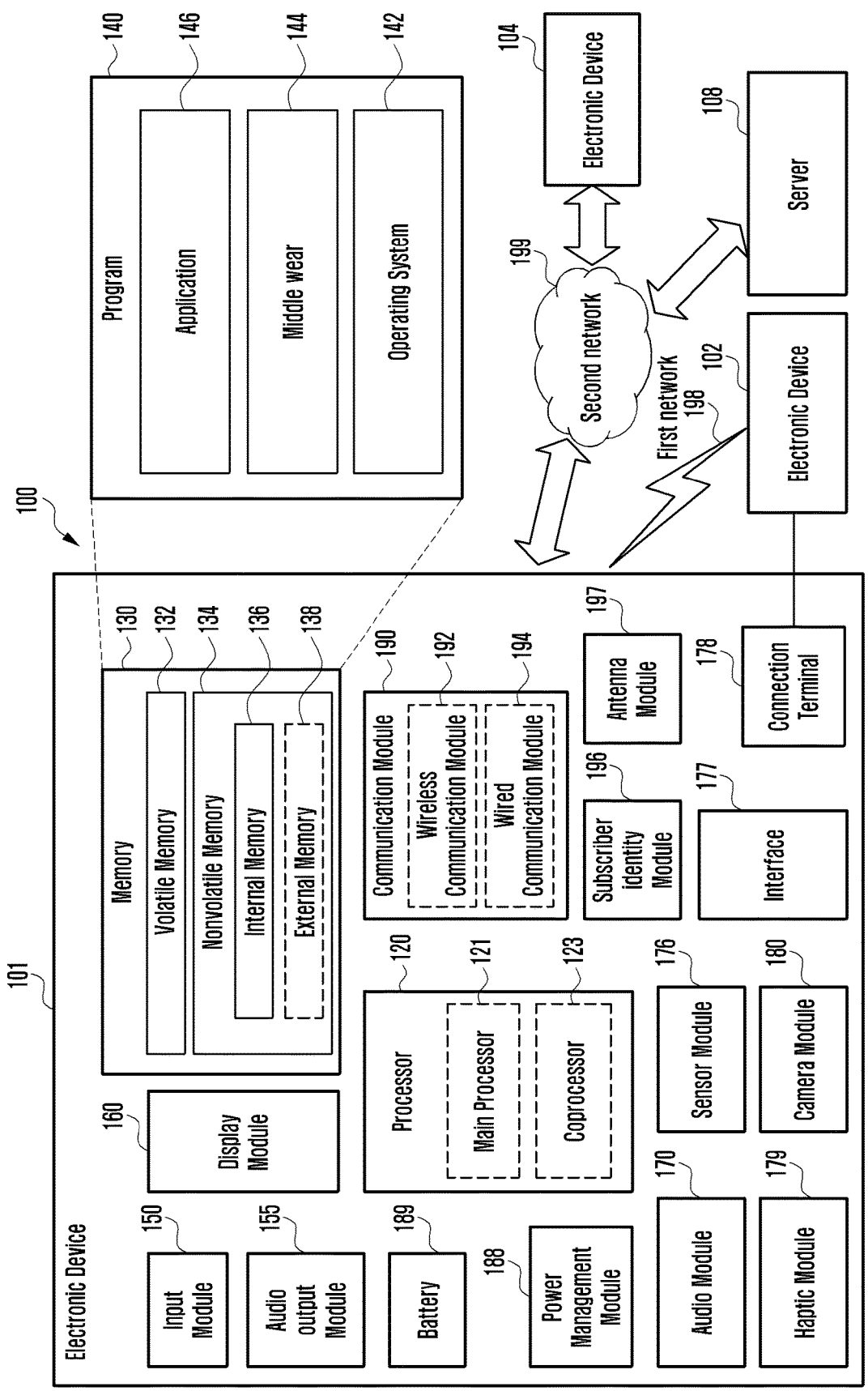
FIG. 1 is a block diagram of an electronic device in a network environment according to certain embodiments.

It should be appreciated that certain embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
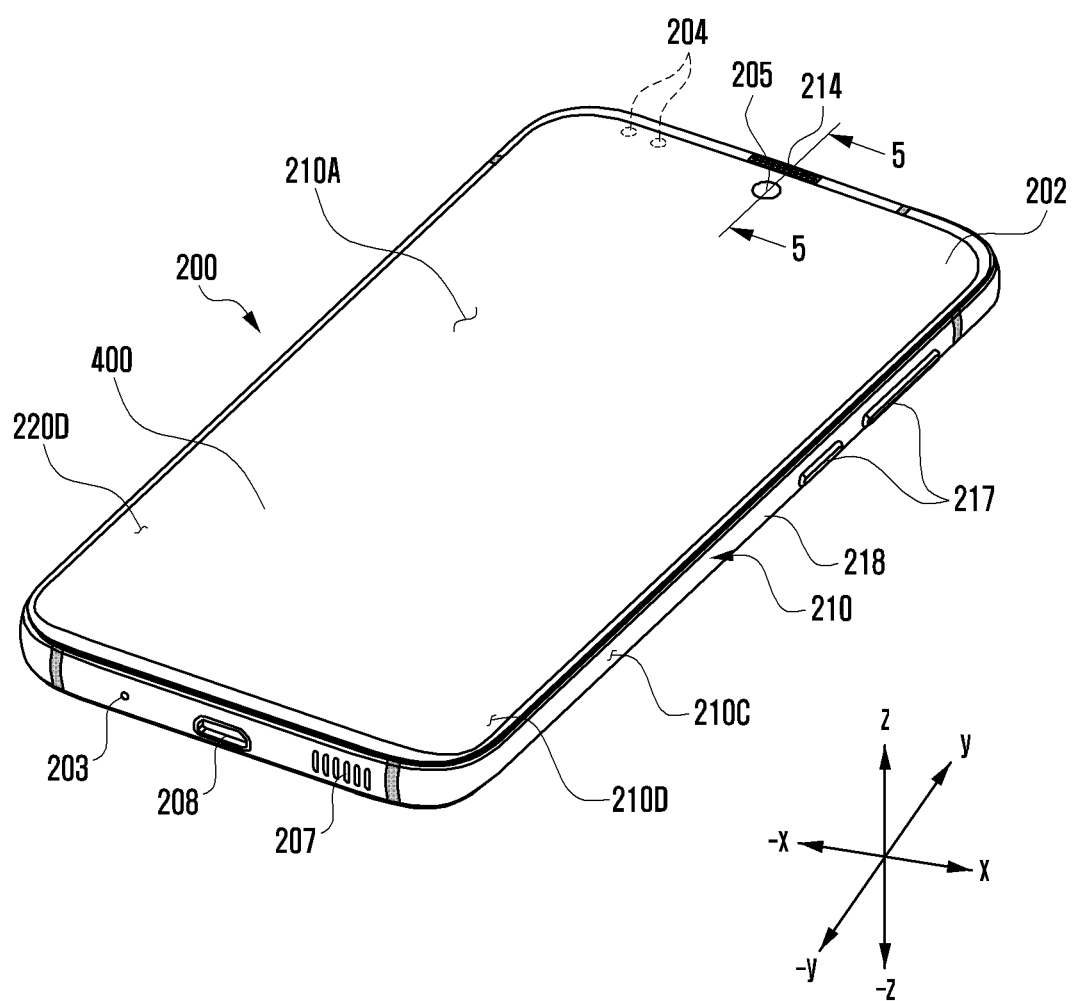
FIG. 2A is a perspective view of the front surface of an electronic device according to certain embodiments.
Figure 2B:
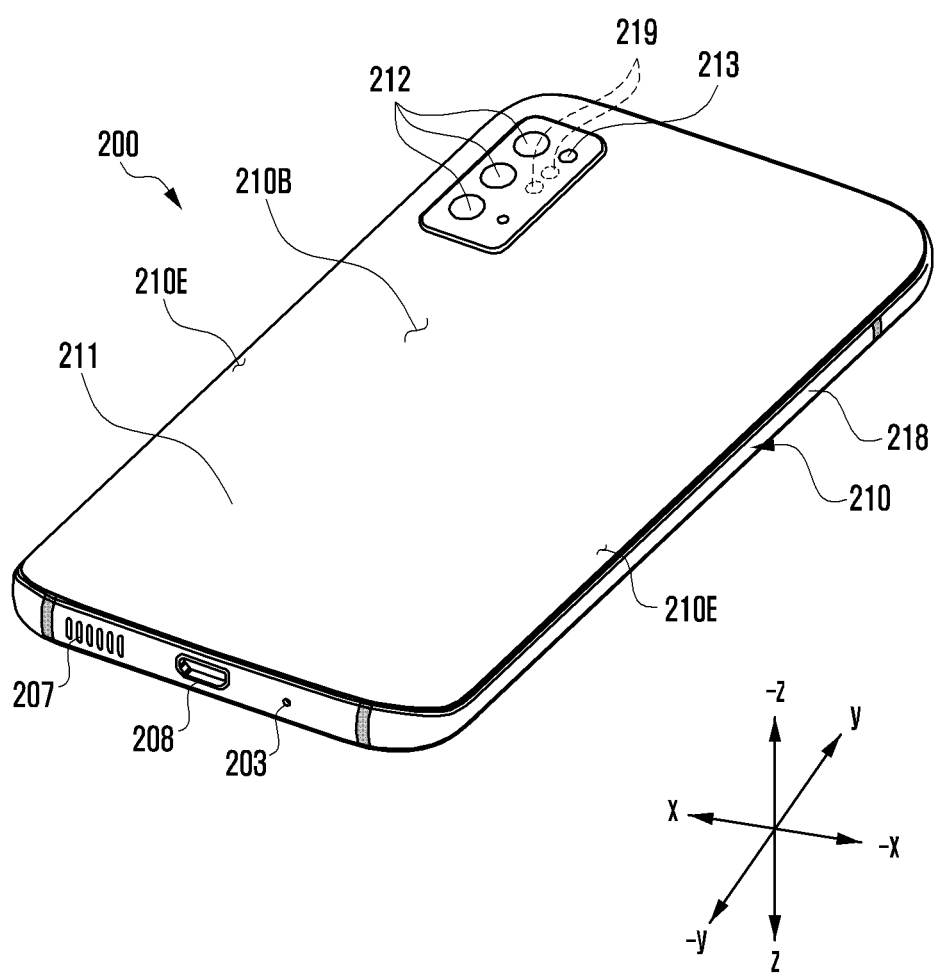
FIG. 2B is a perspective view of the rear surface of the electronic device in FIG. 2A according to certain embodiments.

FIG. 2A is a perspective view of the front surface of an electronic device 200 (e.g., a mobile electronic device) according to certain embodiments. FIG. 2B is a perspective view of the rear surface of the electronic device 200 in FIG. 2A according to certain embodiments.

Referring to FIGS. 2A and 2B, the electronic device 200 according to an embodiment may include a housing 210 including a first surface (or a front surface) 210A, a second surface (or a rear surface) 210B, and a side surface 210C surrounding a space between the first surface 210A and the second surface 210B. In another embodiment (not shown), a housing may indicate a structure forming some of the first surface 210A, the second surface 210B, and the side surface 210C in FIG. 2A. According to an embodiment, the first surface 210A may be formed of a front plate 202 (e.g., a polymer plate or a glass plate including various coated layers), at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or a combination of at least two of the materials. The side surface 210C may be coupled to the front plate 202 and the rear plate 211, and may be formed of a side bezel structure 218 (or a "side member") containing metal and/or polymer. In an embodiment, the rear plate 211 and the side bezel structure 218 may be integrally formed, and may include an identical material (e.g., a metal material, such as aluminum).

In the illustrated embodiment, the front plate 202 may include a first region 210D, curved and seamlessly extending from the first surface 210A toward the rear plate, at each of both ends of a long edge of the front plate. In the illustrated embodiment (see FIG. 2B), the rear plate 211 may include a second region 210E, curved and seamlessly extending from the second surface 210B toward the front plate, at each of both ends of a long edge thereof. In an embodiment, the front plate 202 or the rear plate 211 may include one of the first region 201D or the second region 201E. In an embodiment, the front plate 202 may include a flat surface disposed parallel to the second surface 210B without including the first region and the second region. In the embodiments, when the electronic device is seen from the side, the side bezel structure 218 may have a first thickness (or width) at a side surface which does not include the first region 210D or the second region 210E, as described above, and may have a second thickness less than the first thickness at a side surface which includes the first region 210D or the second region 210E.

According to an embodiment, the electronic device 200 may include at least one among a display 400, an input device 203, sound output devices 207 and 214, sensor modules 204 and 219, camera modules 205 and 212, key input devices 217, an indicator (not shown), and a connector 208. In an embodiment, the electronic device 200 may omit at least one (e.g., the key input devices 217 or the indicator) of the elements, or may additionally include another element.

The display 400, for example, may be visually exposed through a considerable part of the front plate 202. In an embodiment, at least a part of the display 400 may be exposed through the front plate 202 which forms the first surface 210A, and the first region 201D of the side surface 210C. The display 400 may be coupled to or disposed adjacent to a touch sensing circuit, a pressure sensor capable of measuring the strength (pressure) of a touch, and/or a digitizer for detecting a magnetic field-type stylus pen. In an embodiment, at least some of the sensor modules 204 and 219 and/or at least some of the key input devices 217 may be disposed in the first region 201D and/or the second region 201E.

The input device 203 may include a microphone 203. In an embodiment, the input device 203 may include multiple microphones 203 disposed so as to sense the direction of a sound. The sound output devices 207 and 214 may include speakers 207 and 214. The speakers 207 and 214 may include an external speaker 207 and a call receiver 214. In an embodiment, at least some of the microphone 203, the speakers 207 and 214, and the connector 208 may be disposed in the inner space of the electronic device 200, and may be exposed to an outside environment through at least one hole formed in the housing 210. In an embodiment, the hole formed in the housing 210 may be commonly used for the microphone 203 and the speakers 207 and 214. In an embodiment, the sound output devices 207 and 214 may include a speaker (e.g., a piezo speaker) operating without the hole formed in the housing 210.

The sensor modules 204 and 219 may generate electrical signals or data values corresponding to an operation state inside the electronic device 200 or an environment state outside the electronic device 200. The sensor modules 204 and 219 may include, for example, a first sensor module 204 (e.g., a proximity sensor) and/or a second sensor module (not shown) (e.g., a fingerprint sensor), disposed in the first surface 210A of the housing 210, and/or a third sensor module 219 (e.g., an HRM sensor) disposed in the second surface 210B of the housing 210. The fingerprint sensor may be disposed under the first surface 210A (e.g., a home key button) of the housing 210, a partial region of the second surface 210B, and/or the display 400. The electronic device 200 may further include at least one among unillustrated sensor modules, for example, a gesture sensor, a gyro sensor, a barometric pressure sensor, a magnetic sensor, an acceleration sensor, a grip sensor, a color sensor, an infrared (IR) sensor, a biosensor, a temperature sensor, a humidity sensor, a proximity sensor, or an illumination sensor.

The camera modules 205 and 212 may include a first camera module 205 disposed in the first surface 210A of the electronic device 200, a second camera module 212 disposed in the second surface 210B, and/or a flash 213. The camera modules 205 and 212 may include one lens or multiple lenses, an image sensor, and/or an image signal processor. The flash 213 may include, for example, a light-emitting diode or a xenon lamp. In an embodiment, at least two lenses (a wide-angle lens, an ultra-wide-angle lens, or a telephoto lens) and image sensors may be disposed in one surface of the electronic device 200.

The key input devices 217 may be disposed in the side surface 210C of the housing 210. In another embodiment, the electronic device 200 may not include some or all of the above-mentioned key input devices 217, and key input devices 217, which are not included, may be implemented in other forms, such as soft keys, on the display 400. In another embodiment, the key input devices 217 may be implemented by using pressure sensors included in the display 400.

The indicator may be disposed, for example, in the first surface 210A of the housing 210. The indicator may provide, for example, state information of the electronic device 200 in the form of light (e.g., a light-emitting element). In another embodiment, the light-emitting element may provide, for example, a light source operating in conjunction with the operation of the first camera module 205. The indicator may include, for example, an LED, an IR LED and/or a xenon lamp.

The connector hole 208 may include a first connector hole 208 capable of receiving a connector (e.g., a universal serial bus (USB) connector) for transmitting or receiving power and/or data to or from an external electronic device, and/or a second connector hole (or an earphone hole) (not shown) capable of receiving a connector for transmitting or receiving an audio signal to or from the external electronic device.

Some camera modules 205 of the camera modules 205 and 212, some sensor modules 204 among the sensor modules 204 and 219, or the indicator may be disposed to be exposed through the display 400. For example, the first camera module 205, the first sensor modules 204, or the indicator may be disposed in the inner space of the electronic device 200 so as to be exposed to an external environment through an opening bored in the display 400 up to the front plate, or through a transmissive region of the display 400. According to an embodiment, a region in which the display 400 faces the first camera module 205 is a part of a region in which contents are displayed, and may be formed as a transmissive region having a predetermined transmittance. According to an embodiment, the transmissive region may be formed to have a transmittance ranging from about 5% to about 20%. This transmissive region may include a region overlapping an effective aperture (e.g., a field of view) of the first camera module 205, through which light that is imaged by an image sensor to produce an image passes. For example, the transmissive region of the display 400 may include a region having a pixel density lower than that therearound. For example, the transmissive region may replace the opening. For example, the first camera module 205 may include an under-display camera (UDC). In another embodiment, some sensor modules 204 may be disposed in the inner space of the electronic device so as to perform functions thereof without being visually exposed through the front plate 202. For example, in this case, a region of the display 400, which faces the sensor module, may not utilize a bored opening.

According to certain embodiments, the electronic device 200 has a bar-type or plate-type exterior, but the disclosure is not limited thereto. For example, the illustrated electronic device 200 may be a part of a foldable electronic device, a slidable electronic device, a stretchable electronic device, and/or a rollable electronic device. The "foldable electronic device", the "slidable electronic device", the "stretchable electronic device", and/or the "rollable electronic device" may imply an electronic device in which, because the bending deformation of a display (e.g., the display 400 in FIG. 3A) is possible, at least a part of the display may be folded or may be wound or rolled, or the region of the display may be at least partially enlarged and/or received into a housing (e.g., the housing 210 in FIGS. 2A and 2B). In the foldable electronic device, the slidable electronic device, the stretchable electronic device, and/or the rollable electronic device, a screen display region may be extended and used by unfolding a display or exposing the wider area of the display to the outside according to a user's need.

Figure 3A:
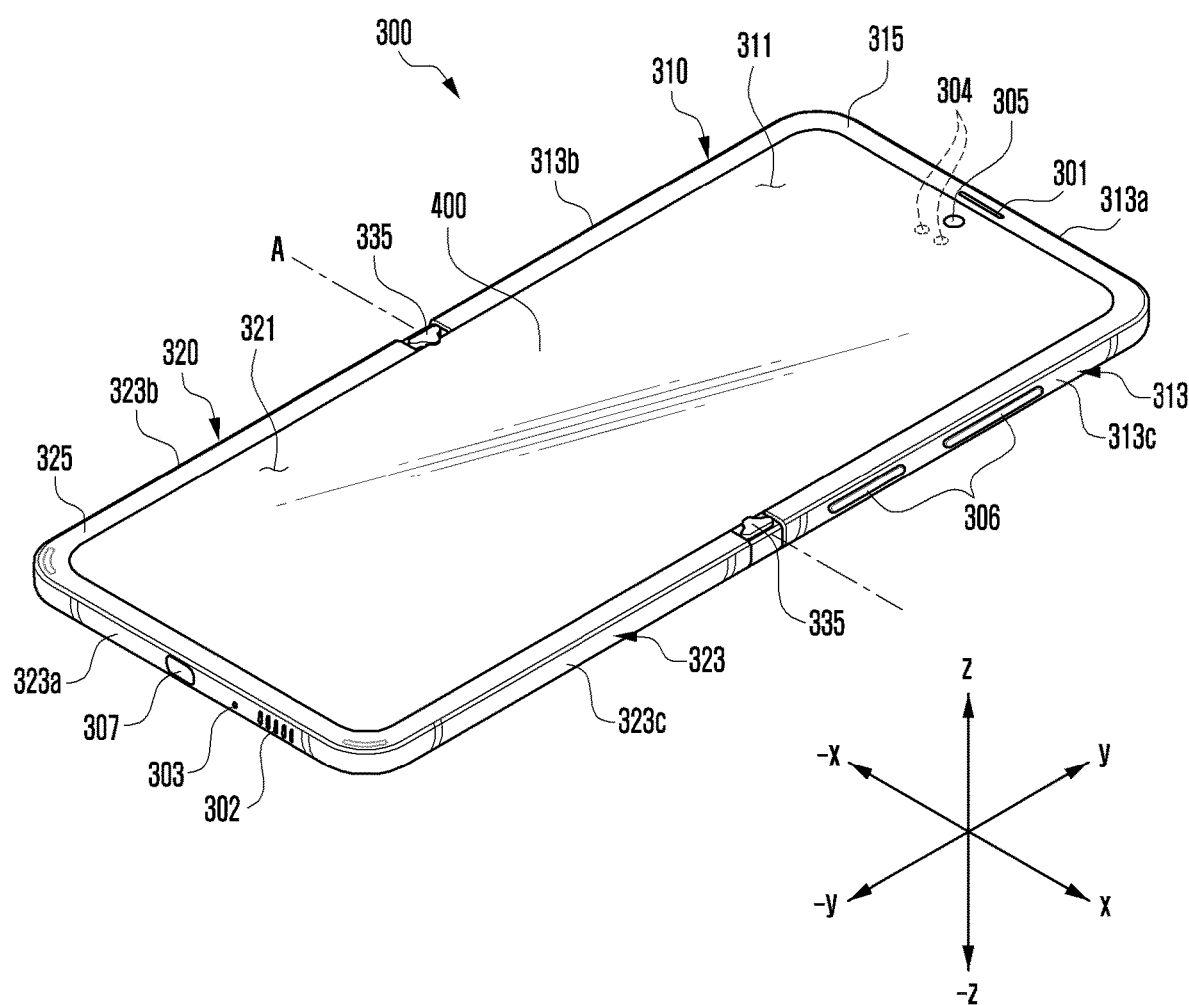
FIG. 3A is a front perspective view illustrating a flat state or an unfolding state of an electronic device including a second form according to certain embodiments.

FIG. 3A is a front perspective view illustrating a flat state or an unfolding state) of an electronic device including a second form according to certain embodiments.

Figure 3B:
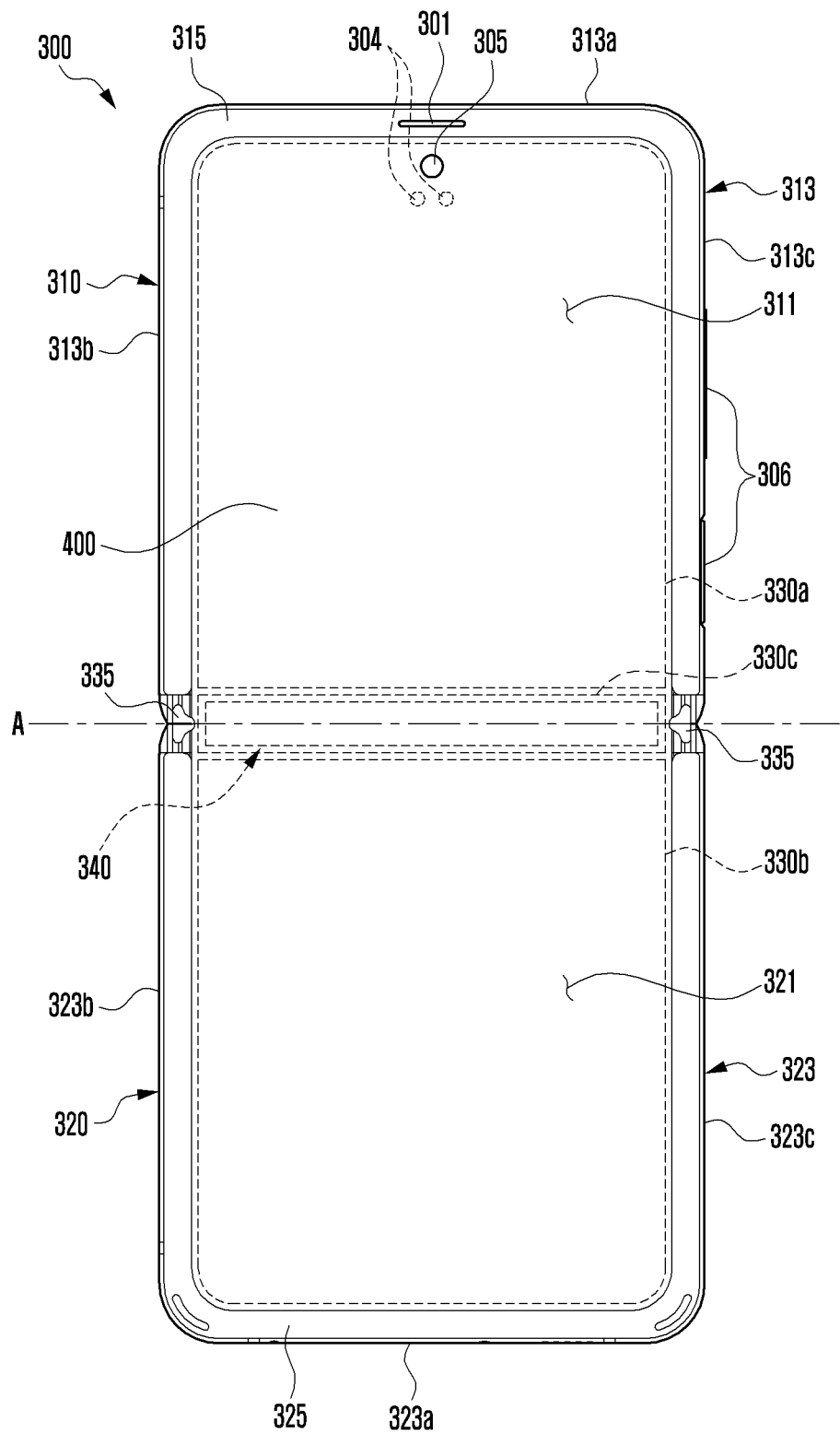
FIG. 3B is a plan view illustrating the front surface of an electronic device in the unfolded state in FIG. 3A according to certain embodiments.

FIG. 3B is a plan view illustrating the front surface of an electronic device in the unfolded state in FIG. 3A according to certain embodiments.

Figure 3C:
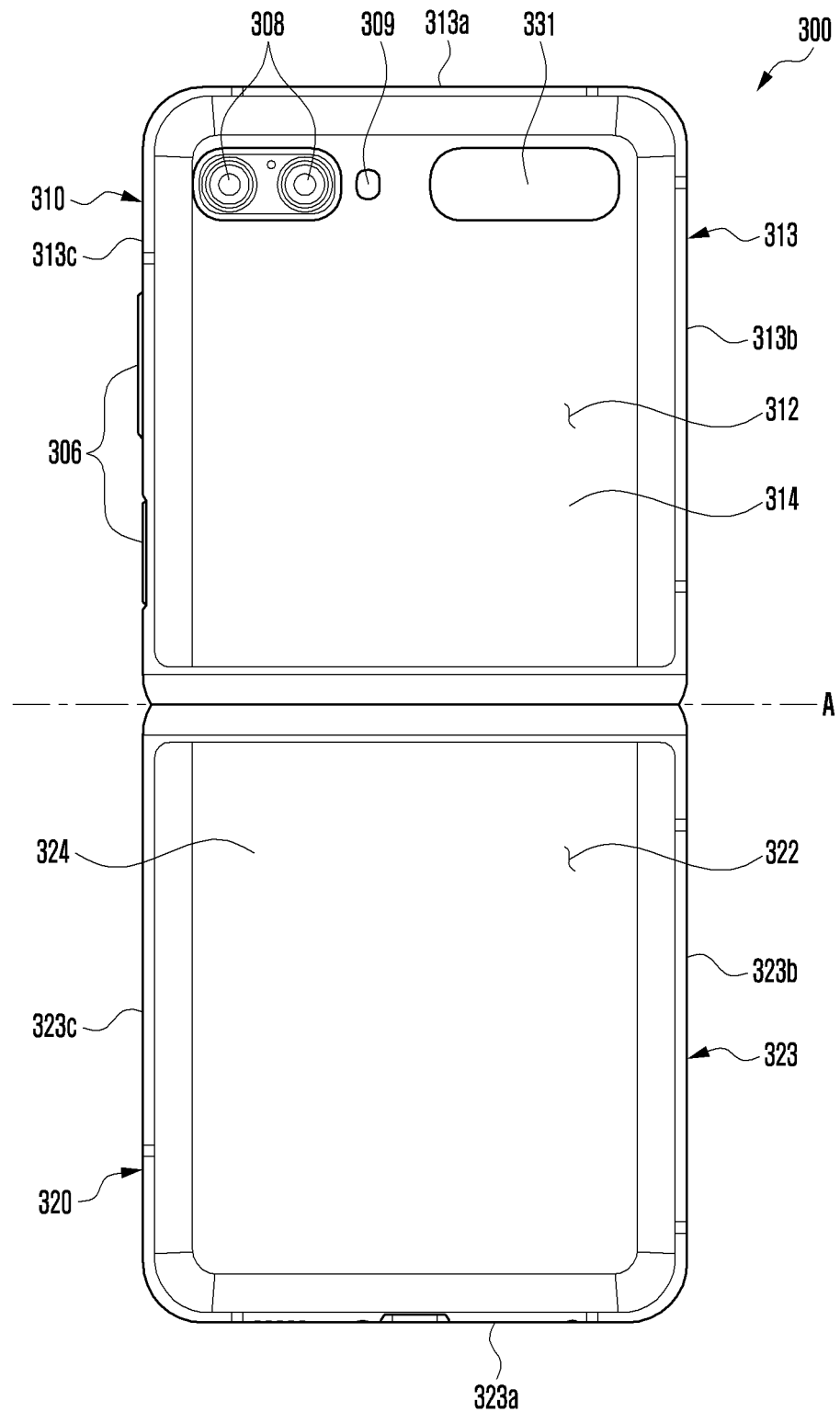
FIG. 3C is a plan view illustrating the rear surface of an electronic device in the unfolded state in FIG. 3A according to certain embodiments.

FIG. 3C is a plan view illustrating the rear surface of an electronic device in the unfolded state in FIG. 3A according to certain embodiments.

Referring to FIGS. 3A to 3C, the electronic device 300 may include a pair of housings 310 and 320 (e.g., foldable housings) rotatably coupled to each other so as to be folded while facing each other with reference to a hinge device (e.g., the hinge device 340 in FIG. 3B). In an embodiment, the hinge device (e.g., the hinge device 340 in FIG. 3B) may be disposed in the X-axis direction or may be disposed in the Y-axis direction. In an embodiment, at least two hinge devices (e.g., the hinge device 340 in FIG. 3B) may also be disposed to be folded in an identical direction or in different directions. According to an embodiment, the electronic device 300 may include a flexible display 400 (e.g., a foldable display) disposed in a region formed by the pair of housings 310 and 320. According to an embodiment, a first housing 310 and a second housing 320 may be disposed at both sides with reference to a folding axis (axis A), and may have shapes substantially symmetric with respect to the folding axis (axis A). According to an embodiment, the angle or the distance between the first housing 310 and the second housing 320 may vary depending on whether the state of the electronic device 300 is an unfolded state (a flat state or unfolding state), a folded state (a folding state), or an intermediate state.

According to certain embodiments, the pair of housings 310 and 320 may include the first housing 310 (e.g., a first housing structure) coupled to the hinge device (e.g., the hinge device 340 in FIG. 3B) and the second housing 320 (e.g., a second housing structure) coupled to the hinge device (e.g., the hinge device 340 in FIG. 3B). According to an embodiment, in an unfolded state, the first housing 310 may include a first surface 311 facing a first direction (e.g., a forward direction) (the z-axis direction) and a second surface 312 opposite to the first surface 311 and facing a second direction (e.g., a backward direction) (−z-axis direction). According to an embodiment, in the unfolded state, the second housing 320 may include a third surface 321 facing a first direction (the z-axis direction) and a fourth surface 322 facing a second direction (−z-axis direction). According to an embodiment, the electronic device 300 may operate in such a manner that the first surface 311 of the first housing 310 and the third surface 321 of the second housing 320 face a substantially identical first direction (the z-axis direction) in the unfolded state and that the first surface 311 and the third surface 321 face each other in the folded state. According to an embodiment, the electronic device 300 may operate in such a manner that the second surface 312 of the first housing 310 and the fourth surface 322 of the second housing 320 face a substantially identical second direction (the −z-axis direction) in the unfolded state and that the second surface 312 and the fourth surface 322 face directions opposite to each other in the folded state. For example, in the folded state, the second surface 312 may face the first direction (the z-axis direction), and the fourth surface 322 may face the second direction (the −z-axis direction).

According to certain embodiments, the first housing 310 may include a first side member 313 at least partially forming the exterior of the electronic device 300 and a first rear cover 314 coupled to the first side member 313 and forming at least a part of the second surface 312 of the electronic device 300. According to an embodiment, the first side member 313 may include a first side surface 313a, a second side surface 313b extending from one end of the first side surface 313a, and a third side surface 313c extending from the other end of the first side surface 313a. According to an embodiment, the first side member 313 may be formed in a right-angled tetragonal (e.g., square or rectangular) shape through the first side surface 313a, the second side surface 313b, and the third side surface 313c.

According to certain embodiments, the second housing 320 may include a second side member 323 at least partially forming the exterior of the electronic device 300, and a second rear cover 324 coupled to the second side member 323 and forming at least a part of the fourth surface 322 of the electronic device 300. According to an embodiment, the second side member 323 may include a fourth side surface 323a, a fifth side surface 323b extending from one end of the fourth side surface 323a, and a sixth side surface 323c extending from the other end of the fourth side surface 323a. According to an embodiment, the second side member 323 may be formed in a right-angled tetragonal shape through the fourth side surface 323a, the fifth side surface 323b, and the sixth side surface 323c.

According to certain embodiments, the pair of housings 310 and 320 are not limited to the illustrated form and coupling, and may be implemented by other shapes or a combination and/or coupling of other components. For example, in an embodiment, the first side member 313 may be formed integrally with the first rear cover 314, and the second side member 323 may be formed integrally with the second rear cover 324.

According to certain embodiments, when the electronic device 300 is in an unfolded state, the second side surface 313b of the first side member 313 and the fifth side surface 323b of the second side member 323 may be connected to each other without any gap therebetween. According to an embodiment, when the electronic device 300 is in an unfolded state, the third side surface 313c of the first side member 313 and the sixth side surface 323c of the second side member 323 may be connected to each other without any gap therebetween. According to an embodiment, when the electronic device 300 is in an unfolded state, a length obtained by summing the second side surface 313b and the fifth side surface 323b may be configured to be greater than the length of the first side surface 313a and/or the fourth side surface 323a. Furthermore, a length obtained by summing the third side surface 313c and the sixth side surface 323c may be configured to be greater than the length of the first side surface 313a and/or the fourth side surface 323a.

According to certain embodiments, the first rear cover 314 and/or the second rear cover 324 may be formed of at least one or a combination of at least two among, for example, coated or colored glass, ceramic, polymer, or metal (e.g., aluminum, stainless steel (STS), or magnesium).

According to certain embodiments, the flexible display 400 may be disposed to extend from the first surface 311 of the first housing 310 to at least a part of the third surface 321 of the second housing 320 via the hinge device (e.g., the hinge device 340 in FIG. 3B). For example, the flexible display 400 may include a first part 330a substantially corresponding to the first surface 311, a second part 330b corresponding to the third surface 321, and a third part 330c (e.g., a bendable region) connecting the first part 330a to the second part 330b and corresponding to the hinge device (e.g., the hinge device 340 in FIG. 3B). According to an embodiment, the electronic device 300 may include a first protective cover 315 (e.g., a first protective frame or a first decoration member) coupled along the edge of the first housing 310. According to an embodiment, the electronic device 300 may include a second protective cover 325 (e.g., a second protective frame or a second decoration member) coupled along the edge of the second housing 320. According to an embodiment, the first protective cover 315 and/or the second protective cover 325 may be formed of a metal or polymer material. According to an embodiment, the first protective cover 315 and/or the second protective cover 325 may be used as decoration members. According to an embodiment, the flexible display 400 may be positioned such that the edge of the first part 330a is interposed between the first housing 310 and the first protective cover 315. According to an embodiment, the flexible display 400 may be positioned such that the edge of the second part 330b is interposed between the second housing 320 and the second protective cover 325. According to an embodiment, the flexible display 400 may be positioned such that the edge of the flexible display 400, corresponding to a protective cap 335 disposed in a region corresponding to the hinge device (e.g., the hinge device 340 in FIG. 3B), is protected through the protective cap. Therefore, the edge of the flexible display 400 may be substantially protected from the outside. According to an embodiment, the electronic device 300 may include a hinge housing 341 (e.g., a hinge cover) disposed to support the hinge device (e.g., the hinge device 340 in FIG. 3B), be exposed outside when the electronic device 300 is in a folded state, and be moved into a first space (e.g., in the inner space of the first housing 310) and a second space (e.g., the inner space of the second housing 320) when the electronic device 300 is in an unfolded state and thus be not viewed from outside. In an embodiment, the flexible display 400 may be disposed to extend from at least a part of the second surface 312 to at least a part of the fourth surface 322. In this case, the electronic device 300 may be folded such that the flexible display 400 is exposed outside (an out-folding method).

According to certain embodiments, the electronic device 300 may include a sub-display 331 disposed separately from the flexible display 400. According to an embodiment, the sub-display 331 may be disposed to be at least partially disposed on the second surface 312 of the first housing 310, and thus, in the folded state, may display state information of the electronic device 300 replacing a display function of the flexible display 400. According to an embodiment, the sub-display 331 may be disposed so as to be viewed from outside through at least a partial region of the first rear cover 314. In an embodiment, the sub-display 331 may be disposed on the fourth surface 322 of the second housing 320. In this case, the sub-display 331 may be disposed so as to be exposed from outside through at least a partial region of the second rear cover 324.

According to certain embodiments, the electronic device 300 may include at least one among an input device 303 (e.g., a microphone), sound output devices 301 and 302, sensor modules 304, camera devices 305 and 308, key input devices 306, or a connector port 307. In the illustrated embodiment, the input device 303 (e.g., the microphone), the sound output devices 301 and 302, the sensor modules 304, the camera devices 305 and 308, the key input devices 306, or the connector port 307 may indicate a hole or a shape formed in the first housing 310 or the second housing 320, but may be defined as including a substantial electronic component which is disposed in the electronic device 300 and operates through a hole or a shape (e.g., the input device, the sound output device, the sensor module, or the camera device).

According to certain embodiments, the input device 303 may include at least one microphone 303 disposed in the second housing 320. In an embodiment, the input device 303 may include multiple microphones 303 disposed to sense the direction of a sound. In an embodiment, the multiple microphones 303 may be disposed in appropriate positions at the first housing 310 and/or the second housing 320. According to an embodiment, the sound output devices 301 and 302 may include speakers 301 and 302. According to an embodiment, the speakers 301 and 302 may include a call receiver 301 disposed at the first housing 310 and a speaker 302 disposed at the second housing 320. In an embodiment, the input device 303, the sound output devices 301 and 302, and the connector port 307 may be disposed in a space provided in the first housing 310 and/or the second housing 320 of the electronic device 300, and may be exposed to an external environment through at least one hole formed in the first housing 310 and/or the second housing 320. According to an embodiment, at least one connector port 307 may be used to transmit or receive power and/or data to or from an external electronic device. In an embodiment, at least one connector port (e.g., an earphone jack hole) may receive a connector (e.g., an earphone jack) for transmitting or receiving an audio signal to or from an external electronic device. In an embodiment, holes formed in the first housing 310 and/or the second housing 320 may be commonly used for the input device 303 and the sound output devices 301 and 302. In an embodiment, the sound output devices 301 and 302 may include a speaker (e.g., a piezo speaker) operating without holes formed in the first housing 310 and/or the second housing 320.

According to certain embodiments, the sensor modules 304 may generate electrical signals or data values corresponding to an operation state inside the electronic device 300 or an environment state outside the electronic device 300. The sensor modules 304 may detect an external environment through, for example, the first surface 311 of the first housing 310. In an embodiment, the electronic device 300 may further include at least one sensor module disposed to detect an external environment through the second surface 312 of the first housing 310. According to an embodiment, the sensor modules 304 (e.g., an illumination sensor) may be disposed under the flexible display 400 so as to detect an external environment through the flexible display 400. According to an embodiment, the sensor modules 304 may include at least one among a gesture sensor, a gyro sensor, a barometric pressure sensor, a magnetic sensor, an acceleration sensor, a grip sensor, a color sensor, an infrared (IR)

sensor, a biosensor, a temperature sensor, a humidity sensor, an illumination sensor, a proximity sensor, or an ultrasonic sensor.

According to certain embodiments, the camera devices 305 and 308 may include a first camera device 305 (e.g., a front camera device) disposed in the first surface 311 of the first housing 310, and a second camera device 308 disposed in the second surface 312 of the first housing 310. The electronic device 300 may further include a flash 309 disposed near the second camera device 308. According to an embodiment, the camera devices 305 and 308 may include one or multiple lenses, an image sensor, and/or an image signal processor. The flash 309 may include, for example, a light-emitting diode or a xenon lamp. According to an embodiment, the camera devices 305 and 308 may be disposed such that at least two lenses (a wide-angle lens, an ultra-wide-angle lens, or a telephoto lens) and image sensors are positioned in one surface (e.g., the first surface 311, the second surface 312, the third surface 321, or the fourth surface 322) of the electronic device 300. In an embodiment, the camera devices 305 and 308 may also include an image sensor and/or lenses for time of flight (TOF).

According to certain embodiments, the key input devices 306 (e.g., a key button) may be disposed in the third side surface 313c of the first side member 313 of the first housing 310. In an embodiment, the key input devices 306 may also be disposed in at least one side surface among the other side surfaces 313a and 313b of the first housing 310 and/or side surfaces 323a, 323b, and 323c of the second housing 320. In an embodiment, the electronic device 300 may not include some or all of the key input devices 306, and key input devices 306, which are not included, may be implemented in other forms, such as soft keys, on the flexible display 400. In an embodiment, the key input devices 306 may also be implemented using pressure sensors included in the flexible display 400.

According to certain embodiments, some camera devices (e.g., the first camera device 305) of the camera devices 305 and 308 or the sensor modules 304 may be disposed to be exposed through the flexible display 400. For example, the first camera device 305 or the sensor modules 304 may be disposed in the inner space of the electronic device 300 so as to be exposed to an external environment through an opening (e.g., a through-hole) at least partially formed in the flexible display 400. In another embodiment, some sensor modules 304 may also be disposed in the inner space of the electronic device 300 so as to perform functions thereof without being visually exposed through the flexible display 400. For example, in this case, a region of the flexible display 400, facing the sensor modules, may not utilize an opening.

Figure 4:
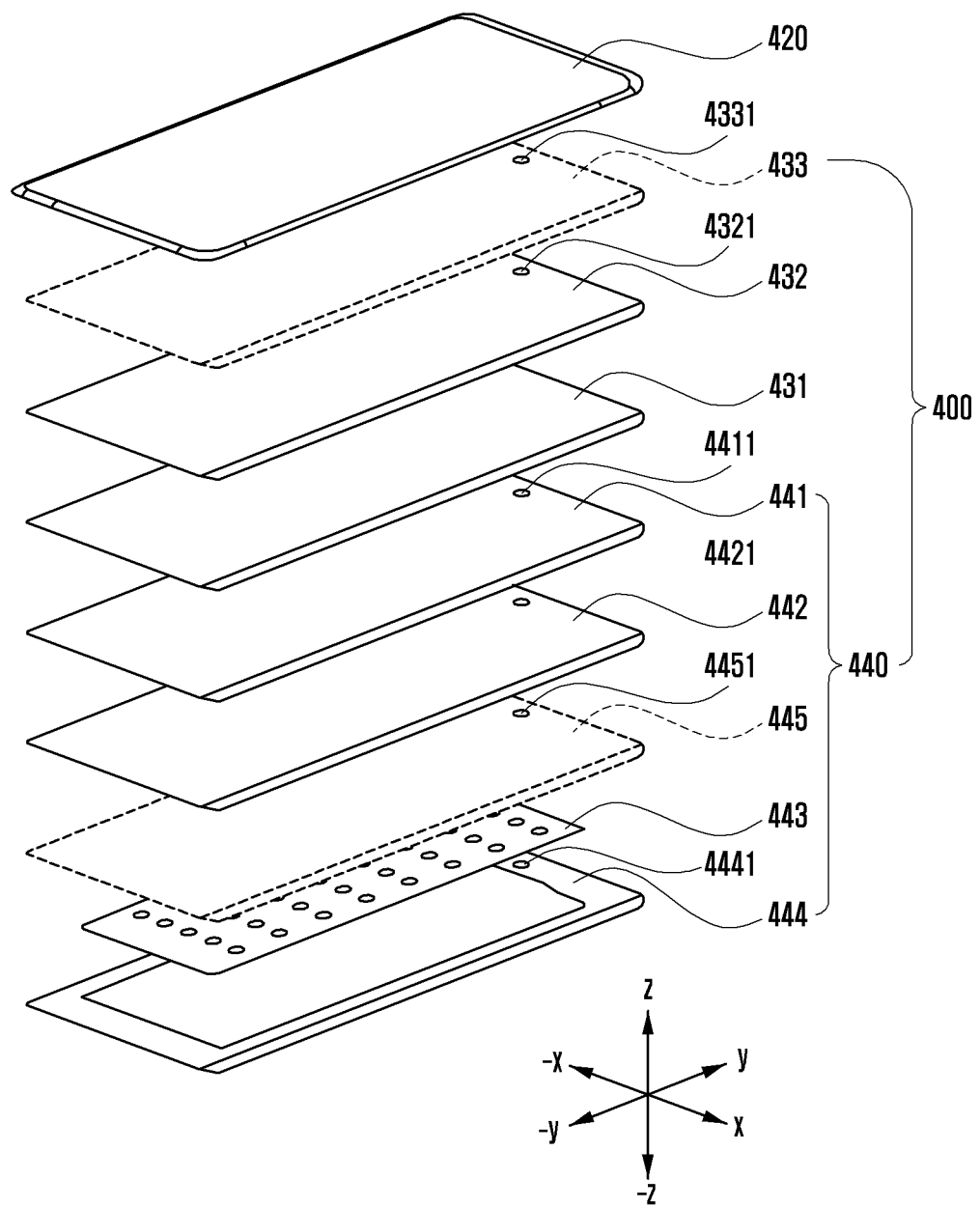
FIG. 4 is an exploded perspective view of a display 400 according to certain embodiments.

FIG. 4 is an exploded perspective view of a display 400 according to certain embodiments.

The display 400 in FIG. 4 may be at least partially similar to the display module 160 in FIG. 1, or may further include another embodiment of a display.

Figure 5A:
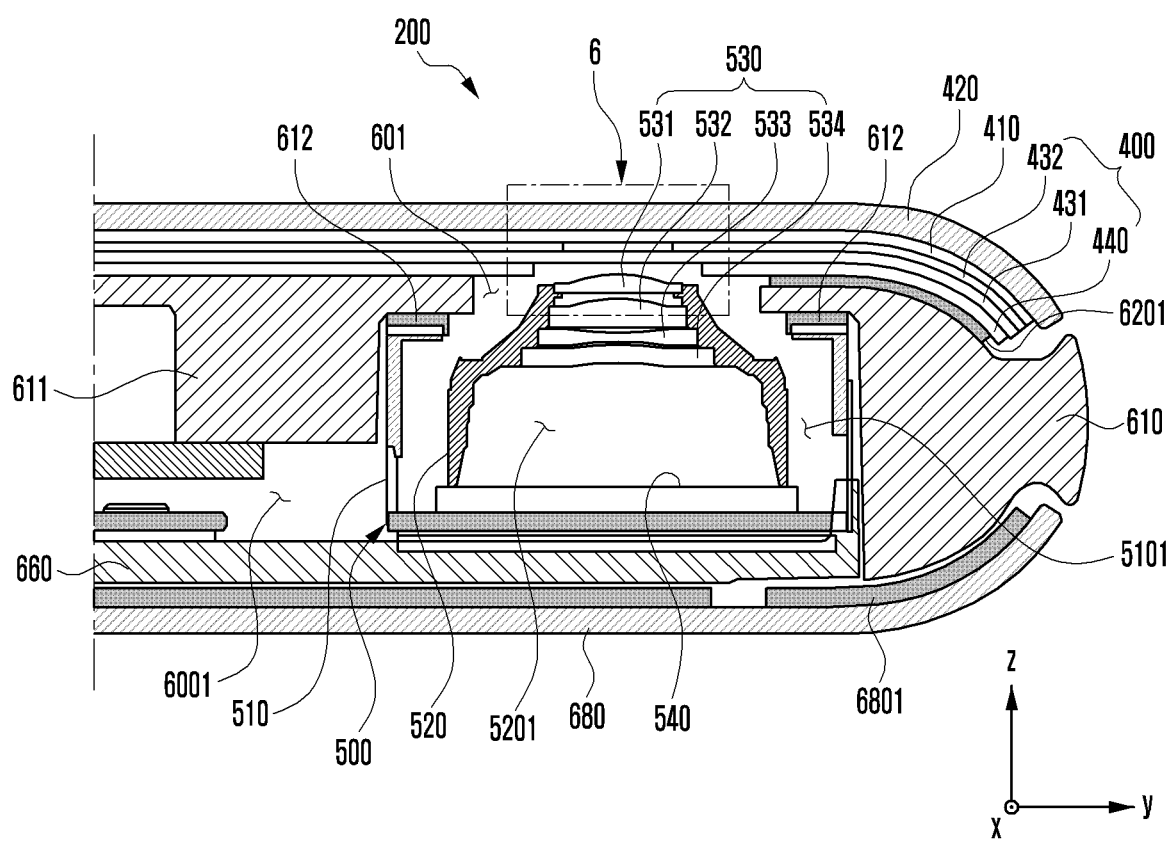
FIG. 5A is a partial cross-sectional view of an electronic device, taken along line 5-5 in FIG. 2A according to certain embodiments.

Referring to FIG. 4, the display 400 may include a polarizer (POL) (432) (e.g., a polarizing film or a polarizing layer), a display panel 431, and at least one subsidiary material layer 440 attached to the rear surface of the display panel 431, which are sequentially disposed on the rear surface of a front cover 420 (e.g., a front plate, a glass plate, a first cover member, or a cover member) through an adhesive member (e.g., an adhesive member 410 in FIG. 5A). According to an embodiment, the adhesive member 410 may include an optical clear adhesive (OCA), a pressure sensitive adhesive (PSA), a thermo-responsive adhesive, a normal adhesive, or a double-sided tape. According to an embodiment, the display panel 431 and the POL 432 may be integrally formed.

According to certain embodiments, the display 400 may include a control circuit (not shown). According to an embodiment, the control circuit may include a flexible printed circuit board (FPCB) configured to electrically connect a main printed circuit board of an electronic device (e.g., the electronic device 200 in FIG. 2A) to the display panel 431, and a display driver IC (DDI) mounted on the FPCB. According to an embodiment, the display 400 may additionally include a touch panel 433. According to an embodiment, when the display 400 operates as an in-cell-type or on-cell-type touch display according to the placement position of the touch panel 433, the control circuit may include a touch display driver IC (TDDI). In another embodiment, the display 400 may include a fingerprint sensor (not shown) disposed near the control circuit. According to an embodiment, the fingerprint sensor may include an ultrasonic or optical fingerprint sensor capable of recognizing a fingerprint of a finger which touches or approaches the outer surface of the front cover 420 through holes at least partially formed in some of the elements of the display 400.

According to certain embodiments, the at least one subsidiary material layer 440 may include at least one polymer member 441 or 442 disposed on the rear surface of the display panel 431, at least one functional member 443 disposed on the rear surface of the at least one polymer member 441 or 442, and a conductive member 444 disposed on the rear surface of the at least one functional member 443. According to an embodiment, the at least one polymer member 441 or 442 may include a light-blocking layer 441 (e.g., a black layer including uneven patterns) for removing bubbles generated between the display panel 431 and attachments thereunder and blocking light generated in the display panel 431 or light entering from the outside and/or a buffer layer 442 disposed to moderate an impact. According to an embodiment, the at least one functional member 443 may include a heat dissipation sheet (e.g., a graphite sheet) for heat dissipation, an added display, a force touch FPCB, a fingerprint sensor FPCB, an antenna radiator of communication, a conductive/nonconductive tape, or an open cell sponge. According to an embodiment, the conductive member 444, which is metal plate, may contribute to reinforcement of the rigidity of an electronic device (e.g., the electronic device 200 in FIG. 2), and may be used to shield ambient noise and dissipate heat emitted from ambient heat-emitting components. According to an embodiment, the conductive member 444 may include Cu, Al, Mg, SUS, or CLAD (e.g., a lamination member in which SUS and Al are alternately disposed). In another embodiment, the display 400 may further include a detection member 445 for detecting an input by an electromagnetic induction type writing member (e.g., an electronic pen). According to an embodiment, the detection member 445 may include a digitizer. According to an embodiment, the detection member 445 may be disposed between the at least one polymer member 442 and the functional member 443. In another embodiment, the detection member 445 may also be disposed between the display panel 431 and the at least one polymer member 441. In another embodiment, the detection member 445 may be disposed on the rear surface of the conductive member 444.

According to certain embodiments, the subsidiary material layer 440 may include openings 4411, 4421, 4451, and 4441 formed in positions corresponding to a camera module (e.g., a camera module 500 in FIG. 5A). According to an embodiment, the camera module 500 may be disposed close to the rear surface of the display panel 431 through openings 4411, 4421, 4451, and 4441. According to an embodiment, the POL 432 or the touch panel 433 disposed on the display panel 431 may also include an opening 4321 or 4331 formed therethrough at a corresponding position in order to prevent the degradation of performance of the camera module 500 due to a refractive index. In another embodiment, at a position corresponding to the camera module 500, the POL 432 and/or the touch panel 433 may be transparently processed, or polarization characteristics may be removed. In another embodiment, layers with no opening (e.g., the display panel 431) and/or the touch panel 433 may include a coated layer capable of performing index matching in order to reduce a refractive index difference. According to an embodiment, the display 400 may include an organic light emitting diode (OLED) display or a liquid crystal display (LCD).

FIG. 5A is a partial cross-sectional view of the electronic device 200, taken along line 5-5 in FIG. 2A according to certain embodiments.

In describing FIG. 5A, the description is made by using an unbreakable (UB) type OLED display (e.g., a curved display) as an example, but is not limited thereto. For example, the description may be applied to a flat type display of an on-cell touch active matrix organic light-emitting diode (AMOLED) (OCTA) scheme.

Referring to FIG. 5A, the electronic device 200 may include a front cover 420 (e.g., a cover member, a front plate, a front window, or a first plate) facing a first direction (the z-axis direction), a rear cover 680 (e.g., a rear cover member, a rear plate, a rear window, or a second plate) facing a direction opposite to the direction faced by the front cover 420, and a side member 610 surrounding a space 2001 between the front cover 420 and the rear cover 680. According to an embodiment, the electronic device 200 may include a first waterproof member 4201 disposed between a subsidiary material layer 440 of a display 400 and the side member 610. According to an embodiment, the electronic device 200 may include a second waterproof member 6801 disposed between the side member 610 and the rear cover 680. The first waterproof member 4201 and the second waterproof member 6801 may prevent outside foreign matter or water from being introduced into the inner space 2001 of the electronic device 200. In another embodiment, a waterproof member may be disposed in at least a part of a mounting support structure between a camera module 500 and the side member 610. In another embodiment, the first waterproof member 4201 and/or the second waterproof member 6801 may be replaced with an adhesive member.

According to certain embodiments, the side member 610 may further include a first support member 611 which at least partially extends into the inner space 2001 of the electronic device 200. According to an embodiment, the first support member 611 may be formed by a structural coupling with the side member 610. According to an embodiment, the first support member 611 may support the camera module 500 such that the camera module 500 is aligned and disposed near the rear surface of a display panel 431 through an opening (e.g., an opening (OP) in FIG. 5B) of the subsidiary material layer 440 of the display 400.

According to certain embodiments, the camera module 500 may include a camera housing 510, a lens housing 520 disposed in an inner space 5101 of the camera housing 510 and at least partially protruding in a display direction (e.g., the z-axis direction), multiple lenses 530 (531, 532, 533, and 534) aligned at regular intervals in an inner space 5201 of the lens housing 520, and at least one image sensor 540 disposed in the inner space 5101 of the camera housing 510 so as to acquire at least a part of light having passed through the multiple lenses 530. According to an embodiment, when the camera module 500 includes an auto focus (AF) function, the lens housing 520 may move through a predetermined driving unit in the camera housing 510 such that the distance to the display panel 431 varies. According to an embodiment, a separate driving unit may be disposed such that the camera module 500 changes the position of at least one of the multiple lenses 530 in order to perform the AF function. In another embodiment, in the camera module 500, the camera housing 510 may be omitted, and the lens housing 520 may be directly disposed at the first support member 611 through a predetermined alignment process. According to an embodiment, when the lens housing 520 is directly disposed at the first support member 611, the camera housing 510 may be omitted in order to reduce a camera arrangement space, and the lens housing 520 may be disposed to be attached to one side surface of the first support member 611. According to an embodiment, the camera module 500 may be aligned through a through-hole 601 of the first support member 611, and then may be attached to the rear surface of the first support member 611 by an adhesive member 612 (e.g., a bonding member or a tape member).

According to certain embodiments, the display 400 may include a touch panel (e.g., the touch panel 433 in FIG. 4), a POL 432, a display panel 431, a light-blocking layer 441, a buffer layer (e.g., the buffer layer 442 in FIG. 4), a digitizer (e.g., the detection member 445 in FIG. 4), a functional member (e.g., the functional member 443 in FIG. 4), and/or a conductive member (e.g., the conductive member 444 in FIG. 4). According to an embodiment, the camera module 500 may be supported by a second support member 660 (e.g., a rear case) additionally disposed in the inner space of the electronic device.

Figure 5B:
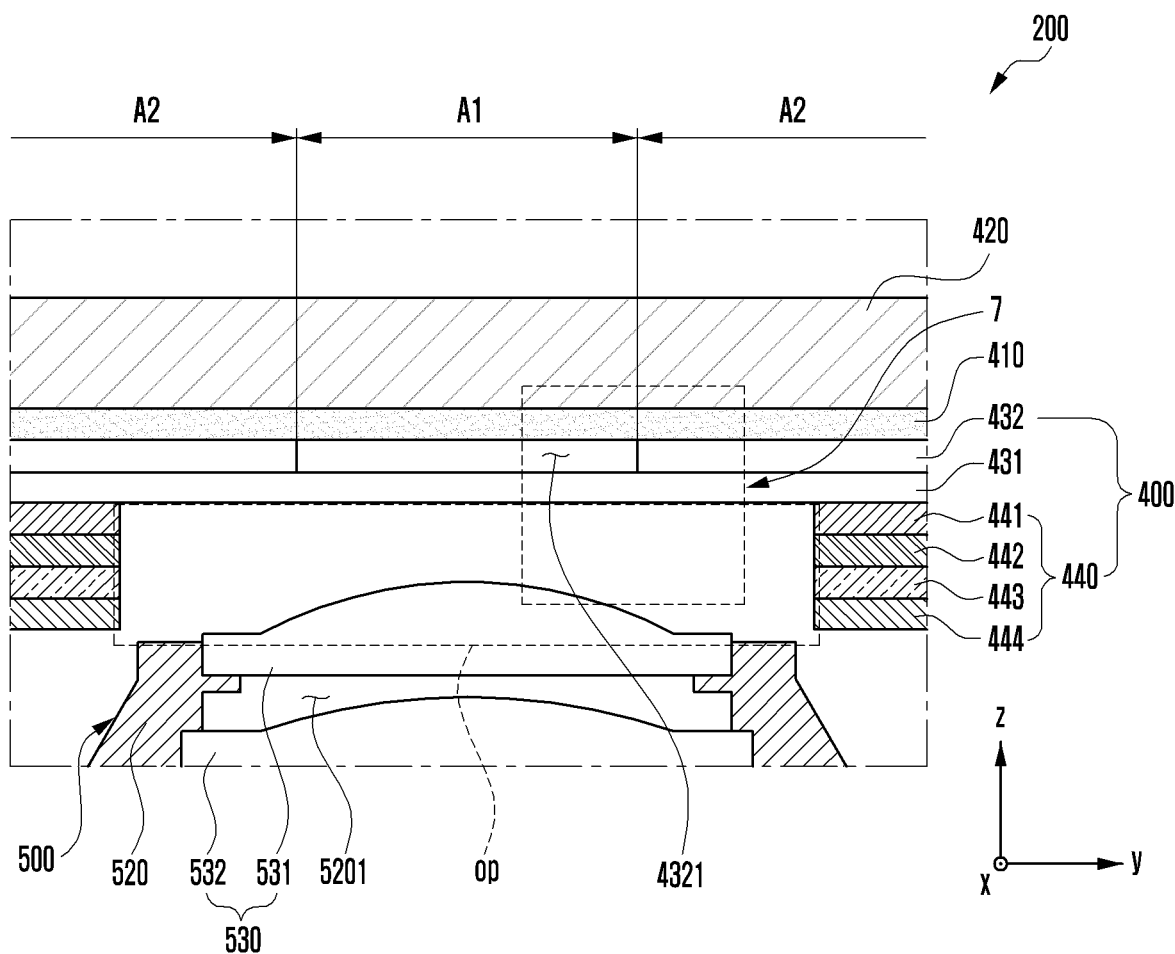
FIG. 5B is an enlarged view of region 6 in FIG. 5A according to certain embodiments.

FIG. 5B is an enlarged view of region 6 in FIG. 5A according to certain embodiments.

Referring to FIG. 5B, the electronic device 200 may include an adhesive member 410, the POL 432, the display panel 431, and the subsidiary material layer 440, which are disposed between the rear surface of the front cover 420 and the side member 610. According to an embodiment, when the front cover 420 is seen from above, the POL 432 may include an opening 4321 formed in order to improve an optical transmittance of the camera module 500. In another embodiment, in the adhesive member 410 disposed on the POL 432, a part corresponding to the opening 4321 may be at least partially omitted. In an embodiment, the opening 4321 formed in the POL 432 may be filled with an index material for adjusting the refractive index according to an increase in interfacial reflection. According to an embodiment, the POL 432 may be omitted, and may also be replaced with a color filter layer including a color filter and a black mask in the corresponding position thereof. In this case, the color filter layer may also include an opening in order to improve an optical transmittance of the camera module.

According to an embodiment, a region of the POL 432 corresponding to the multiple lenses 530 may be formed to have a high transmittance without having the opening 4321 formed therethrough. For example, at least a partial region of the POL 432 (e.g., a region corresponding to the multiple lenses 530) may be formed of a material having a transmittance different from that of the remaining region of the POL 432, or may be formed of another member capable of increasing a transmittance. According to an embodiment, a member (not shown) for increasing a transmittance may be disposed on at least a part (e.g., an upper side surface or a lower side surface) of the region of the POL 432 corresponding to the multiple lenses 530. According to an embodiment, when the front cover 420 is seen from above, the subsidiary material layer 440 may include an opening (OP) formed in a region at least partially overlapping the multiple lenses 530. According to an embodiment, the opening (OP) formed in the subsidiary material layer 440 may be formed as one opening (OP) by overlapping an opening (e.g., the opening 4411 in FIG. 4) formed in a light-blocking layer 441, an opening (e.g., the opening 4421 in FIG. 4) formed in the buffer layer 442, an opening (e.g., the opening 4431 in FIG. 4) formed in the functional member 443, and an opening (e.g., the opening 4441 in FIG. 4) formed in the conductive member 444. According to an embodiment, the openings may have different sizes so as to correspond to the shape of the camera module 500.

According to certain embodiments, when the display 400 is seen from above, the display panel 431 may include a first region A1, which overlaps an effective aperture of the camera module 500, and a second region A2 surrounding the first region A1. According to an embodiment, the first region A1 may be formed to have a light transmittance utilized by the camera module 500 through adjustment of a pixel density and/or a wiring density. According to an embodiment, the second region A2 may include a normal active region of the display panel 431. According to an embodiment, the second region A2 may be a region in which a light transmittance for the camera module 500 has not been taken into account. According to an embodiment, the display panel 431 may include first multiple pixels (e.g., P in FIG. 6), arranged to have a first arrangement density in the first region A1, and second multiple pixels (e.g., P in FIG. 6) having a second arrangement density, higher than the first arrangement density, in the second region A2. In an embodiment, the wiring density of the first region A1 may be formed to be lower than the wiring density of the second region A2, thereby contributing to transmittance improvement.

Figure 6:
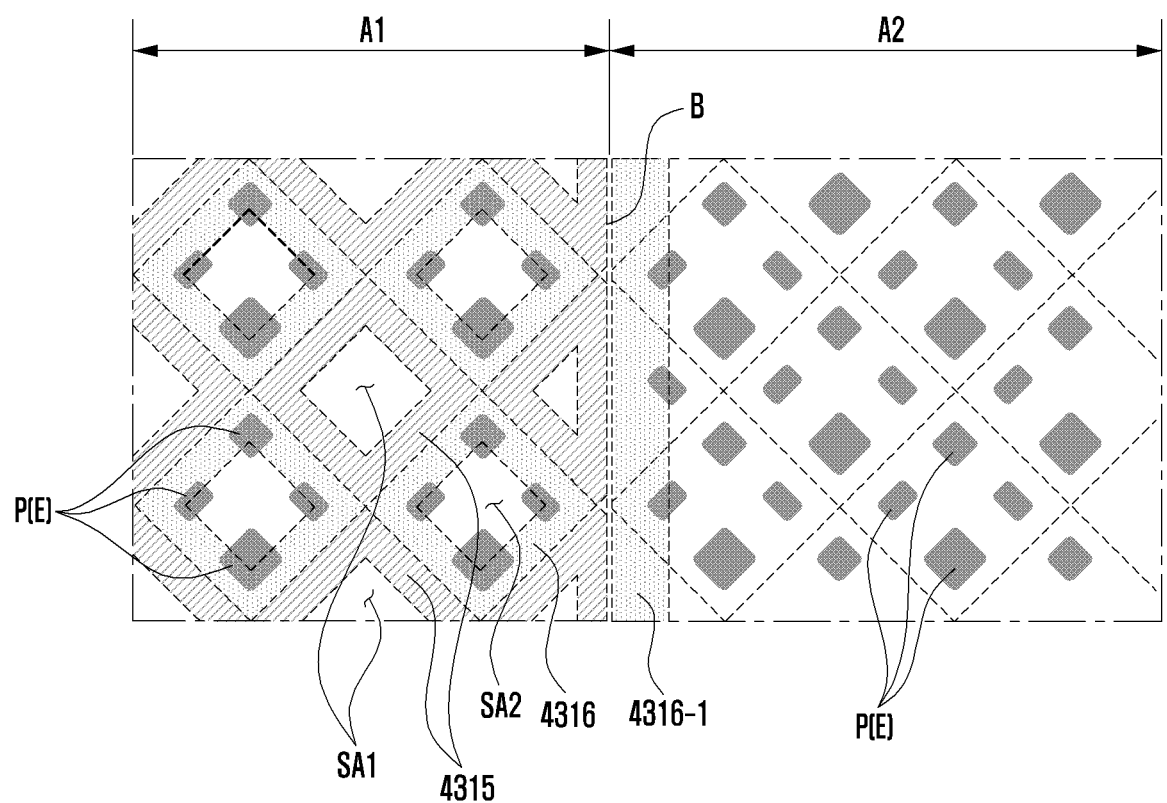
FIG. 6 illustrates a partial configuration of a display panel when region 7 in FIG. 5B according to certain embodiments is seen from above.

FIG. 6 illustrates a partial configuration of a display panel when region 7 in FIG. 5B according to certain embodiments of the disclosure is seen from above.

Referring to FIG. 6, when the display 400 is seen from above, the display panel may include a first region A1 overlapping an effective aperture of the camera module 500, and a second region A2 surrounding the first region A1. According to an embodiment, the display panel 431 may include first multiple pixels P arranged to have a first arrangement density in the first region A1 and second multiple pixels P having a second arrangement density higher than the first arrangement density in the second region A2. According to an embodiment, when the display panel 431 is seen from above, the first region A1 of the display panel 431 may include first sub-regions SA1 overlapping spaces between the multiple pixels P and second sub-regions SA2 overlapping the multiple pixels P and light emitters.

According to certain embodiments, a light extractor 4315 may be disposed at a part of a first sub-region SA1 in which pixels P are not arranged. For example, the light extractor 4315 may be disposed to have a designated width along the edge of the first sub-region SA1. This is for the purpose of preventing light emitted from a second sub-region SA2 from being color-mixed with light emitted from an adjacent pixel. According to an embodiment, light injector 4316 may be disposed at a part of a second sub-region SA2. According to an embodiment, the light injector 4316 may be disposed to have a designated width along the edge of the second sub-region SA2. In an embodiment, the light injector 4316 may be disposed at the entirety of the second sub-region SA2. In an embodiment, in order to reduce visibility of the boundary between the first region A1 and the second region A2, a light injector 4316-1 may be further disposed to have a designated width in the second region A2 at a boundary part (B) between the first region A1 and the second region A2.

Figure 7:
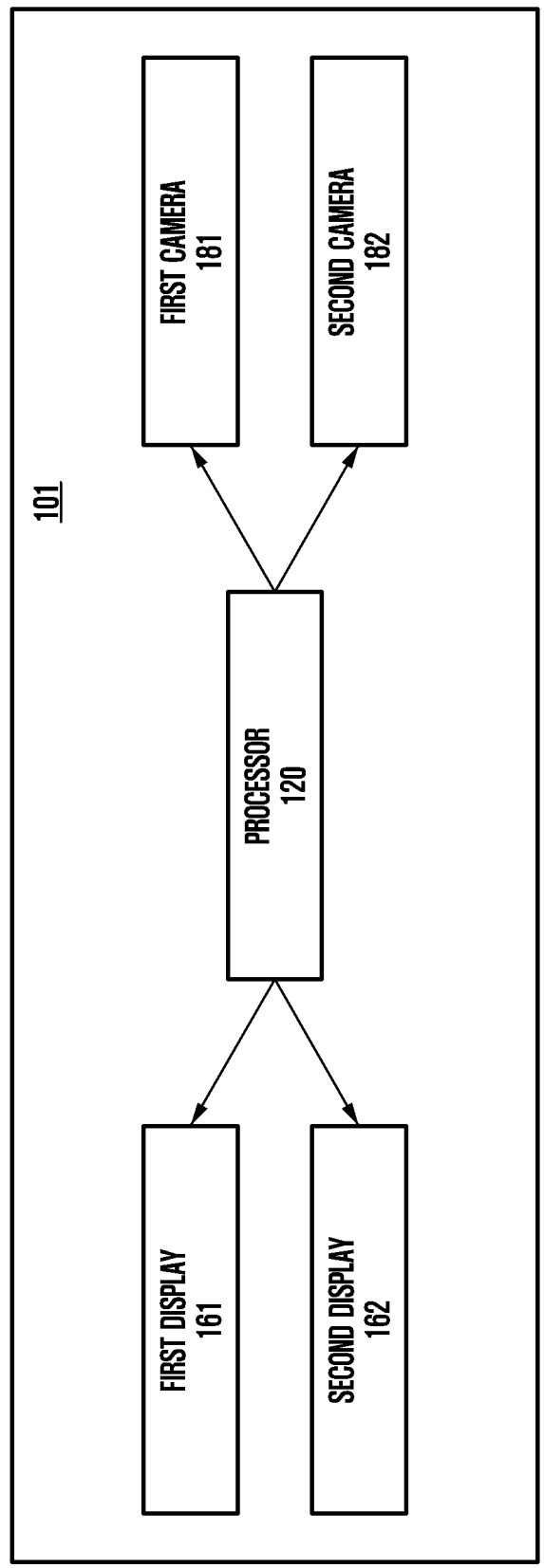
FIG. 7 is a block diagram of an electronic device according to certain embodiments.

FIG. 7 is a block diagram of an electronic device 101 according to certain embodiments.

Referring to FIG. 7, the electronic device 101 may include a processor 120 (e.g., the processor 120 in FIG. 1), a first display 161, a second display 162, a first camera 181, and/or a second camera 182. The electronic device 101 may include at least some among the elements and/or functions of the electronic device 101 in FIG. 1.

According to certain embodiments, the first display 161 may visually display information to the outside (e.g., a user) of the electronic device 101. The first display 161 may include at least some among the elements and/or functions of the display module 160 in FIG. 1. According to an embodiment, the first display 161 may include a touch sensor or a pressure sensor, which is configured to sense a touch. According to certain embodiments, the first display 161 may include multiple pixels (e.g., the multiple pixels P in FIG. 6) in at least a partial region thereof. According to an embodiment, each of the multiple pixels may be controlled by the processor 120 and/or a driving circuit for controlling the first display 161 to emit light, thereby displaying visual information to the outside of the electronic device 101. According to an embodiment, the first display 161 may include at least two regions (e.g., the first region A1 and/or the second region A2 in FIG. 6) which are different from each other in the arrangement density of multiple pixels. The first region A1 and the second region A2 on the first display 161 may have different pixel arrangement densities, and thus the respective regions may have different light transmittances. For example, the first region A1 may include multiple pixels with a relatively low arrangement density (e.g., a first arrangement density) compared with the second region A2, and the second region A2 may include multiple pixels with a relatively high arrangement density (e.g., a second arrangement density) compared with the first region A1. In a region (e.g., the first region A1) having a relatively lower arrangement density among the regions of the first display 161, the light transmittance of a display may be higher than in the other region. According to an embodiment, a partial region (e.g., the first region A1) of the first display 161 may be deactivated. For example, the first region A1, among the regions of the first display 161, may be deactivated, and the second region A2 may be activated. When a partial region of the first display 161 is deactivated, at least one pixel disposed in the deactivated region may be deactivated. The deactivated or activated state of the partial region of the first display 161 may be controlled and switched by the processor 120 and/or the driving circuit, which are connected to the first display 161. According to an embodiment, the first region A1 of the first display 161 may be disposed to at least partially overlap a field-of-view region corresponding to the field of view (FOV) of the first camera 181.

According to certain embodiments, the second display 162 may visually display information to the outside (e.g., a user) of the electronic device 101. The second display 162 may include at least some among the elements and/or functions of the display module 160 in FIG. 1. According to an embodiment, the second display 162 may include a touch sensor or a pressure sensor, which is configured to sense a touch. According to certain embodiments, the second display 162 may include multiple pixels (e.g., the multiple pixels P in FIG. 6) in at least a partial region thereof. According to an embodiment, each of the multiple pixels may be controlled by the processor 120 and/or a driving circuit for controlling the second display 162 to emit light, thereby displaying visual information to the outside of the electronic device 101. According to an embodiment, the second display 162 may include at least two regions (e.g., a third region and/or a fourth region) (e.g., the first region A1 and/or the second region A2 in FIG. 6) which are different from each other in the arrangement density of multiple pixels. The third region and the fourth region on the second display 162 may have different pixel arrangement densities, and thus the respective regions may have different light transmittances. For example, the third region may include multiple pixels with a relatively low arrangement density (e.g., a first arrangement density) compared with the fourth region, and the fourth region may include multiple pixels with a relatively high arrangement density (e.g., a second arrangement density) compared with the third region. In a region (e.g., the third region) having a relatively lower arrangement density among the regions of the second display 162, the light transmittance of a display may be higher than in the other region. According to an embodiment, a partial region (e.g., the third region) of the second display 162 may be deactivated. For example, the third region, among the regions of the second display 162, may be deactivated, and the fourth region may be activated. When a partial region of the second display 162 is deactivated, at least one pixel disposed in the deactivated region may be deactivated. The deactivated or activated state of the partial region of the second display 162 may be controlled and switched by the processor 120 and/or the driving circuit, which are connected to the second display 162. According to an embodiment, the third region of the second display 162 may be disposed to at least partially overlap a field-of-view region corresponding to the field of view (FOV) of the second camera 182.

According to an embodiment, the electronic device 101 may include at least one of the first display 161 and the second display 162, and may include the first display 161 without including the second display 162.

According to an embodiment, when one display among the first display 161 and the second display 162 may be driven to display visual information to the outside, the other display may be deactivated, or the first display 161 and the second display 162 may be simultaneously activated.

According to certain embodiments, the first camera 181 may capture a still image or a moving image. The first camera 181 may include at least some of the elements or functions of the camera module 180 in FIG. 1. According to certain embodiments, the first camera 181 may convert light incident from the outside to an electrical signal to generate image information. According to certain embodiments, the first camera 181 may capture an image of an environment outside the electronic device 101 and may generate image information obtained by capturing an ambient environment. According to an embodiment, the first camera 181 may be disposed such that a region corresponding to the field of view (FOV) thereof overlaps at least a partial region (e.g., the first region A1) of the first display 161.

According to certain embodiments, the second camera 182 may capture a still image or a moving image. The second camera 182 may include at least some of the elements or functions of the camera module 180 in FIG. 1. According to certain embodiments, the second camera 182 may convert light incident from the outside to an electrical signal to generate image information. According to certain embodiments, the second camera 182 may capture an image of an environment outside the electronic device 101 and may generate image information obtained by capturing an ambient environment. According to an embodiment, the second camera 182 may be disposed such that a region corresponding to the field of view (FOV) thereof overlaps at least a partial region (e.g., the third region) of the second display 162.

According to an embodiment, the electronic device 101 may include at least one of the first camera 181 and the second camera 182, and may include the first camera 181 without including the second camera 182.

According to an embodiment, when one camera among the first camera 181 and the second camera 182 may be driven to capture an image outside the electronic device 101, the other camera may be deactivated, or the first camera 181 and the second camera 182 may be simultaneously activated.

According to certain embodiments, the processor 120 may control each of the elements of the electronic device 101 and/or may process calculation or data regarding communication. The processor 120 may include at least some of the elements and/or functions of the processor 120 in FIG. 1. The processor 120 may be operatively, electrically, and/or functionally connected to the elements of the electronic device 101, such as the first display 161, the second display 162, the first camera 181 and/or the second camera 182. Each operation of the processor 120 according to certain embodiments may be performed in real time. For example, multiple operations performed by the processor 120 may be substantially simultaneously performed. Operations, which may be performed by the processor 120, and the type and/or amount of calculation and data processing will not be limited. However, herein, a description will be made solely of a method for changing a user interface according to certain embodiments, and elements and functions of the processor 120 related to an operation of performing the method.

According to certain embodiments, the processor 120 may control the first display 161 and/or the second display 162 to display a user interface. The user interface may include at least one graphical object which is visually displayed. According to an embodiment, the user interface may include a graphical user interface. At least one object included in the user interface may include an image object which may be visually displayed on a display (e.g., the first display 161 and/or the second display 162). According to an embodiment, the at least one object included in the user interface may include an image object for displaying a region for reception of a user input, displaying information about the electronic device 101 or an application, or displaying an execution screen or a related object together in a predetermined region. For example, the object may include an icon, an input field, a badge, a button, a display window, a widget, and/or a tool bar. According to an embodiment, the object may include an object, which is visually displayed on the display, such as an image, text, and/or a figure indicating a predetermined region on the display. The object included in the user interface is not limited to the above-mentioned examples.

According to an embodiment, the processor 120 may activate at least one of the first display 161 and the second display 162, and may display the user interface including the at least one object on the first display 161 and/or the second display 162. According to an embodiment, the processor 120 may activate one of the first display 161 and the second display 162, and may switch one of the first display 161 and the second display 162 from the activated state to a deactivated state while switching the other deactivated display to an activated state. According to another embodiment, the processor 120 may simultaneously activate the first display 161 and the second display 162 to display the user interface on each display.

According to certain embodiments, the processor 120 may capture an image. According to an embodiment, the processor 120 may use the first camera 181 and/or the second camera 182 to capture a still image and/or a moving image. The processor 120 may receive an input about capturing of a still image and/or a moving image, and may control, based on the received input, the first camera 181 and/or the second camera 182 to capture the still image and/or the moving image. According to an embodiment, the input about image capturing, received by the processor 120, may include an input for activating a camera (e.g., the first camera 181 and/or the second camera 182). The processor 120 may receive the input about image capturing, and may activate one of the first camera 181 and the second camera 182. According to an embodiment, the input about image capturing may include an input for switching, while one camera of the first camera 181 or the second camera 182 is activated, the other camera to an activated state.

According to certain embodiments, the processor 120 may activate one of cameras (e.g., the first camera 181 and/or the second camera 182), and may determine the activated camera. According to an embodiment, the processor 120 may determine whether the activated camera is the first camera 181 or the second camera 182.

According to certain embodiments, the processor 120 may deactivate at least a partial region of the region of a display (e.g., the first display 161 and/or the second display 162). According to an embodiment, when a camera (e.g., the first camera 181 and/or the second camera 182) is activated, the processor 120 may deactivate a pixel included in at least a partial region of the display, which corresponds to the camera or the field of view of the camera. According to an embodiment, the first display 161 may include a first region (e.g., the first region A1 in FIG. 5B) overlapping an effective aperture or the field of view of the first camera 181 and a second region (e.g., the second region A2 in FIG. 5B) surrounding the first region A1. According to an embodiment, the first region A1 may be formed to have light transmittance utilized by the first camera 181 by adjusting a pixel density and/or a wiring density to be relatively low. According to an embodiment, the second region A2 may include a normal active area, that is, a region in which a pixel density and/or a wiring density is high compared with the first region A1. According to an embodiment, the second region A2 may be a region in which the light transmittance for the camera (e.g., the first camera 181) is not considered. According to an embodiment, when the first camera 181 is activated, the processor 120 may deactivate at least one pixel corresponding to the first region A1 on the first display 161. According to an embodiment, the processor 120 may deactivate at least some of multiple pixels corresponding to the first region A1. According to an embodiment, the processor 120 may deactivate all pixels corresponding to the first region A1. According to an embodiment, the second display 162 may include a third region (e.g., the first region A1 in FIG. 5B) overlapping the effective aperture or the field of view of the second camera 182 and a fourth region (e.g., the second region A2 in FIG. 5B) surrounding the third region. According to an embodiment, the third region may be formed to have light transmittance utilized by the second camera 182 by adjusting a pixel density and/or a wiring density to be relatively low. According to an embodiment, the fourth region may include a normal active area, that is, a region in which a pixel density and/or a wiring density is high compared with the third region. According to an embodiment, the fourth region may be a region in which the light transmittance for the camera (e.g., the second camera 182) is not considered. According to an embodiment, when the second camera 182 is activated, the processor 120 may deactivate at least one pixel corresponding to the third region on the second display 162. According to an embodiment, the processor 120 may deactivate at least some of multiple pixels corresponding to the third region. According to an embodiment, the processor 120 may deactivate all pixels corresponding to the third region.

According to certain embodiments, the processor 120 may change a user interface so as to correspond to at least a part of the remaining region, which is not deactivated, in the region of the first display 161 and/or the second display 162. According to an embodiment, the processor 120 may change a user interface so as to correspond to the second region A2 on the first display 161. The second region may include at least a partial region of the remaining region of the first display 161, which surrounds the first region A1. The processor 120 may distinguish the first region A1 and the second region A2 in the remaining region other than the first region A1 on the first display 161. According to an embodiment, the processor 120 may read data designated about the range of the second region A2 in a memory (e.g., the memory 130 in FIG. 1) to determine the second region A2. According to an embodiment, the processor 120 may determine the first region A1, and may determine that a region within a designated distance from the first region A1 in the region of the first display 161 is the second region. According to an embodiment, the processor 120 may determine that a region including a graphical object (e.g., a window or a tool bar), which overlaps the first region A1 among graphical objects displayed on the first display 161 or is displayed in a region within the designated distance from the first region A1, is the second region. In this case, the shape and/or size of the second region may be changed based on a user interface.

According to certain embodiments, the processor 120 may change a user interface. Changing of a user interface may include operations for movement, enlargement, reduction, shape change, addition, and/or removal of at least one graphical object included in the user interface. According to an embodiment, the processor 120 may change, based on the second region A2, an object included in a user interface. According to an embodiment, the processor 120 may change a use interface, based on the form (e.g., shape or configuration) of the second region A2. The processor 120, for example, may move, based on the shape of the determined second region A2, multiple objects included in a user interface to realign or rearrange the multiple objects. Since the first region A1 may be in a deactivated state, the second region A2 may include a region other than the first region A1. According to an embodiment, the processor 120 may change a user interface by changing, among objects included in the user interface, an object overlapping the first region A1, an object positioned within the designated distance from the first region A1, and/or objects adjacent thereto.

According to certain embodiments, the processor 120 may determine information about the position of at least one object included in the user interface. For example, the processor 120 may determine information about a position in which a graphical object is displayed on the first display 161.

According to certain embodiments, the processor 120 may change a user interface, based on information about a position in which an object included in the user interface is displayed on the first display 161 and information about the position of the first region A1 on the first display 161. According to an embodiment, the processor 120 may change the user interface when a position, in which at least one graphical object is displayed on the first display 161, overlaps the first region A1. According to an embodiment, the processor 120 may change the user interface when a position, in which at least one graphical object is displayed on the first display 161, is within the designated distance from the first region A1. According to an embodiment, the processor 120 may change the user interface when a position of at least one graphical object, among graphical objects in the second region A2, overlaps the first region A1 or is within the designated distance from the first region A1. For example, the processor 120 may change the position of an object, which overlaps the first region A1 or is within the designated distance from the first region A, or may change, together with the position of the corresponding object, the position of another object adjacent to or positioned within a designated distance from the corresponding object, thereby realigning or rearranging multiple objects included in the user interface.

A description of a series of configurations and/or functions by which the processor 120 changes the user interface has been made with reference to an operation of controlling the first camera 181 and the first display 161, but may be made with reference to the second camera 182 and the second display 162. For example, a description of the first display 161 may correspond to the second display 162, a description of the first region A1 may correspond to the third region of the second display 162, a description of the second region A2 may correspond to the fourth region of the second display 162, and a description of the first camera 181 may correspond to the second camera 182.

According to certain embodiments, the processor 120 may execute an application. According to an embodiment, the application may be executed as a program (e.g., the program 140 in FIG. 1) which is stored as software in a memory (e.g., the memory 130 in FIG. 1). The application may include, for example, a home, dialer, SMS/MMS, browser, camera, alarm, voice recognition, e-mail, calendar, media player, album, or environment information (e.g., atmospheric pressure, humidity, or temperature information measurement) application. The processor 120 may execute an application stored in the memory 130 to perform a function provided by the application. According to an embodiment, the processor 120 may display an execution screen of the application on the first display 161 and/or the second display 162. The application may include a user interface including at least one graphical object, and the processor 120 may display the user interface including at least one object as the execution screen of the application on a display (e.g., the first display 161 and/or the second display 162). While an application is executed, the user interface may include at least one object which is to be displayed on an execution screen of the executed application.

According to certain embodiments, the processor 120 may determine, based on the executed application, whether to change the user interface. According to an embodiment, the processor 120 may activate a camera (e.g., the first camera 181 and/or the second camera 182) to deactivate at least a partial region of a display (e.g., the first display 161 and/or the second display 162). In this case, whether to change the user interface may be determined based on the executed and/or displayed application. According to an embodiment, the processor 120 may determine, based on a function of an application, whether to change the user interface. For example, the processor 120 may not change the user interface when an executed application includes a moving-image playback function.

According to certain embodiments, the processor 120 may simultaneously execute at least two applications (e.g., a first application and a second application). According to an embodiment, the processor 120 may simultaneously execute the first application and the second application, and may simultaneously display an execution screen of the first application and an execution screen of the second application on a display (e.g., the first display 161 and/or the second display 162). The processor 120 may display execution screens of multiple different applications in segments of the region on a display, respectively, or may display the execution screens such that some of the execution screens of the respective applications overlap each other. According to an embodiment, the processor 120 may display, on the display, a first user interface at least including the execution screen of the first application. For example, the processor 120 may display, on the display, the first user interface including at least one object as the execution screen of the first application. While the first application is executed, the first user interface may include at least one object which is to be displayed on the execution screen of the executed first application. According to an embodiment, the processor 120 may display, on the display, a second user interface at least including the execution screen of the second application. For example, the processor 120 may display, on the display, the second user interface including at least one object as the execution screen of the second application. While the second application is executed, the second user interface may include at least one object which is to be displayed on the execution screen of the executed second application. According to an embodiment, the processor 120 may simultaneously display the first user interface and the second user interface on the display. The processor 120 may divide a display screen into multiple windows and may display different user interfaces in regions corresponding to the windows, respectively.

According to certain embodiments, when a pixel corresponding to the first region (e.g., the first region A1 in FIG. 6) is deactivated while multiple user interfaces are displayed on one display (e.g., the first display 161), the processor 120 may determine a user interface to be changed among the multiple user interfaces. According to an embodiment, the processor 120 may determine a position of a region for displaying the first user interface and a position of a region for displaying the second user interface among regions of the first display 161. The processor 120 may determine a region overlapping the first region A1 among at least a partial region on the first display 161, corresponding to the first user interface, and at least a partial region of the first display 161 corresponding to the second user interface. According to an embodiment, the processor 120 may change a user interface, among the first user interface and the second user interface, in which a displayed region corresponds to a region overlapping the first region A1.

Figure 8:
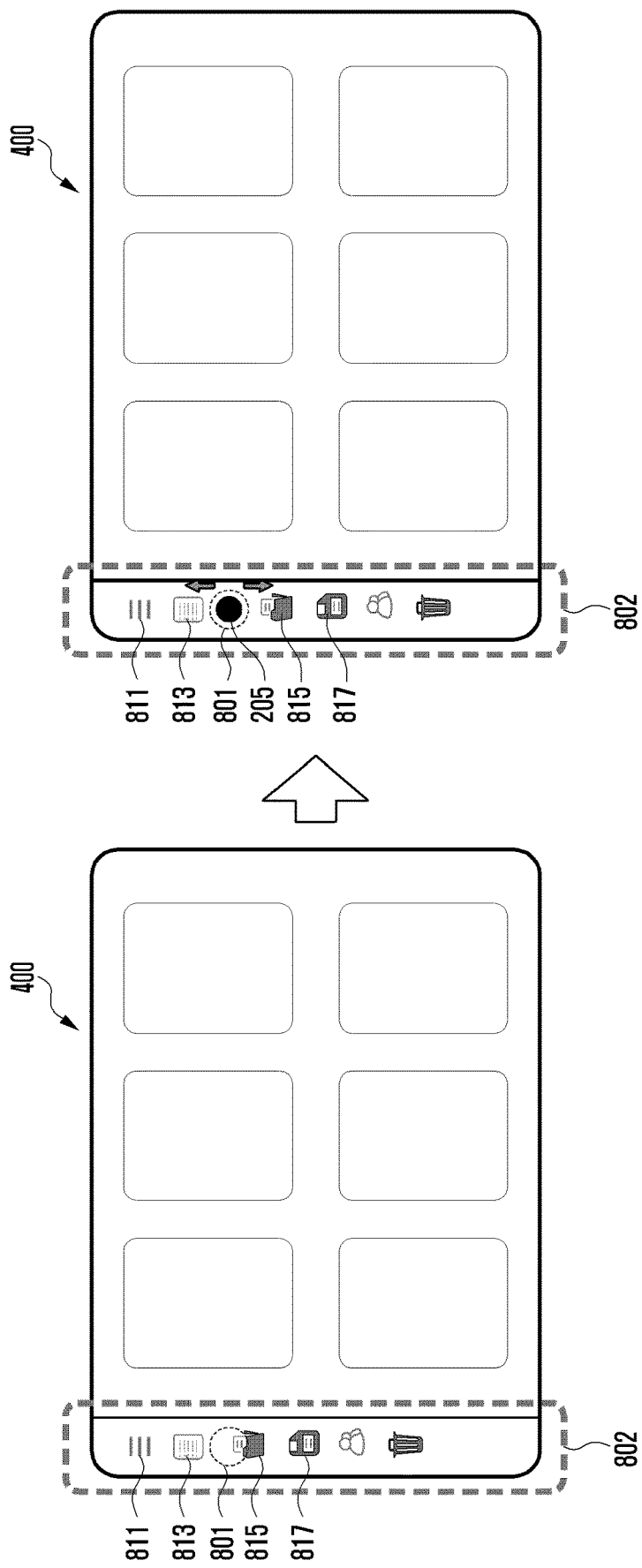
FIG. 8 shows an electronic device according to certain embodiments, which changes a user interface.

FIG. 8 shows an electronic device (e.g., the electronic device 101 in FIG. 7) according to certain embodiments, which changes a user interface.

Referring to FIG. 8, the electronic device 101 may control a display 400 (e.g., the display 400 in FIG. 4 or the first display 161 in FIG. 7) to display a user interface. The user interface may include at least one graphical object which is visually displayed. According to an embodiment, the user interface may include one or more graphics. At least one graphic and/or image object included in the user interface may be visually displayed on the display 400. According to an embodiment the user interface may include display of a region for reception of a user input, displaying information about the electronic device 101 or an application executable on the same, or displaying an execution screen of an application, and/or a related object, together in a predetermined region. For example, the object may include an icon, an input field, a badge, a button, a display window, a widget, and/or a tool bar. Referring to FIG. 8, the electronic device 101 may display, on the display 400, a user interface including an image object, such as a first icon 811, a second icon 813, a third icon 815, or a fourth icon 817. According to an embodiment, the object may include an object, visually displayed on the display, such as an image, text, and/or a figure indicating a predetermined region on the display. For example, the user interface may include a section surrounding the first icon 811, the second icon 813, the third icon 815, and the fourth icon 817, and all graphical objects which include a window for executing an application and are displayed on the display 400.

Referring to FIG. 8, the electronic device 101 may deactivate at least a partial region of the region of the display 400. According to an embodiment, when a camera 205 (e.g., the first camera module 205 in FIG. 2A or the first camera 181 in FIG. 7) is activated, the electronic device 101 may deactivate at least one pixel disposed in at least a partial region of the display 400, which corresponds to the camera 205 or the field of view of the camera 205. According to an embodiment, the display 400 may include a first region 801 that overlaps with an effective aperture or the field of view of the camera 205, and a second region 802 surrounding the first region 801. According to an embodiment, the first region 801 may be formed to include a light transmittance allowing for sufficient operation of the camera 205, by adjusting a pixel density and/or a wiring density so as to permit the desired transmittance of the first region 801 of the display. According to an embodiment, the second region 802 may include a normal active area, which may indicate a region in which a pixel density and/or a wiring density is higher than that of the first region 801. According to an embodiment, the second region 802 may be a region in which the light transmittance for the camera 205 is not considered. According to an embodiment, when the camera 205 is activated, the electronic device 101 may deactivate at least one pixel corresponding to the first region 801 on the display 400. According to an embodiment, the electronic device 101 may deactivate at least some of the pixels corresponding to the first region 801. According to an embodiment, the electronic device 101 may deactivate all pixels of the first region 801.

According to certain embodiments, the electronic device 101 may alter a user interface so as to correspond to at least a part of the remaining region, which is not deactivated, in the region of the display 400. According to an embodiment, the electronic device 101 may change a user interface so as to correspond to the second region 802 on the display 400. The second region may include at least a partial region of the remaining region of the display 400, which surrounds the first region 801. The electronic device 101 may distinguish between the first region 801 and the second region 802, in that the second region 802 includes a remaining display area of the sub-portion of the display that excludes the first region 801 on the display 400. According to an embodiment, the electronic device 101 may read data designating the range of the second region 802 in a memory (e.g., the memory 130 in FIG. 1) to determine the second region 802. According to an embodiment, the electronic device 101 may determine the first region 801, and may determine that a region within a designated distance from the first region 801 in the region of the display 400 is the second region 802. According to an embodiment, the electronic device 101 may identify the second region. For example, the electronic device 101 may determine that a region including a graphical object (e.g., a window or a tool bar) that overlaps the first region 801 is the second region. the electronic device 101 may determine that a region including a graphic disposed within the designated distance from the first region 801 is the second region. In this case, the shape and/or size of the second region 802 may be changed based on the user interface. Referring to FIG. 8, the second region 802 according to an embodiment may be limited to a region of a graphical object (e.g., a tool bar) which is positioned in a range in which the graphical object overlaps the first region 801. Alternatively, the second region 802 may be configured to be a window capable of including all of the third icon 815, which is a graphical object overlapping the first region 801, and the first icon 811, the second icon 813, and the fourth icon 817, which are adjacent thereto or parallel objects of an identical class, or the entire region of the display 400 except for the first region 801.

According to certain embodiments, the electronic device 101 may change a user interface. Changing of a user interface may include operations for movement, enlargement, reduction, shape change, addition, and/or removal of at least one graphical object (e.g., the first icon 811, the second icon 813, the third icon 815 and/or the fourth icon 817) included in the user interface. According to an embodiment, the electronic device 101 may change, based on the second region 802, an object included in a user interface. According to an embodiment, the electronic device 101 may change a use interface, based on the form of the second region 802. The electronic device 101, for example, may move, based on the shape of the determined second region 802, multiple objects included in a user interface to realign or rearrange the multiple objects. When the electronic device 101 changes a user interface, the first region 801 may be in a deactivated state, and thus the second region 802 may include a region other than the first region 801. According to an embodiment, the electronic device 101 may change a user interface by changing, among objects included in the user interface, an object overlapping the first region 801, an object positioned within the designated distance from the first region 801, and/or objects adjacent thereto. Referring to FIG. 8, when the camera 205 is activated, the electronic device 101 may move the third icon 815 overlapping the first region 801 to change the user interface. The electronic device 101 may change the user interface by moving, in order to move the third icon 815, another graphical object included in the user interface including the first icon 811, the second icon 813, and the fourth icon 817, which are objects adjacent to the third icon 815.

According to certain embodiments, the electronic device 101 may determine information about the position of at least one object included in the user interface. For example, the electronic device 101 may determine information about a position in which a graphical object is displayed on the display 400. Referring to FIG. 8, the electronic device 101 may determine each of positions in which graphical objects including the third icon 815 are displayed on the display 400.

According to certain embodiments, the electronic device 101 may change a user interface, based on information about a position in which an object included in the user interface is displayed on the display 400 and information about the position of the first region 801 on the display 400. According to an embodiment, the electronic device 101 may change the user interface when a position, in which at least one graphical object is displayed on the display 400, overlaps the first region 801. According to an embodiment, the electronic device 101 may change the user interface when a position, in which at least one graphical object is displayed on the display 400, is within the designated distance from the first region 801. Referring to FIG. 8, the third icon 815 is displayed such that the position of the first region 801 overlaps therewith, and the electronic device 101 may determine, based on thereon, to change the user interface. According to an embodiment, the electronic device 101 may change the user interface when a position of at least one graphical object, among graphical objects in the second region 802, overlaps the first region 801 or is within the designated distance from the first region 801. For example, the electronic device 101 may change the position of an object, which overlaps the first region 801 or is within the designated distance from the first region 801, or may change, together with the position of the corresponding object, the position of another object adjacent to or positioned within a designated distance from the corresponding object, thereby realigning or rearranging multiple objects included in the user interface. Referring to FIG. 8, the electronic device 101 may rearrange multiple graphical objects (e.g., the first icon 811, the second icon 813, and the fourth icon 817) adjacent to or positioned within a designated distance (e.g., within the second region 802), including the third icon 815, in a user interface displayed on the display 400.

Figure 9:
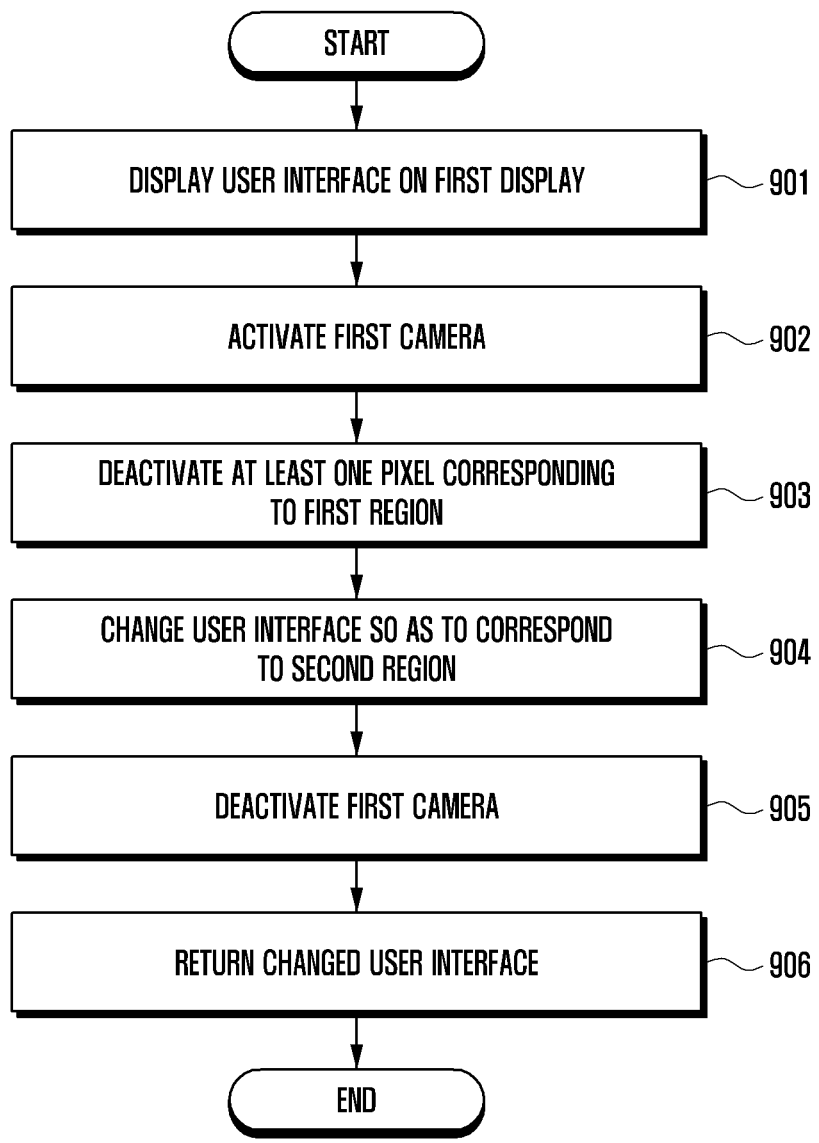
FIG. 9 is a flowchart showing operations of changing a user interface by an electronic device according to certain embodiments.

FIG. 9 is a flowchart showing operations of changing a user interface by an electronic device according to certain embodiments.

Referring to FIG. 9, multiple operations of changing a user interface by an electronic device (e.g., the electronic device 101 in FIG. 1 or the electronic device 101 in FIG. 7) may be considered to be operations performed by a processor (e.g., the processor 120 in FIG. 7) of the electronic device 101. Operations in FIG. 9 may be changed or replaced, and/or the order thereof may be switched, and a new operation may be added.

Referring to operation 901, the processor 120 may display a user interface on a first display (e.g., the first display 161 in FIG. 7). According to certain embodiments, the processor 120 may control the first display 161 to display a user interface. The user interface may include display of at least one graphical object. According to an embodiment, the user interface may include one or more graphic elements. At least one object included in the user interface may include an image object which may be visually displayed on a display (e.g., the first display 161). According to an embodiment, the at least one object included in the user interface may include an image object for displaying a region for reception of a user input, displaying information about the processor 120 or an application, or displaying an execution screen or a related object together in a predetermined region. For example, the object may include an icon, an input field, a badge, a button, a display window, a widget, and/or a tool bar. According to an embodiment, the object may include an object, which is visually displayed on the display, such as an image, text, and/or a figure indicating a predetermined region on the display. The object included in the user interface is not limited to the above-mentioned examples.

Referring to operation 902, the processor 120 may activate a first camera (e.g., the first camera 181 in FIG. 7). According to certain embodiments, the processor 120 may capture an image. According to an embodiment, the processor 120 may activate the first camera 181 to capture a still image and/or a moving image. The processor 120 may receive an input regarding still-image and/or moving-image capturing, and may control, based on the received input, the first camera 181 to capture a still image and/or a moving image. According to an embodiment, the input regarding image capturing, received by the processor 120, may include an input for activating a camera (e.g., the first camera 181). The processor 120 may receive the input regarding image capturing to activate the first camera 181.

Referring to operation 903, the processor 120 may deactivate at least one pixel of the display disposed within a first region (e.g., the first region A1 in FIG. 5B or the first region 801 in FIG. 8, which in some embodiments overlaps a field-of-view of the camera). According to certain embodiments, the processor 120 may deactivate at least a partial region (e.g., the first region) of the region of the first display 161. According to an embodiment, when the camera (e.g., the first camera 181) is activated, the processor 120 may deactivate a pixel included in at least a partial region of the first display 161 that corresponds to the camera or the field of view of the camera. According to an embodiment, the first display 161 may include a first region (e.g., the first region A1 in FIG. 5B or the first region 801 in FIG. 8) overlapping an effective aperture or the field of view of the first camera 181 and a second region (e.g., the second region A2 in FIG. 5B or the second region 802 in FIG. 8) surrounding the first region 801. According to an embodiment, the first region 801 may be formed to have light transmittance utilized by the first camera 181 by adjusting a pixel density and/or a wiring density to be relatively low. According to an embodiment, the second region 802 may include a normal active area, that is, a region in which a pixel density and/or a wiring density is high compared with the first region 801. According to an embodiment, the second region 802 may be a region in which the light transmittance for the camera (e.g., the first camera 181) is not considered. According to an embodiment, when the first camera 181 is activated, the processor 120 may deactivate at least one pixel corresponding to the first region 801 on the first display 161. According to an embodiment, the processor 120 may deactivate at least some of multiple pixels corresponding to the first region 801. According to an embodiment, the processor 120 may deactivate all pixels corresponding to the first region 801.

Referring to operation 904, the processor 120 may change the user interface so as to correspond to the second region. According to certain embodiments, the processor 120 may change the user interface so as to correspond to at least a part of the remaining region, which is not deactivated, in the region of the first display 161. According to an embodiment, the processor 120 may change the user interface by moving an element thereof from the first into the second region 802 on the first display 161. The second region may include at least a partial region of the remaining region of the first display 161, which surrounds the first region 801. The processor 120 may distinguish the first region 801 and the second region 802 in the remaining region other than the first region 801 on the first display 161. According to an embodiment, the processor 120 may read data designated about the range of the second region 802 in a memory (e.g., the memory 130 in FIG. 1) to determine the second region 802. According to an embodiment, the processor 120 may determine the first region 801, and may determine that a region within a designated distance from the first region 801 in the region of the first display 161 is the second region 802. According to an embodiment, the processor 120 may determine that a region including a graphical object (e.g., a window or a tool bar), which overlaps the first region 801 or is displayed in a region within the designated distance from the first region 801, among graphical objects displayed on the first display 161 is the second region. In this case, the shape and/or size of the second region 802 may be changed based on the user interface.

Referring to operation 905, the processor 120 may deactivate the first camera 181. According to certain embodiments, the processor 120 may receive an input regarding still-image and/or moving-image capturing, and may control, based on the received input, the first camera 181 to capture a still image and/or a moving image. According to an embodiment, the input regarding image capturing, received by the processor 120, may include an input for deactivating a camera (e.g., the first camera 181). The processor 120 may receive the input regarding image capturing to deactivate the first camera 181. According to an embodiment, when the electronic device 101 includes multiple cameras (e.g., the first camera 181 and the second camera 182 in FIG. 7), the input regarding image capturing may include an input for switching the cameras. For example, the processor 120 may receive, while activating the first camera 181, an input for switching an activated camera from the first camera 181 to the second camera 182. When the processor 120 receives the camera-switching input while activating the first camera 181, the processor 120 may deactivate the first camera 181 and activate the second camera 182.

Referring to operation 906, the processor 120 may return the changed user interface. According to certain embodiments, when the first camera 181 is deactivated, the processor 120 may reactivate the first region 801 that was previously deactivated, in response to a present deactivation of the first camera 181. In this case, the first display 161 returns to a state in which the entire region thereof is activated, and thus the processor 120 may return the user interface changed in operation 904 to a state before being changed.

Figure 10:
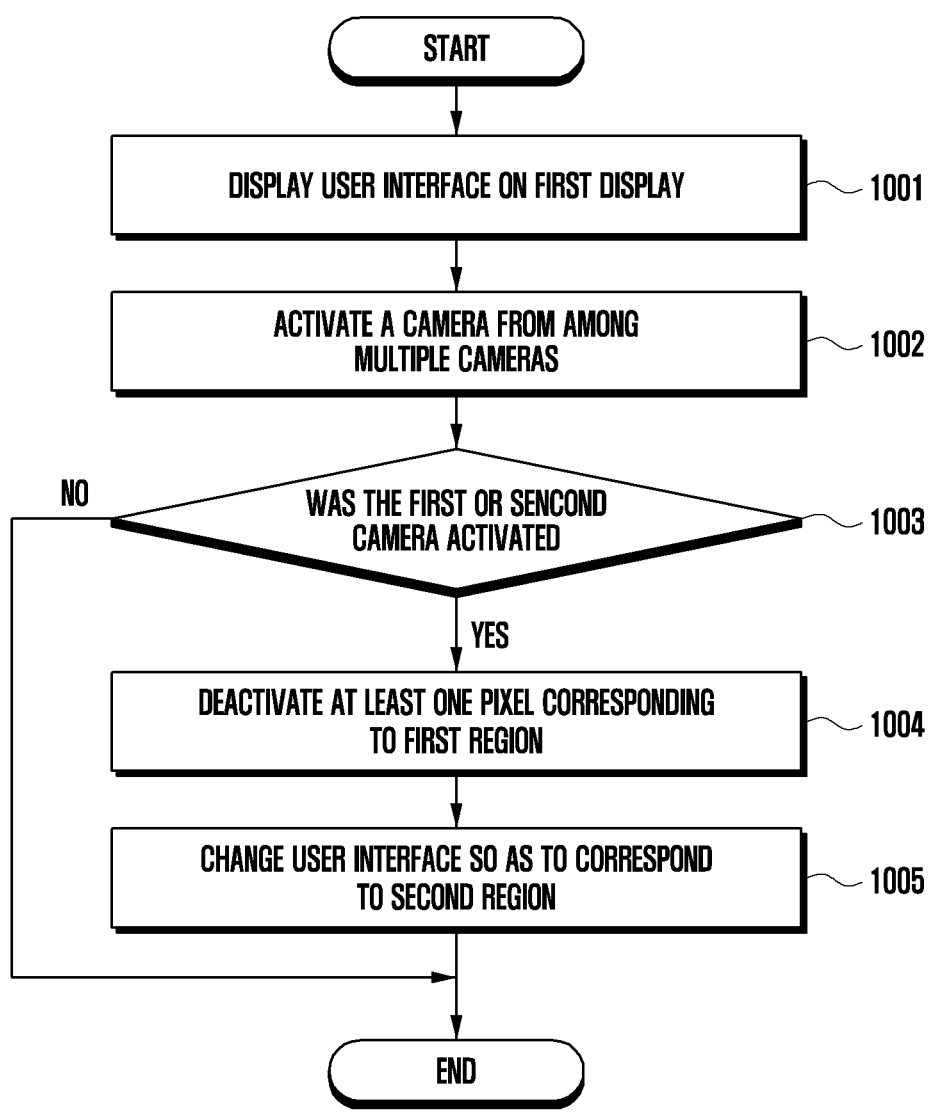
FIG. 10 is a flowchart showing operations of changing a user interface by an electronic device including at least one camera according to certain embodiments.

FIG. 10 is a flowchart showing operations of changing a user interface by an electronic device including at least one camera according to certain embodiments.

Referring to FIG. 10, multiple operations of changing a user interface by an electronic device (e.g., the electronic device 101 in FIG. 1 or the electronic device 101 in FIG. 7) may be considered to be operations performed by a processor (e.g., the processor 120 in FIG. 7) of the electronic device 101. Operations in FIG. 10 may be changed, may be replaced, and/or may be switched in the order thereof, and a new operation may be added.

Referring to operation 1001, the processor 120 may display a user interface on a first display (e.g., the first display 161 in FIG. 7). According to certain embodiments, the processor 120 may control the first display 161 to display a user interface. The user interface may include at least one graphical object which is visually displayed. According to an embodiment, the user interface may include a graphical user interface. At least one object included in the user interface may include an image object which may be visually displayed on a display (e.g., the first display 161). According to an embodiment, the at least one object included in the user interface may include an image object for displaying a region for reception of a user input, displaying information about the processor 120 or an application, or displaying an execution screen or a related object together in a predetermined region. For example, the object may include an icon, an input field, a badge, a button, a display window, a widget, and/or a tool bar. According to an embodiment, the object may include an object, which is visually displayed on the display, such as an image, text, and/or a figure indicating a predetermined region on the display. The object included in the user interface is not limited to the above-mentioned examples.

Referring to operation 1002, the processor 120 may activate a camera (e.g., the first camera 181 and/or the second camera 182 in FIG. 7). According to certain embodiments, the processor 120 may activate a camera to capture an image. According to an embodiment, the processor 120 may use the first camera 181 and/or the second camera 182 to capture a still image and/or a moving image. The processor 120 may receive an input regarding still-image and/or moving-image capturing, and may control, based on the received input, the camera to capture a still image and/or a moving image. According to an embodiment, the input regarding image capturing, received by the processor 120, may include an input for activating a camera (e.g., the first camera 181 and/or the second camera 182). The processor 120 may receive the input regarding image capturing to activate the camera.

Referring to operation 1003, the processor 120 may determine whether the activated camera is a first camera (e.g., the first camera 181 in FIG. 7) or another camera (e.g., a second non-UDC camera). According to certain embodiments, the processor 120 may activate one of cameras (e.g., the first camera 181 and/or the second camera 182), and may determine the activated camera. When the electronic device 101 includes multiple cameras (e.g., the first camera 181 and the second camera 182), the processor 120 may determine which camera is a camera activated at the time of camera activation. According to an embodiment, the processor 120 may determine whether the activated camera is the first camera 181 or the second camera 182. When it is determined that the activated camera is the first camera 181, the processor 120 moves to operation 1004.

Referring to operation 1004, the processor 120 may deactivate at least one pixel corresponding to a first region (e.g., the first region A1 in FIG. 5B or the first region 801 in FIG. 8). According to certain embodiments, the processor 120 may deactivate at least a partial region (e.g., the first region 801) of a display (e.g., the first display 161), which is disposed to overlap the activated camera (e.g., the first camera 181) determined in operation 1003. According to certain embodiments, the processor 120 may deactivate at least a partial region (e.g., the first region) of the region of the first display 161. According to an embodiment, when the camera (e.g., the first camera 181) is activated, the processor 120 may deactivate a pixel included in at least a partial region of the first display 161, which corresponds to the first camera 181 or the field of view of the first camera 181. According to an embodiment, the first display 161 may include a first region (e.g., the first region A1 in FIG. 5B or the first region 801 in FIG. 8) overlapping an effective aperture or the field of view of the first camera 181, and a second region (e.g., the second region A2 in FIG. 5B or the second region 802 in FIG. 8) surrounding the first region 801. According to an embodiment, the first region 801 may be formed to have light transmittance utilized by the first camera 181 by adjusting a pixel density and/or a wiring density to be relatively low. According to an embodiment, the second region 802 may include a normal active area, that is, a region in which a pixel density and/or a wiring density is high compared with the first region 801. According to an embodiment, the second region 802 may be a region in which the light transmittance for a camera (e.g., the first camera 181) is not considered. According to an embodiment, when the first camera 181 is activated, the processor 120 may deactivate at least one pixel corresponding to the first region 801 on the first display 161. According to an embodiment, the processor 120 may deactivate at least some of multiple pixels corresponding to the first region 801. According to an embodiment, the processor 120 may deactivate all pixels corresponding to the first region 801.

Referring to operation 1005, the processor 120 may change the user interface so as to correspond to the second region 802. According to certain embodiments, the processor 120 may change the user interface so as to correspond to at least a part of the remaining region, which is not deactivated, in the region of the first display 161. According to an embodiment, the processor 120 may change the user interface so as to correspond to the second region 802 on the first display 161. The second region may include at least a partial region of the remaining region of the first display 161, which surrounds the first region 801. The processor 120 may distinguish the first region 801 and the second region 802 in the remaining region other than the first region 801 on the first display 161. According to an embodiment, the processor 120 may read data designated about the range of the second region 802 in a memory (e.g., the memory 130 in FIG. 1) to determine the second region 802. According to an embodiment, the processor 120 may determine the first region 801, and may determine that a region within a designated distance from the first region 801 in the region of the first display 161 is the second region 802. According to an embodiment, the processor 120 may determine that a region including a graphical object (e.g., a window or a tool bar), which overlaps the first region 801 or is displayed in a region within the designated distance from the first region 801, among graphical objects displayed on the first display 161 is the second region. In this case, the shape and/or size of the second region 802 may be changed based on the user interface.

Figure 11:
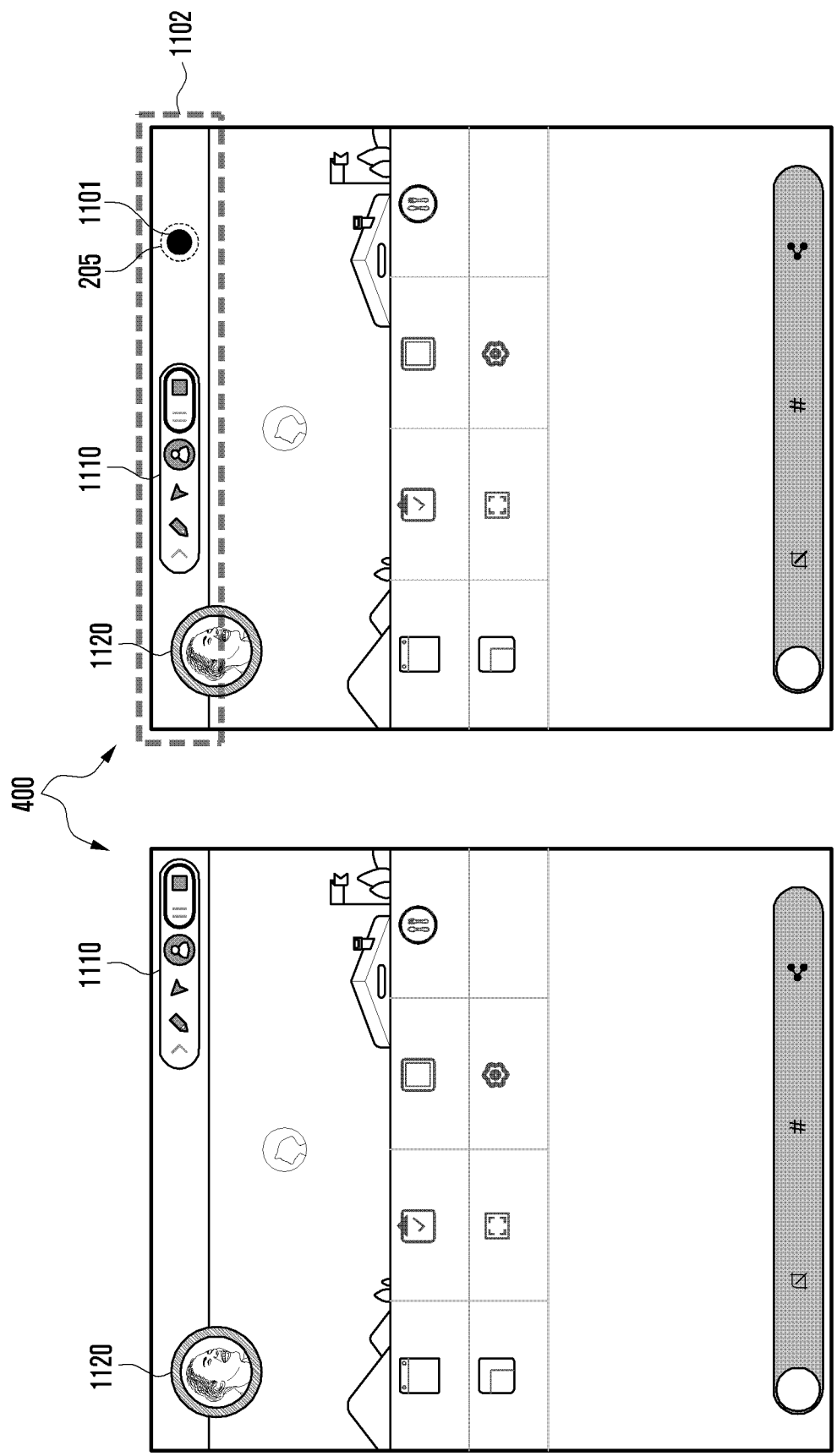
FIG. 11 shows an electronic device according to certain embodiments, which changes a user interface based on a position in which an object is displayed.

FIG. 11 shows an electronic device according to certain embodiments, which changes a user interface based on a position in which an object is displayed.

Referring to FIG. 11, the electronic device 101 may control a display 400 (e.g., the display 400 in FIG. 4 or the first display 161 in FIG. 7) to display a user interface. The user interface may include display of at least one graphical object. According to an embodiment, the user interface may be a graphical user interface. At least one object included in the user interface may include an image object that is visually displayed on the display 400. According to an embodiment, the at least one object included in the user interface may include an image object for indicating a region for reception of a user input, displaying information about the electronic device 101 or an application, or displaying an execution screen or a related object together in a predetermined region. For example, the object may include an icon, an input field, a badge, a button, a display window, a widget, and/or a tool bar. Referring to FIG. 11, the electronic device 101 may display, on the display 400, a user interface including an image object, such as a first icon 1110 or a second icon 1120. According to an embodiment, the object may include an object, visually displayed on the display, such as an image, text, and/or a figure indicating a predetermined region on the display. For example, the user interface may include a section surrounding the first icon 1110 and the second icon 1120, and all graphical objects which include a window for executing an application and are displayed on the display 400.

Referring to FIG. 11, the electronic device 101 may deactivate at least a partial region of the region of the display 400. According to an embodiment, when a camera 205 (e.g., the first camera module 205 in FIG. 2A or the first camera 181 in FIG. 7) is activated, the electronic device 101 may deactivate a pixel included in at least a partial region of the display 400, which is disposed overlaying and proximate to the camera 205 and/or overlaps the field of view of the camera 205. According to an embodiment, the display 400 may, for example, include a first region 1101 overlapping an effective aperture or the field of view of the camera 205 and a second region 1102 surrounding the first region 1101. According to an embodiment, the first region 1101 may include alight transmittance enabling operation of the camera 205 by selection of a pixel density and/or a wiring density of the first region of the display. According to an embodiment, the second region 1102 may include a normal active area, that is, a region in which a pixel density and/or a wiring density is higher compared with the first region 1101. According to an embodiment, the second region 1102 may be a region in which the light transmittance for the camera 205 is not considered. According to an embodiment, when the camera 205 is activated, the electronic device 101 may deactivate at least one pixel corresponding to the first region 1101 on the display 400. According to an embodiment, the electronic device 101 may deactivate at least some of multiple pixels corresponding to the first region 1101. According to an embodiment, the electronic device 101 may deactivate all pixels corresponding to the first region 1101.

According to certain embodiments, the electronic device 101 may change a user interface so as to correspond to at least a part of the remaining region, which is not deactivated, in the region of the display 400. According to an embodiment, the electronic device 101 may change a user interface so as to correspond to the second region 1102 on the display 400. The second region may include at least a partial region of the remaining region of the display 400, which surrounds the first region 1101. The electronic device 101 may distinguish the first region 1101 and the second region 1102 in the remaining region other than the first region 1101 on the display 400. According to an embodiment, the electronic device 101 may read data indicating a range of the second region 1102 in a memory (e.g., the memory 130 in FIG. 1), to determine the second region 1102. According to an embodiment, the electronic device 101 may determine the first region 1101, and may determine that a region disposed within a designated distance from the first region 1101 in the region of the display 400 is the second region 1102. According to an embodiment, the electronic device 101 may determine that the second region is a region including a graphical object (e.g., a window or a tool bar) that overlaps the first region 1101 or is displayed in a region within the designated distance from the first region 1101, from among graphical objects displayed on the display 400 is the second region. In this case, the shape and/or size of the second region 1102 may be changed based on the user interface.

Referring to FIG. 11, the second region 1102 according to an embodiment may be limited to a region of a graphical object (e.g., an upper-end bar) positioned in a range in which the graphical object overlaps the first region 1101. Alternatively, the second region 1102 may be configured to be a window capable of including the first icon 1110, which is a graphical object overlapping the first region 1101, or the entire region of the display 400 except for the first region 1101.

According to certain embodiments, the electronic device 101 may change a user interface. Changing of a user interface may include operations for movement, enlargement, reduction, shape change, addition, and/or removal of at least one graphical object (e.g., the first icon 1110 and/or the second icon 1120) included in the user interface. According to an embodiment, the electronic device 101 may change a user interface by changing, among objects included in the user interface, an object overlapping the first region 1101, an object positioned within the designated distance from the first region 1101, and/or objects adjacent thereto. Referring to FIG. 11, when the camera 205 is activated, the electronic device 101 may change the user interface to accommodate operation of the camera by moving the first icon 1110 away from overlapping the first region 1101. This operation may be executed in absence of any change to the second icon 1120, which is already spaced apart from the first region 1101 and positioned in a range in which the second icon 1120 did not overlap the first icon 1110, even when the first icon 1110 is moved. For example, no changes are made to any graphical object disposed outside a range of a designated distance from the first region 1101. The electronic device 101 may move the first icon 1110 to change the user interface.

According to certain embodiments, the electronic device 101 may determine information about the position of at least one object included in the user interface. For example, the electronic device 101 may determine information about a position in which a graphical object is displayed on the display 400. Referring to FIG. 11, the electronic device 101 may determine each of positions in which graphical objects including the first icon 1110 and the second icon 1120 are displayed on the display 400.

According to certain embodiments, the electronic device 101 may change the user interface, based on information about a position in which an object included in the user interface is displayed on the display 400 and information about the position of the first region 1101 on the display 400. According to an embodiment, the electronic device 101 may change the user interface when a position, in which at least one graphical object is displayed on the display 400, overlaps the first region 1101. According to an embodiment, the electronic device 101 may change the user interface when a position, in which at least one graphical object is displayed on the display 400, is within the designated distance from the first region 1101.

Referring to FIG. 11, the first icon 1110 is displayed such that the position of the first region 1101 overlaps therewith, and the electronic device 101 may determine, based thereon, to change the user interface. According to an embodiment, the electronic device 101 may change the user interface when a position of at least one graphical object, among graphical objects in the second region 1102, overlaps the first region 1101 or is within the designated distance from the first region 1101. For example, the electronic device 101 may change the position of an object, which overlaps the first region 1101 or is within the designated distance from the first region 1101, or may change, together with the position of the corresponding object, the position of another object adjacent to or positioned within a designated distance from the corresponding object, thereby realigning or rearranging multiple objects included in the user interface.

Figure 12:
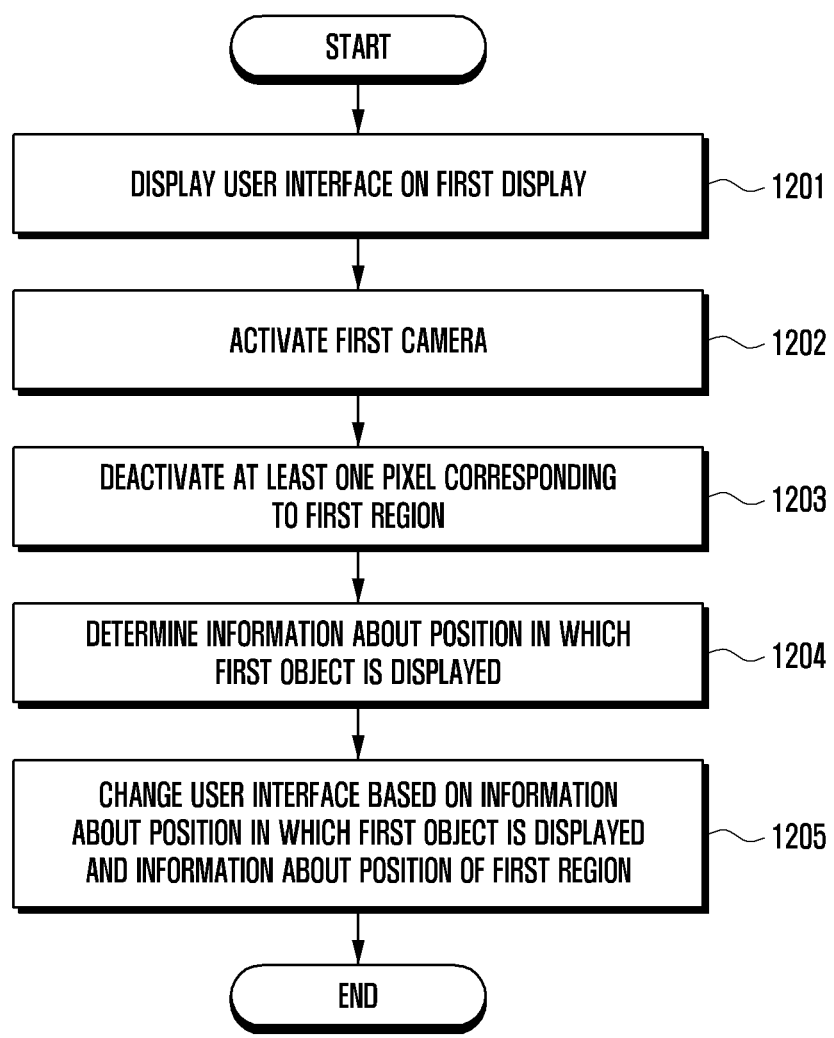
FIG. 12 is a flowchart showing operations in which an electronic device according to certain embodiments changes a user interface, based on a position in which an object is displayed.

FIG. 12 is a flowchart showing operations in which an electronic device according to certain embodiments changes a user interface, based on a position in which an object is displayed.

Referring to FIG. 12, multiple operations of changing a user interface by an electronic device (e.g., the electronic device 101 in FIG. 1 or the electronic device 101 in FIG. 7) may be considered to be operations performed by a processor (e.g., the processor 120 in FIG. 7) of the electronic device 101. Operations in FIG. 12 may be changed, may be replaced, and/or may be switched in the order thereof, and a new operation may be added.

Referring to operation 1201, the processor 120 may display a user interface on a first display (e.g., the first display 161 in FIG. 7). According to certain embodiments, the processor 120 may control the first display 161 to display a user interface. The user interface may include at least one graphical object which is visually displayed. According to an embodiment, the user interface may include a graphical user interface. At least one object included in the user interface may include an image object which may be visually displayed on a display (e.g., the first display 161). According to an embodiment, the at least one object included in the user interface may include an image object for displaying a region for reception of a user input, displaying information about the processor 120 or an application, or displaying an execution screen or a related object together in a predetermined region. For example, the object may include an icon, an input field, a badge, a button, a display window, a widget, and/or a tool bar. According to an embodiment, the object may include an object, which is visually displayed on the display, such as an image, text, and/or a figure indicating a predetermined region on the display. The object included in the user interface is not limited to the above-mentioned examples.

Referring to operation 1202, the processor 120 may activate a first camera (e.g., the first camera 181 in FIG. 7). According to certain embodiments, the processor 120 may capture an image. According to an embodiment, the processor 120 may use the first camera 181 to capture a still image and/or a moving image. The processor 120 may receive an input regarding still-image and/or moving-image capturing, and may control, based on the received input, the first camera 181 to capture a still image and/or a moving image. According to an embodiment, the input regarding image capturing, received by the processor 120, may include an input for activating a camera (e.g., the first camera 181). The processor 120 may receive the input regarding image capturing to activate the first camera 181.

Referring to operation 1203, the processor 120 may deactivate at least one pixel corresponding to a first region (e.g., the first region A1 in FIG. 5B or the first region 801 in FIG. 8). According to certain embodiments, the processor 120 may deactivate at least a partial region (e.g., the first region) of the region of the first display 161. According to an embodiment, when the camera (e.g., the first camera 181) is activated, the processor 120 may deactivate a pixel included in at least a partial region of the first display 161 that corresponds to the camera or the field of view of the camera. According to an embodiment, the first display 161 may include a first region (e.g., the first region A1 in FIG. 5B or the first region 801 in FIG. 8) overlapping an effective aperture or the field of view of the first camera 181 and a second region (e.g., the second region A2 in FIG. 5B or the second region 802 in FIG. 8) surrounding the first region 801. According to an embodiment, the first region 801 may be formed to have light transmittance utilized by the first camera 181 by adjusting a pixel density and/or a wiring density to be relatively low. According to an embodiment, the second region 802 may include a normal active area, that is, a region in which a pixel density and/or a wiring density is high compared with the first region 801. According to an embodiment, the second region 802 may be a region in which the light transmittance for the camera (e.g., the first camera 181) is not considered. According to an embodiment, when the first camera 181 is activated, the processor 120 may deactivate at least one pixel corresponding to the first region 801 on the first display 161. According to an embodiment, the processor 120 may deactivate at least some of multiple pixels corresponding to the first region 801. According to an embodiment, the processor 120 may deactivate all pixels corresponding to the first region 801.

Referring to operation 1204, the processor 120 may determine information indicative of a position at which a first object (e.g., the third icon 815 in FIG. 8) is displayed. The first object may include at least one graphical object included in the user interface. According to certain embodiments, the processor 120 may determine information about the position of at least one object (e.g., the first object) included in the user interface. For example, the processor 120 may determine information about a position at which a graphical object is displayed on the first display 161.

Referring to operation 1205, the processor 120 may change the user interface, based on the information about a position in which the first object is displayed, and information about the first region. According to certain embodiments, the processor 120 may change the user interface, based on information about a position in which an object included in the user interface is displayed on the first display 161 and information about the position of the first region 801 on the first display 161. According to an embodiment, the processor 120 may change the user interface when a position, in which at least one graphical object is displayed on the first display 161, overlaps the first region 801. According to an embodiment, the processor 120 may change the user interface when a position, in which at least one graphical object is displayed on the first display 161, is disposed within a designated distance from the first region 801. According to an embodiment, the processor 120 may change the user interface when a position of at least one of graphical objects in the second region 802 overlaps the first region 801 or is within a designated distance from the first region 801. For example, the processor 120 may change the position of an object which overlaps the first region 801 or is within the designated distance from the first region 801, or may change, together with the position of the corresponding object, the position of another object adjacent to or positioned within a designated distance from the corresponding object, thereby realigning or rearranging multiple objects included in the user interface.

Figure 13:
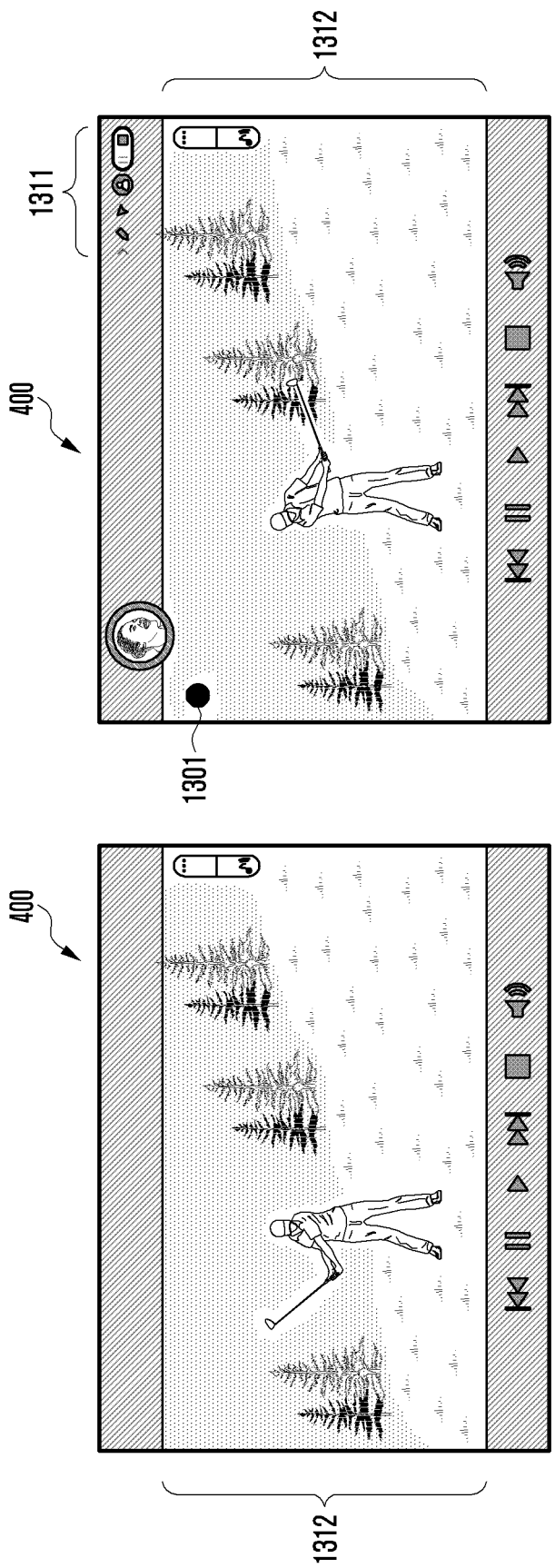
FIG. 13 shows an electronic device according to certain embodiments, which changes a user interface based on an executed application.

FIG. 13 shows an electronic device according to certain embodiments, which changes a user interface based on an executed application.

According to certain embodiments, the electronic device 101 may determine whether to change a user interface, based on an executed application. According to an embodiment, the electronic device 101 may activate a camera (e.g., the first camera 181 in FIG. 7) to deactivate at least a partial region of a display 400 (e.g., the first display 161 in FIG. 7). In this case, whether to change the user interface may be determined based on an executed and/or displayed application. According to an embodiment, the electronic device 101 may determine whether to change the user interface, based on a function of an application. For example, the electronic device 101 may not change the user interface when an executed application includes a moving-image playback function.

Referring to FIG. 13, the electronic device 101 may execute a first application (e.g., a media player) including a moving-image (e.g., video, animated image, etc.) playback function. The electronic device 101 may display a user interface corresponding to the first application on the display 400. As seen in FIG. 13, the electronic device 101 may display a moving-image playback window 1312 on the user interface of the first application. Furthermore, a first icon 1311 that corresponds to a video call function may be displayed while the camera is executed. In this case, the playback window 1312 and a first region 1301 (in which the camera is disposed) overlap with each other, and thus, the electronic device 101 may avoid changing or altering the playback window 1312 in order to prioritize a smooth viewing experience of the moving image for the user. When the first application including the moving-image playback function is executed, the electronic device 101 may pause any changes to the user interface.

According to an embodiment, the electronic device 101 may determine whether to change the user interface, based on whether an execution screen (e.g., the playback window 1312) of the first application including the moving-image playback function overlaps the first region 1301. As noted above, a smooth viewing experience may be prioritized over the camera operation. Accordingly when the first application is executed, the electronic device 101 may pause changes in the user interface when overlap is detected. Alternatively, the user interface may be changed when the execution screen of the first application is detected as having no overlap with the first region 1301.

Figure 14:
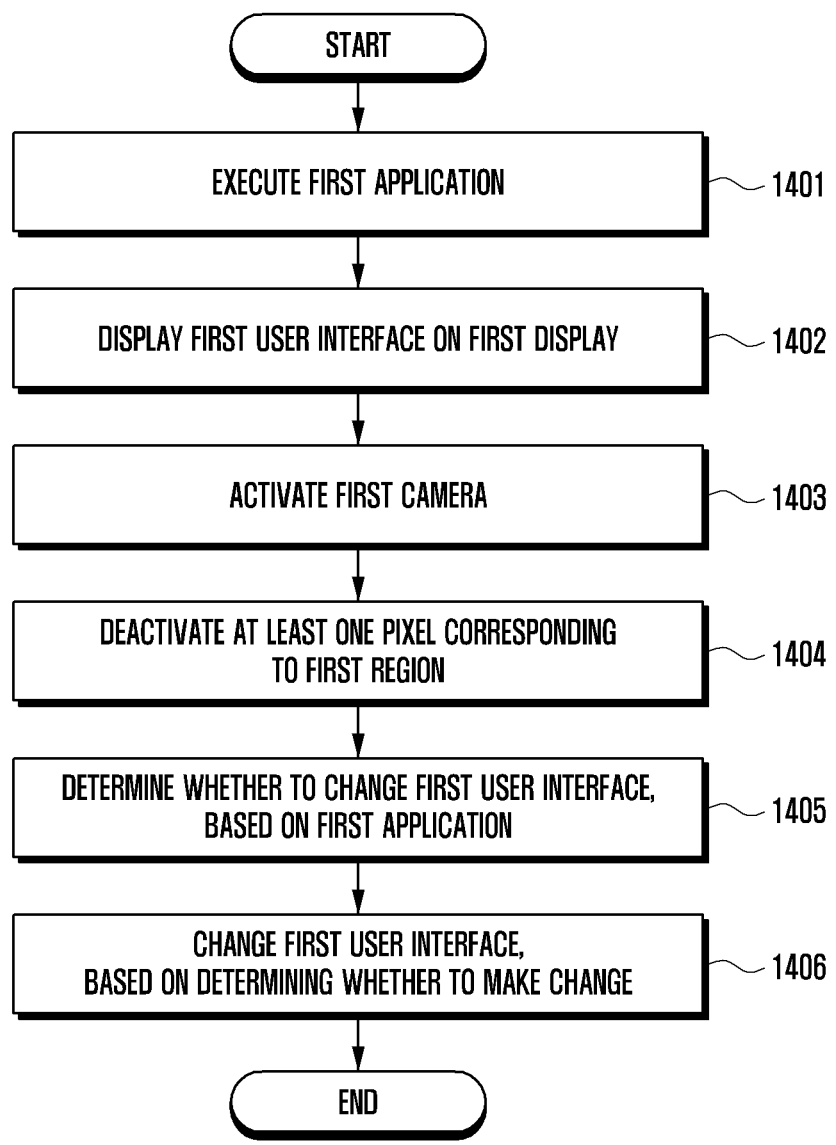
FIG. 14 is a flowchart of operations in which an electronic device according to certain embodiments changes a user interface, based on an executed application.

FIG. 14 is a flowchart showing operations in which an electronic device according to certain embodiments changes a user interface, based on an executed application.

Referring to FIG. 14, multiple operations of changing a user interface by an electronic device (e.g., the electronic device 101 in FIG. 1 or the electronic device 101 in FIG. 7) may be considered to be operations performed by a processor (e.g., the processor 120 in FIG. 7) of the electronic device 101. Operations in FIG. 14 may be changed, may be replaced, and/or may be switched in the order thereof, and a new operation may be added.

Referring to operation 1401, the processor 120 may execute a first application. According to certain embodiments, the processor 120 may execute various applications. According to an embodiment, the application may be executed as a program (e.g., the program 140 in FIG. 1) which is stored as software in a memory (e.g., the memory 130 in FIG. 1). The application may include, for example, a home, dialer, SMS/MMS, browser, camera, alarm, voice recognition, e-mail, calendar, media player, album, or environment information (e.g., atmospheric pressure, humidity, or temperature information measurement) application. The processor 120 may execute an application stored in the memory 130 to perform a function provided by the application.

Referring to operation 1402, the processor 120 may display a user interface on a first display (e.g., the first display 161 in FIG. 7). According to certain embodiments, the processor 120 may control the first display 161 to display a user interface. According to an embodiment, the processor 120 may display an execution screen of an application on the first display 161. The application may include a user interface including at least one graphical object, and the processor 120 may display, on a display (e.g., the first display 161), a user interface including at least one object as an application execution screen. While an application is executed, the user interface may include at least one object which is to be displayed on an execution screen of the executed application. The user interface may include at least one graphical object which is visually displayed. According to an embodiment, the user interface may include a graphical user interface. At least one object included in the user interface may include an image object which may be visually displayed on a display (e.g., the first display 161). According to an embodiment, the at least one object included in the user interface may include an image object for displaying a region for reception of a user input, displaying information about the processor 120 or an application, or displaying an execution screen or a related object together in a predetermined region. For example, the object may include an icon, an input field, a badge, a button, a display window, a widget, and/or a tool bar. According to an embodiment, the object may include an object, which is visually displayed on the display, such as an image, text, and/or a figure indicating a predetermined region on the display.

Referring to operation 1403, the processor 120 may activate a first camera (e.g., the first camera 181 in FIG. 7). According to certain embodiments, the processor 120 may capture an image. According to an embodiment, the processor 120 may use the first camera 181 to capture a still image and/or a moving image. The processor 120 may receive an input regarding still-image and/or moving-image capturing, and may control, based on the received input, the first camera 181 to capture a still image and/or a moving image. According to an embodiment, the input regarding image capturing, received by the processor 120, may include an input for activating a camera (e.g., the first camera 181). The processor 120 may receive the input regarding image capturing to activate the first camera 181.

Referring to operation 1404, the processor 120 may deactivate at least one pixel corresponding to a first region (e.g., the first region A1 in FIG. 5B or the first region 801 in FIG. 8). According to certain embodiments, the processor 120 may deactivate at least a partial region (e.g., the first region) of the region of the first display 161. According to an embodiment, when the camera (e.g., the first camera 181) is activated, the processor 120 may deactivate a pixel included in at least a partial region of the first display 161 that corresponds to the camera or the field of view of the camera. According to an embodiment, the first display 161 may include a first region (e.g., the first region A1 in FIG. 5B or the first region 801 in FIG. 8) overlapping an effective aperture or the field of view of the first camera 181 and a second region (e.g., the second region A2 in FIG. 5B or the second region 802 in FIG. 8) surrounding the first region 801. According to an embodiment, the first region 801 may be formed to have light transmittance utilized by the first camera 181 by adjusting a pixel density and/or a wiring density to be relatively low. According to an embodiment, the second region 802 may include a normal active area, that is, a region in which a pixel density and/or a wiring density is high compared with the first region 801. According to an embodiment, the second region 802 may be a region in which the light transmittance for the camera (e.g., the first camera 181) is not considered. According to an embodiment, when the first camera 181 is activated, the processor 120 may deactivate at least one pixel corresponding to the first region 801 on the first display 161. According to an embodiment, the processor 120 may deactivate at least some of multiple pixels corresponding to the first region 801. According to an embodiment, the processor 120 may deactivate all pixels corresponding to the first region 801.

Referring to operation 1405, the processor 120 may determine whether to change a first user interface, based on one or more characteristics, configurations, settings, operations, etc. of the first application. According to certain embodiments, the processor 120 may determine whether to change the user interface, based on the executed application. According to an embodiment, the processor 120 may activate the camera (e.g., the first camera 181 in FIG. 7) to deactivate at least a partial region of the display 400 (e.g., the first display 161 in FIG. 7). In this case, determining whether to change the user interface may be based on the executed and/or displayed application. According to an embodiment, the processor 120 may determine, based on a function of an application, whether to change the user interface. For example, when the executed application includes a moving-image playback function, the processor 120 may pause or preclude any changes to the user interface to prioritize smooth playback of the moving-image. According to an embodiment, the processor 120 may execute the first application (e.g., a media player) including a moving-image playback function. The processor 120 may display a user interface corresponding to the first application on the display 400. For example, the processor 120 may display a moving-image playback window in the middle of the user interface corresponding to the first application. In this case, when the first application including a moving-image playback function is executed, the processor 120 may not change the user interface in order to allow a user to smoothly watch a moving image. According to an embodiment, the processor 120 may determine whether to change the user interface, based on whether an execution screen of the first application including a moving-image playback function overlaps the first region 1301. Even while the first application is executed, the processor 120 may change the user interface when the execution screen of the first application does not overlap the first region.

Referring to operation 1406, the processor 120 may change the first user interface, upon determining that the one or more characteristics, configurations, settings, operations of the first application permit such a change. (Alternatively, if it is determined to pause or preclude any such changes, no change to the first user interface is executed). According to an embodiment, the processor 120 may change a user interface so as to correspond to at least a part of the remaining region, which is not deactivated, in the region of the first display 161. According to an embodiment, the processor 120 may change the user interface so as to correspond to the second region 802 on the first display 161. The second region may include at least a partial region of the remaining region of the first display 161, which surrounds the first region 801. The processor 120 may distinguish the first region 801 and the second region 802 in the remaining region other than the first region 801 on the first display 161. According to an embodiment, the processor 120 may read data designated about the range of the second region 802 in a memory (e.g., the memory 130 in FIG. 1) to determine the second region 802. According to an embodiment, the processor 120 may determine the first region 801, and may determine that a region within a designated distance from the first region 801 in the region of the first display 161 is the second region 802. According to an embodiment, the processor 120 may determine that a region including a graphical object (e.g., a window or a tool bar), which overlaps the first region 801 or is displayed in a region within the designated distance from the first region 801, among graphical objects displayed on the first display 161 is the second region. In this case, the shape and/or size of the second region 802 may be changed based on the user interface.

Figure 15:
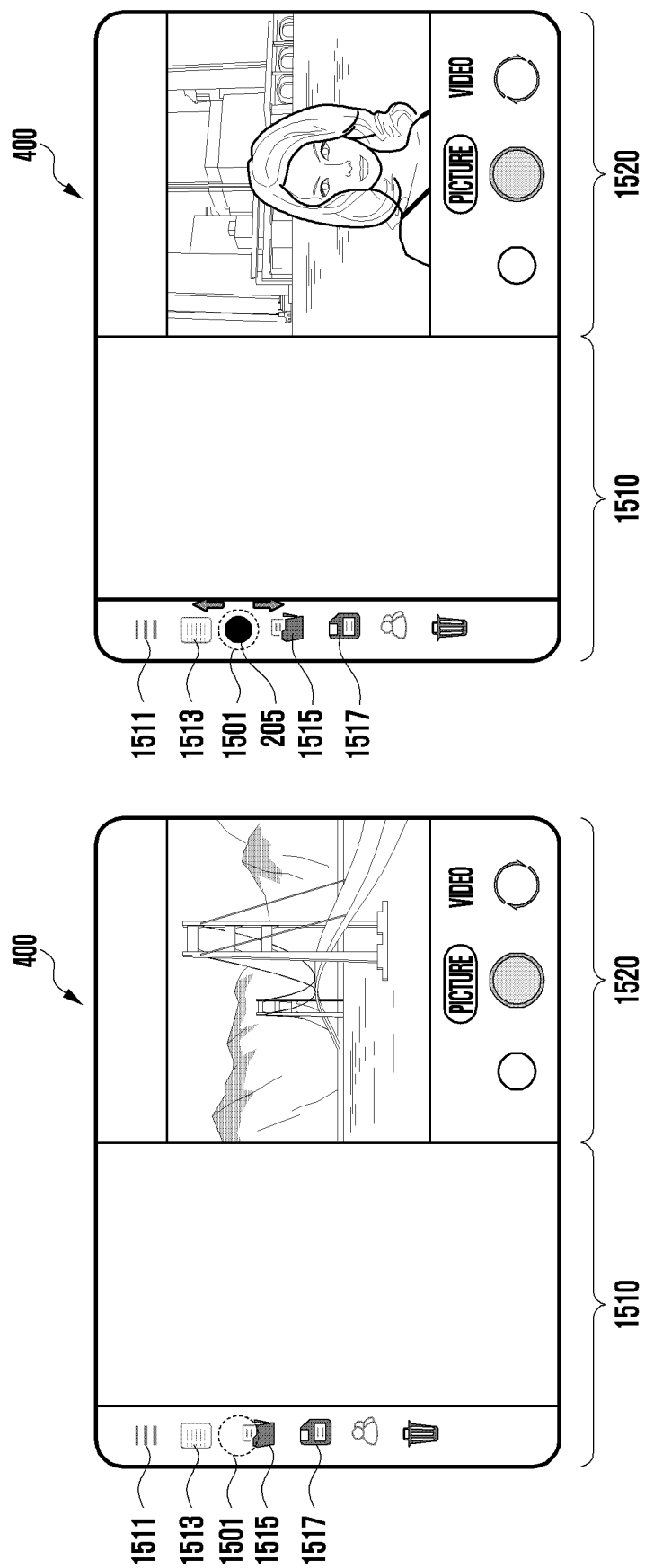
FIG. 15 shows changing a user interface by an electronic device displaying multiple user interfaces according to certain embodiments.

FIG. 15 shows changing a user interface by an electronic device displaying multiple user interfaces according to certain embodiments.

According to certain embodiments, the electronic device 101 may simultaneously execute at least two applications (e.g., a first application and a second application). According to an embodiment, the electronic device 101 may simultaneously execute the first application and the second application, and may simultaneously display an execution screen 1510 of the first application and an execution screen 1520 of the second application on a display 400. The electronic device 101 may display execution screens 1510 and 1520 of multiple different applications in segments of the region on the display, respectively, or may display the execution screens such that parts of the execution screens of the respective applications overlap each other. Referring to FIG. 15, the electronic device 101 may display, on the display 400, a first user interface at least including the execution screen 1510 of the first application. For example, the electronic device 101 may display, on the display 400, the first user interface including at least one object (e.g., a first icon 1511, a second icon 1513, a third icon 1515, or a fourth icon 1517) as the execution screen 1510 of the first application. While the first application is executed, the first user interface may include at least one object which is to be displayed on the execution screen of the executed first application.

Referring to FIG. 15, the electronic device 101 may display, on the display, a second user interface at least including the execution screen 1520 of the second application. For example, the electronic device 101 may display, on the display, the second user interface including at least one object as the execution screen of the second application. While the second application is executed, the second user interface may include at least one object which is to be displayed on the execution screen of the executed second application. According to an embodiment, the electronic device 101 may simultaneously display the first user interface and the second user interface on the display. The electronic device 101 may divide a display screen into multiple windows and may display different user interfaces in regions corresponding to the windows, respectively.

According to certain embodiments, when a pixel corresponding to a first region 1501 (e.g., the first region 801 in FIG. 8) is deactivated while multiple user interfaces are displayed on one display 400, the electronic device 101 may determine a user interface to be changed among the multiple user interfaces. According to an embodiment, the electronic device 101 may determine a position of a region for displaying the first user interface and a position of a region for displaying the second user interface among regions of the first display 400. The electronic device 101 may determine a region overlapping the first region 1501 among at least a partial region on the first display 400, corresponding to the first user interface, and at least a partial region on the first display 400, corresponding to the second user interface. According to an embodiment, the electronic device 101 may change a user interface, among the first user interface and the second user interface, in which a displayed region corresponds to a region overlapping the first region 1501. Referring to FIG. 15, the electronic device 101 may determine that a user interface overlapping the first region 1501 overlaps the position of the execution screen 1510 of the first application, and may change a user interface positioned in the execution screen 1510 of the first application.

Figure 16:
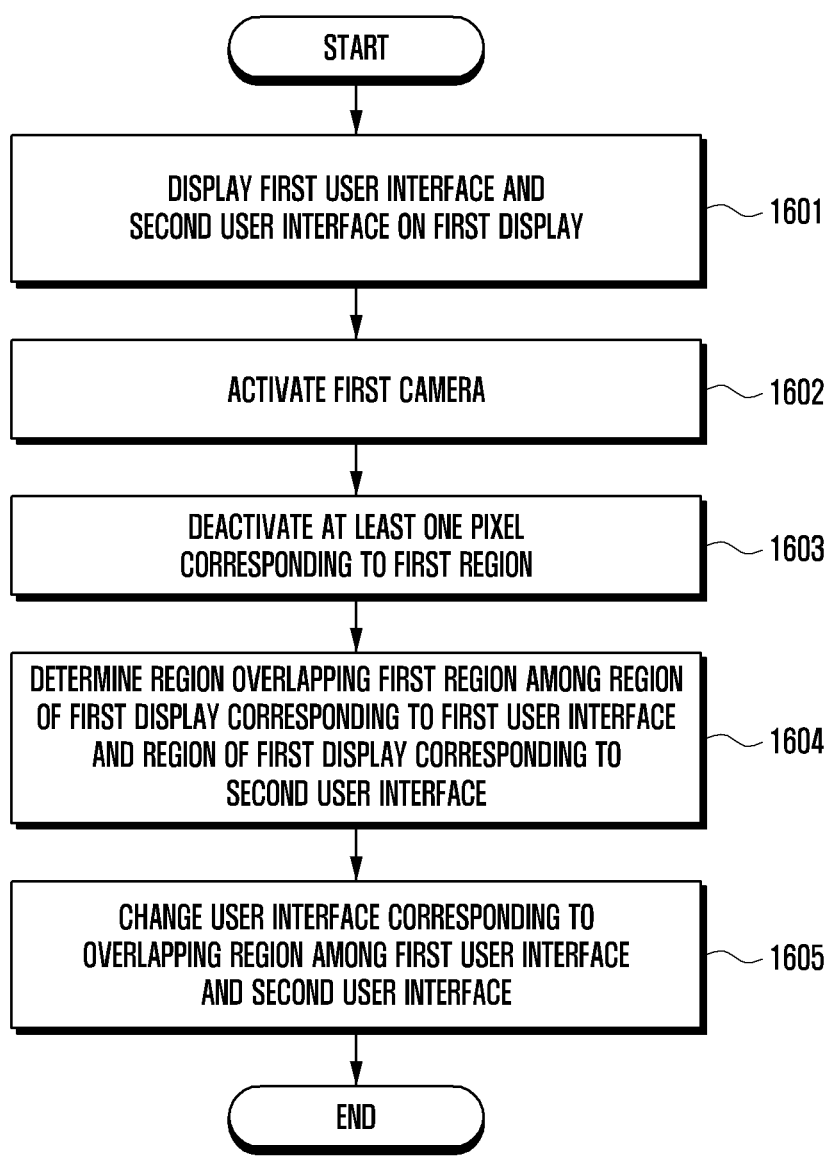
FIG. 16 is a flowchart showing operations of changing a user interface by an electronic device displaying multiple user interfaces according to certain embodiments.

FIG. 16 is a flowchart showing operations of changing a user interface by an electronic device displaying multiple user interfaces according to certain embodiments.

Referring to FIG. 16, multiple operations of changing a user interface by an electronic device (e.g., the electronic device 101 in FIG. 1 or the electronic device 101 in FIG. 7) may be considered to be operations performed by a processor (e.g., the processor 120 in FIG. 7) of the electronic device 101. Operations in FIG. 16 may be changed, may be replaced, and/or may be switched in the order thereof, and a new operation may be added.

Referring to operation 1601, the processor 120 may display a first user interface and a second user interface on a first display (e.g., the first display 161 in FIG. 7). According to certain embodiments, the processor 120 may simultaneously execute at least two applications (e.g., a first application and a second application). According to an embodiment, the processor 120 may simultaneously execute the first application and the second application, and may simultaneously display an execution screen of the first application and an execution screen of the second application on a display (e.g., the first display 161). The processor 120 may display execution screens of multiple different applications in segments of the region on the display, respectively, or may display the execution screens such that parts of the execution screens of the respective applications overlap each other. According to an embodiment, the processor 120 may display, on the display, a first user interface at least including the execution screen of the first application. For example, the processor 120 may display, on the display, the first user interface including at least one object as the execution screen of the first application. While the first application is executed, the first user interface may include at least one object which is to be displayed on the execution screen of the executed first application. According to an embodiment, the processor 120 may display, on the display, a second user interface at least including the execution screen of the second application. For example, the processor 120 may display, on the display, the second user interface including at least one object as the execution screen of the second application. While the second application is executed, the second user interface may include at least one object which is to be displayed on the execution screen of the executed second application. According to an embodiment, the processor 120 may simultaneously display the first user interface and the second user interface on the display. The processor 120 may divide a display screen into multiple windows and may display different user interfaces in regions corresponding to the windows, respectively.

Referring to operation 1602, the processor 120 may activate a first camera (e.g., the first camera 181 in FIG. 7). According to certain embodiments, the processor 120 may capture an image. According to an embodiment, the processor 120 may use the first camera 181 to capture a still image and/or a moving image. The processor 120 may receive an input regarding still-image and/or moving-image capturing, and may control, based on the received input, the first camera 181 to capture a still image and/or a moving image. According to an embodiment, the input regarding image capturing, received by the processor 120, may include an input for activating a camera (e.g., the first camera 181). The processor 120 may receive the input regarding image capturing to activate the first camera 181.

Referring to operation 1603, the processor 120 may deactivate at least one pixel corresponding to a first region (e.g., the first region A1 in FIG. 5B or the first region 801 in FIG. 8). According to certain embodiments, the processor 120 may deactivate at least a partial region (e.g., the first region) of the region of the first display 161. According to an embodiment, when the camera (e.g., the first camera 181) is activated, the processor 120 may deactivate a pixel included in at least a partial region of the first display 161 that corresponds to the camera or the field of view of the camera. According to an embodiment, the first display 161 may include a first region (e.g., the first region A1 in FIG. 5B or the first region 801 in FIG. 8) overlapping an effective aperture or the field of view of the first camera 181 and a second region (e.g., the second region A2 in FIG. 5B or the second region 802 in FIG. 8) surrounding the first region 801. According to an embodiment, the first region 801 may be formed to have light transmittance utilized by the first camera 181 by adjusting a pixel density and/or a wiring density to be relatively low. According to an embodiment, the second region 802 may include a normal active area, that is, a region in which a pixel density and/or a wiring density is high compared with the first region 801. According to an embodiment, the second region 802 may be a region in which the light transmittance for the camera (e.g., the first camera 181) is not considered. According to an embodiment, when the first camera 181 is activated, the processor 120 may deactivate at least one pixel corresponding to the first region 801 on the first display 161. According to an embodiment, the processor 120 may deactivate at least some of multiple pixels corresponding to the first region 801. According to an embodiment, the processor 120 may deactivate all pixels corresponding to the first region 801.

Referring to operation 1604, the processor 120 may determine a region that overlaps the first region, from among a region corresponding to the first user interface, and a region corresponding to the second user interface. According to certain embodiments, when a pixel corresponding to the first region (e.g., the first region 801 in FIG. 8) is deactivated while multiple user interfaces are displayed on one display (e.g., the first display 161), the processor 120 may determine a user interface to be changed from among the multiple displayed user interfaces. According to an embodiment, the processor 120 may determine positions of a region for displaying the first user interface and a region for displaying the second user interface, among regions of the first display 161. The processor 120 may determine a region overlapping the first region 801, from among at least a partial region on the first display 161, corresponding to the first user interface, and at least a partial region on the first display 161, corresponding to the second user interface.

Referring to operation 1605, the processor 120 may change one of the user interfaces, as selected from among the first user interface and the second user interface, which was identified to be the overlapping region determined in operation 1604. According to an embodiment, the processor 120 may change the user interface of the overlapping region identified from among the first user interface and the second user interface.

Figure 17A:
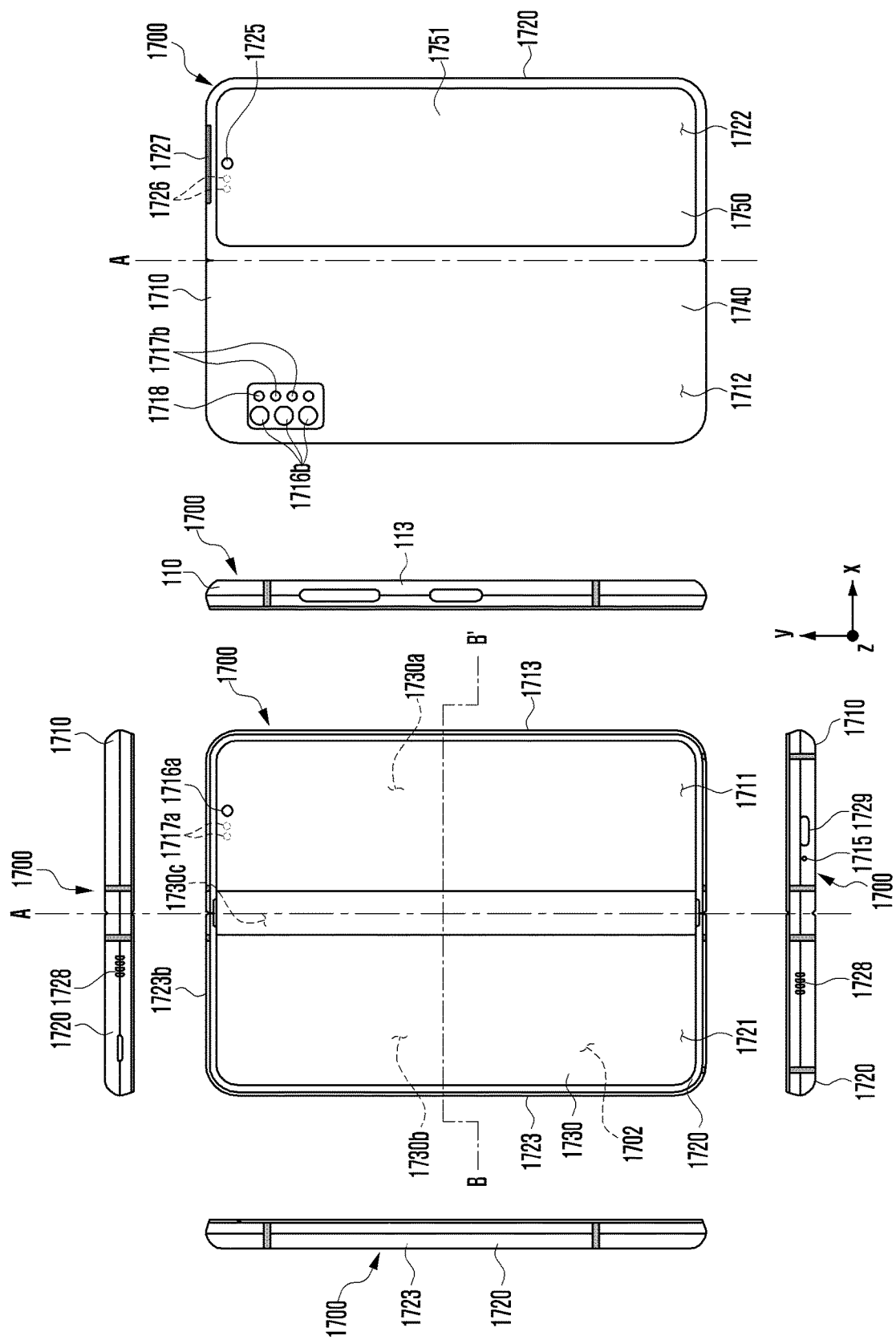
FIG. 17A illustrates an unfolded state of an electronic device including a third form according to certain embodiments.

FIG. 17A illustrates an unfolded state (e.g., a first state) of an electronic device 1700 according to certain embodiments.

Figure 17B:
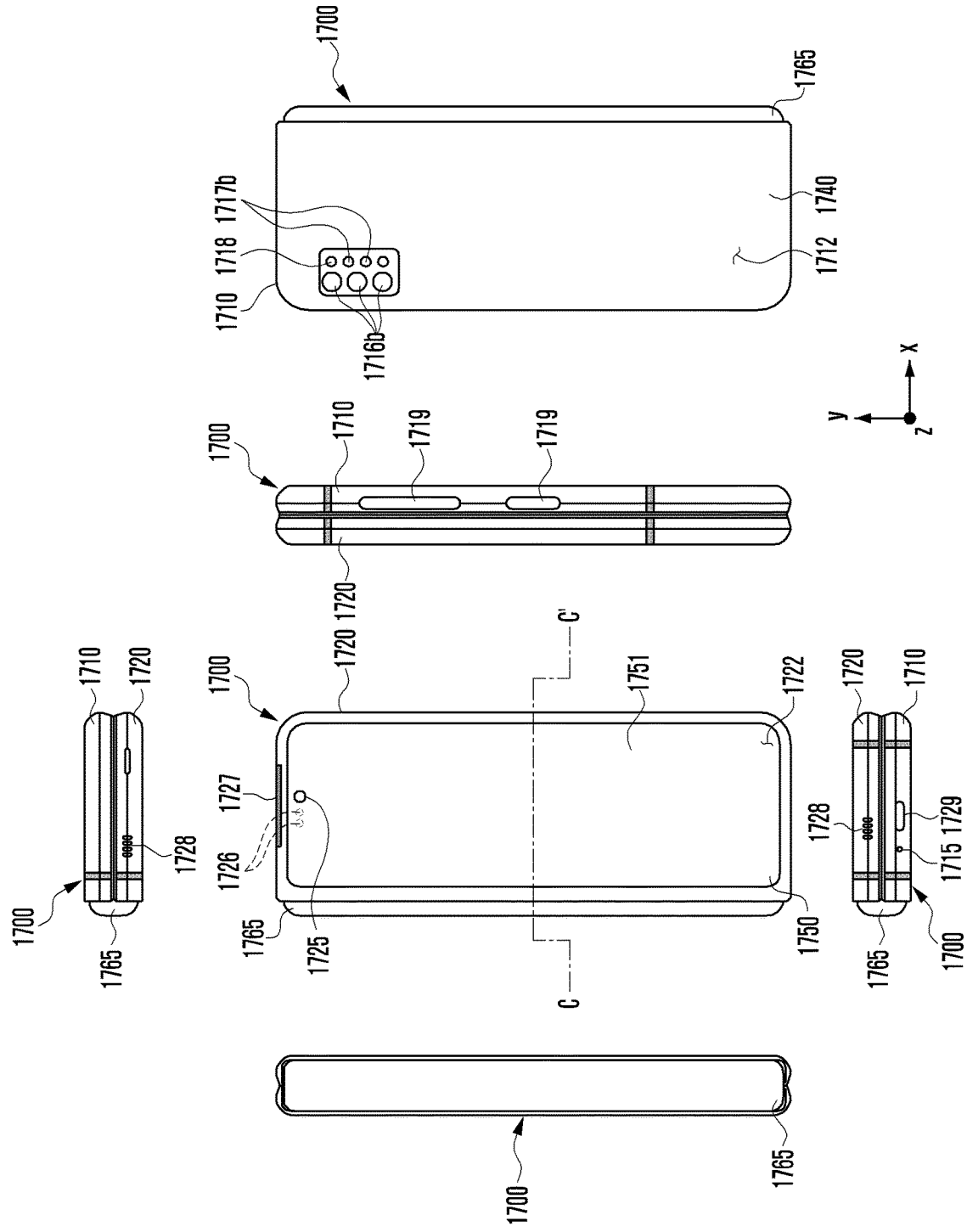
FIG. 17B illustrates a folded state of the electronic device in FIG. 17A according to certain embodiments.

FIG. 17B illustrates a folded state (e.g., a second state) of the electronic device 1700 in FIG. 17A according to certain embodiments.

Referring to FIGS. 17A and 17B, the electronic device 1700 may include a pair of housings 1710 and 1720 (e.g., foldable housings) coupled to be rotatable about a folding axis A through a hinge device so as to be folded with respect to each other, and a first display 1730 (e.g., a flexible display, a foldable display, or a main display) and a second display 1751 (e.g., a sub display), disposed through the pair of housings 1710 and 1720. According to an embodiment, the hinge device may be disposed so as not to be viewed from outside through a first housing 1710 and a second housing 1720 in the folded state, and may be disposed so as not to be viewed, in the unfolded state, from outside through a hinge cover 1765 which protects the hinge device and covers a foldable part. Herein, a surface on which the first display 1730 is disposed may be defined as the front surface of the electronic device 1700, and a surface opposite to the front surface may be defined as the rear surface of the electronic device 1700. Furthermore, a surface surrounding the space between the front surface and the rear surface may be defined as the side surface of the electronic device 1700.

According to certain embodiments, the pair of housings 1710 and 1720 may include the first housing 1710 and the second housing 1720 disposed to be foldable with respect to each other through the hinge device. According to an embodiment, the pair of housings 1710 and 1720 are not limited to the forms and coupling illustrated in FIGS. 17A and 17B, and may be implemented by other shapes or a combination and/or coupling of other components. According to an embodiment, the first housing 1710 and the second housing 1720 may be disposed at both sides with reference to the folding axis A, and may have shapes which are overall symmetric with respect to the folding axis A. According to an embodiment, the first housing 1710 and the second housing 1720 may be asymmetrically folded with reference to the folding axis A. According to an embodiment, an angle or a distance formed between the first housing 1710 and the second housing 1720 may vary depending on whether the electronic device 1700 is in an unfolded state (e.g., a first state), a folded state (e.g., a second state), or an intermediate state (e.g., a third state).

According to certain embodiments, in the unfolded state of the electronic device 1700, the first housing 1710 may be connected to the hinge device, and may include a first surface 1711 disposed to face the front surface of the electronic device 1700, a second surface 1712 facing a direction opposite to the direction faced by the first surface 1711, and a first side member 1713 surrounding at least a part of a first space between the first surface 1711 and the second surface 1712. According to an embodiment, in the unfolded state of the electronic device 1700, the second housing 1720 may be connected to the hinge device, and may include a third surface 1721 disposed to face the front surface of the electronic device 1700, a fourth surface 1722 facing a direction opposite to the direction faced by the third surface 1721, and a second side member 1723 surrounding at least a part of a second space between the third surface 1721 and the fourth surface 1722. According to an embodiment, the first surface 1711 may face, in the unfolded state, the same direction as the third surface 1721, and may face the third surface 1721 in the folded state. According to an embodiment, the electronic device 1700 may include a recess 1702 which is formed through structural coupling of the first housing 1710 and the second housing 1720 so as to receive the first display 1730. According to an embodiment, the recess 1702 may have substantially the same size as the first display 1730.

According to certain embodiments, the hinge cover 1765 may be disposed between the first housing 1710 and the second housing 1720, and may be disposed to cover the hinge device. According to an embodiment, depending on the unfolded state, the folded state, or the intermediate state of the electronic device 1700, the hinge cover 1765 may be covered by a part of the first housing 1710 and a part of the second housing 1720 or may be exposed outside. For example, when the electronic device 1700 is in the unfolded state, the hinge cover 1765 may be covered by the first housing 1710 and the second housing 1720, and thus may not be exposed. According to an embodiment, when the electronic device 1700 is in the folded state, the hinge cover 1765 may be exposed outside between the first housing 1710 and the second housing 1720. According to an embodiment, in the case of the intermediate state in which the first housing 1710 and the second housing 1720 are folded with a certain angle, the hinge cover 1765 may be at least partially exposed to the outside of the electronic device 1700 between the first housing 1710 and the second housing 1720. For example, a region of the hinge cover 1765 exposed outside may be smaller than that in a completely folded state. According to an embodiment, the hinge cover 1765 may include a curved surface.

According to certain embodiments, when the electronic device 1700 is in the unfolded state (e.g., the state in FIG. 17A), the first housing 1710 and the second housing 1720 may form an angle of 180 degrees, and a first region 1730*a*, a folding region 1730*c*, and a second region 1730*b* of the first display 1730 may be disposed to form an identical flat surface and face an identical direction. In another embodiment, when the electronic device 1700 is in the unfolded state, the first housing 1710 may rotate 180 degrees with respect to the second housing 1720 to be reversely folded such that the second surface 1712 and the fourth surface 1722 face each other (an out-folding scheme).

According to certain embodiments, when the electronic device 1700 is in the folded state (e.g., the state in FIG. 17B), the first surface 1711 of the first housing 1710 and the third surface 1721 of the second housing 1720 may be disposed to face each other. In this case, the first region 1730*a* and the second region 1730*b* of the first display 1730 may be disposed to face each other while forming a narrow angle (e.g., a range of 0 degrees-10 degrees) with each other through the folding region 1730*c*. According to an embodiment, at least a part of the folding region 1730*c* may be formed as a curved surface having a predetermined curvature radius. According to an embodiment, when the electronic device 1700 is in the intermediate state, the first housing 1710 and the second housing 1720 may be disposed with a certain angle therebetween. In this case, the first region 1730*a* and the second region 1730*b* of the first display 1730 may form an angle which is larger than that in the folded state and smaller than that in the unfolded state, and the curvature radius of the folding region 1730*c* may be longer than that in the folded state. In an embodiment, the first housing 1710 and the second housing 1720 may form, through the hinge device, an angle which may stop at a designated folding angle between the folded state and the unfolded state (a free stop function). In an embodiment, the first housing 1710 and the second housing 1720 may operate, through the hinge device, while receiving pressure applied in a direction in which the same are unfolded or folded with reference to a designated inflection angle.

According to certain embodiments, the electronic device 1700 may include at least one among at least one display 1730 or 1751 disposed in the first housing 1710 and/or the second housing 1720, an input device 1715, sound input devices 1727 and 1728, sensor modules 1717*a*, 1717*b*, and 1726, camera modules 1716*a*, 1716*b*, and 1725, key input devices 1719, an indicator (not shown), or a connector port 1729. In an embodiment, in the electronic device 1700, at least one of the elements may be omitted, or at least one other element may be additionally included.

According to certain embodiments, the at least one display 1730 or 1751 may include the first display 1730 (e.g., a flexible display) disposed to be supported by the first surface 1711 of the first housing 1710, the hinge device, and the third surface 1721 of the second housing 1720, and the second display 1751 disposed in the inner space of the second housing 1720 so as to be viewed from outside through the fourth surface 1722. According to an embodiment, the first display 1730 may be mainly used in the unfolded state of the electronic device 1700, and the second display 1751 may be mainly used in the folded state of the electronic device 1700. According to an embodiment, when the electronic device 1700 is in the intermediate state, the first display 1730 or the second display 1751 may be used based on the folding angle of the first housing 1710 and the second housing 1720.

According to certain embodiments, the first display 1730 may be disposed in a space formed by the pair of housings 1710 and 1720. For example, the first display 1730 may be seated in the recess 1702 formed by the pair of housings 1710 and 1720, and may be disposed to occupy most of the front surface of the electronic device 1700. According to an embodiment, the first display 1730 may include a flexible display having at least a partial region which may be deformed into a flat surface or a curved surface. According to an embodiment, the first display 1730 may include the first region 1730*a* facing the first housing 1710, the second region 1730*b* facing the second housing 1720, and the folding region 1730*c* connecting the first region 1730*a* to the second region 1730*b* and facing the hinge device.

According to an embodiment, the first region 1730*a* of the first display 1730 may substantially form the first surface 1711 of the first housing 1710. According to an embodiment, the second region 1730*b* of the first display 1730 may substantially form the third surface 1721 of the second housing 1720.

According to an embodiment, division of the region of the first display 1730 may be merely example physical division by the pair of housings 1710 and 1720 and the hinge device. Substantially, the first display 1730 may be displayed as one seamless entire screen through the pair of housings 1710 and 1720 and the hinge device. According to an embodiment, the first region 1730*a* and the second region 1730*b* may have shapes which are fully symmetric with reference to the folding region 1730*c*, or may have shapes which are partially asymmetric.

According to certain embodiments, the electronic device 1700 may include a first rear cover 1740, disposed on the second surface 1712 of the first housing 1710, and a second rear cover 1750, disposed on the fourth surface 1722 of the second housing 1720. In an embodiment, at least a part of the first rear cover 1740 may be formed integrally with the first side member 1713. In an embodiment, at least a part of the second rear cover 1750 may be formed integrally with the second side member 1723. According to an embodiment, at least one of the first rear cover 1740 and the second rear cover 1750 may be formed of a substantially transparent plate (e.g., a polymer plate or a glass plate including various coated layers) or an opaque plate. According to an embodiment, the first rear cover 1740 may be formed of an opaque plate, which are made of, for example, coated or colored glass, ceramic, polymer, metal (e.g., aluminum, stainless steel (STS), or magnesium), or a combination of at least two of the materials. According to an embodiment, the second rear cover 1750 may be formed of a substantially transparent plate, which is made of, for example, glass or polymer. Therefore, the second display 1751 may be disposed in the inner space of the second housing 1720 so as to be viewed from outside through the second rear cover 1750.

According to certain embodiments, the input device 1715 may include a microphone 1715. In an embodiment, the input device 1715 may include multiple microphones 1715 so as to sense the direction of a sound. According to an embodiment, the sound output devices 1727 and 1728 may include speakers 1727 and 1728. According to an embodiment, the speakers 1727 and 1728 may include a call receiver 1727, disposed through the fourth surface 1722 of the second housing 1720, and an external speaker 1728, disposed through the side member of the second housing 1720. In an embodiment, the microphone 1715, the speakers 1727 and 1728, and the connector port 1729 may be disposed in spaces of the first housing 1710 and/or the second housing 1720, and may be exposed to an external environment through at least one hole formed in the first housing 1710 and/or the second housing 1720. In an embodiment, the holes formed in the first housing 1710 and/or the second housing 1720 may be commonly used for the microphone 1715 and the speakers 1727 and 1728. In an embodiment, the sound output devices 1727 and 1728 may include a speaker (e.g., a piezo speaker) operating without any hole formed in the first housing 1710 and/or the second housing 1720.

According to certain embodiments, the camera modules 1716a, 1716b, and 1725 may include a first camera device 1716a disposed in the first surface 1711 of the first housing 1710, a third camera device 1716b disposed in the second surface 1712 of the first housing 1710, and/or a second camera device 1725 disposed in the fourth surface 1722 of the second housing 1720. According to an embodiment, the electronic device 1700 may include a flash 1718 disposed near the third camera device 1716b. According to an embodiment, the flash 1718 may include, for example, a light-emitting diode or a xenon lamp. According to an embodiment, each of the camera devices 1716a, 1716b, and 1725 may include one or multiple lenses, an image sensor, and/or an image signal process. In an embodiment, at least one of the camera devices 1716a, 1716b, and 1725) may include two or more lenses (wide-angle and telephoto lenses) and image sensors, and may be disposed together in any one surface of the first housing 1710 and/or the second housing 1720.

According to certain embodiments, the sensor modules 1717a, 1717b, and 1726 may generate an electrical signal or a data value corresponding to an operation state inside the electronic device 1700 or an environment state outside the electronic device 1700. According to an embodiment, the sensor modules 1717a, 1717b, and 1726 may include a first sensor module 1717a disposed in the first surface 1711 of the first housing 1710, a second sensor module 1717b disposed in the second surface 1712 of the first housing 1710, and/or a third sensor module 1726 disposed in the fourth surface 1722 of the second housing 1720. In an embodiment, the sensor modules 1717a, 1717b, and 1726 may include at least one among a gesture sensor, a grip sensor, a color sensor, an infrared (IR) sensor, an illumination sensor, an ultrasonic sensor, an iris recognition sensor, or a distance detection sensor (a TOF sensor or a LiDAR scanner).

According to certain embodiments, the electronic device 1700 may further include at least one among unillustrated sensor modules, for example, a barometric pressure sensor, an angle sensor, a gyro sensor, a magnetic sensor, a biosensor, a temperature sensor, a humidity sensor, or a fingerprint recognition sensor. In an embodiment, the fingerprint recognition sensor may be disposed through at least one of the first side member 1713 of the first housing 1710 and/or the second side member 1723 of the second housing 1720.

According to certain embodiments, the key input devices 1719 may be disposed to be exposed outside through the first side member 1713 of the first housing 1710. In an embodiment, the key input devices 1719 may also be disposed to be exposed outside through the second side member 1723 of the second housing 1720. In an embodiment, the electronic device 1700 may not include some or all of the above-mentioned key input devices 1719, and key input devices 1719, which are not included, may be implemented in other forms, such as soft keys, on the at least one display 1730 or 1751. In another embodiment, the key input devices 1719 may be implemented by using pressure sensors included in the at least one display 1730 or 1751.

According to certain embodiments, the connector port 1729 may receive a connector (e.g., a USB connector or an interface connector port module (IF module)) for transmitting or receiving power and/or data to or from an external electronic device. In an embodiment, the connector port 1729 may perform a function of transmitting and receiving an audio signal to and from the external electronic device, or may further include a separate connector port (e.g., an earphone jack hole) for performing an audio signal transmission/reception function. According to certain embodiments, at least one camera device 1716a or 1725 among the camera devices 1716a, 1716b, and 1725, at least one sensor module 1717a or 1726 among the sensor modules 1717a, 1717b, and 1726, and/or the indicator may be disposed to be visually exposed through the at least one display 1730 or 1751. For example, the at least one camera device 1716a or 1725, the at least one sensor module 1717a or 1726, and/or the indicator may be disposed under an active region (display area) of the display 1730 or 1751 in the inner space of at least one housing 1710 or 1720, and may be disposed so as to be exposed to an external environment through an opening bored up to a cover member (e.g., a window layer (not shown) of the first display 1730 and/or the second rear cover 1750). In another embodiment, some camera devices or sensor module 1704 may be disposed to perform functions thereof without being visually exposed through the display. For example, a region of the display 1751 (e.g., a display panel), facing the camera device and/or the sensor module, may not utilize a bored opening.

According to certain embodiments, the first display 1730 may visually display information to the outside (e.g., a user) of the electronic device 101. The first display 1730 may include at least some of the elements and/or functions of the display module 160 in FIG. 1. According to an embodiment, the first display 1730 may include a touch sensor or a pressure sensor, which is configured to sense a touch. According to certain embodiments, the first display 1730 may include multiple pixels (e.g., the multiple pixels P in FIG. 6) in at least a partial region thereof. According to an embodiment, each of the multiple pixels may be controlled by the processor 120 and/or a driving circuit for controlling the first display 1730 to emit light, thereby displaying visual information to the outside of the electronic device 101. According to an embodiment, the first display 1730 may include at least two regions (e.g., the first region A1 and/or the second region A2 in FIG. 6) which are different from each other in the arrangement density of multiple pixels. The first region A1 and the second region A2 on the first display 1730 may have different pixel arrangement densities, and thus the respective regions may have different light transmittances. For example, the first region A1 may include multiple pixels with a relatively low arrangement density (e.g., a first arrangement density) compared with the second region A2, and the second region A2 may include multiple pixels with a relatively high arrangement density (e.g., a second arrangement density) compared with the first region A1. In a region (e.g., the first region A1) having a relatively lower arrangement density among the regions of the first display 1730, the light transmittance of a display may be higher than in the other region. According to an embodiment, a partial region (e.g., the first region A1) of the first display 1730 may be deactivated. For example, the first region A1, among the regions of the first display 1730, may be deactivated, and the second region A2 may be activated. When a partial region of the first display 1730 is deactivated, at least one pixel disposed in the deactivated region may be deactivated. The deactivated or activated state of the partial region of the first display 1730 may be controlled and switched by the processor 120 and/or the driving circuit, which are connected to the first display 1730. According to an embodiment, the first region A1 of the first display 1730 may be disposed to at least partially overlap a field-of-view region corresponding to the field of view (FOV) of the first camera device 1716a.

According to certain embodiments, the second display 1751 may visually display information to the outside (e.g., a user) of the electronic device 101. The second display 1751 may include at least some among the elements and/or functions of the display module 160 in FIG. 1. According to an embodiment, the second display 1751 may include a touch sensor or a pressure sensor, which is configured to sense a touch. According to certain embodiments, the second display 1751 may include multiple pixels (e.g., the multiple pixels P in FIG. 6) in at least a partial region thereof. According to an embodiment, each of the multiple pixels may be controlled by the processor 120 and/or a driving circuit for controlling the second display 1751 to emit light, thereby displaying visual information to the outside of the electronic device 101. According to an embodiment, the second display 1751 may include at least two regions (e.g., a third region and/or a fourth region) (e.g., the first region A1 and/or the second region A2 in FIG. 6) which are different from each other in the arrangement density of multiple pixels. The third region and the fourth region on the second display 1751 may have different pixel arrangement densities, and thus the respective regions may have different light transmittances. For example, the third region may include multiple pixels with a relatively low arrangement density (e.g., a first arrangement density) compared with the fourth region, and the fourth region may include multiple pixels with a relatively high arrangement density (e.g., a second arrangement density) compared with the third region. In a region (e.g., the third region) having a relatively lower arrangement density among the regions of the second display 1751, the light transmittance of a display may be higher than in the other region. According to an embodiment, a partial region (e.g., the third region) of the second display 1751 may be deactivated. For example, the third region, among the regions of the second display 1751, may be deactivated, and the fourth region may be activated. When a partial region of the second display 1751 is deactivated, at least one pixel disposed in the deactivated region may be deactivated. The deactivated or activated state of the partial region of the second display 1751 may be controlled and switched by the processor 120 and/or the driving circuit, which are connected to the second display 1751. According to an embodiment, the third region of the second display 1751 may be disposed to at least partially overlap a field-of-view region corresponding to the field of view (FOV) of the second camera device 1725.

Figure 18:
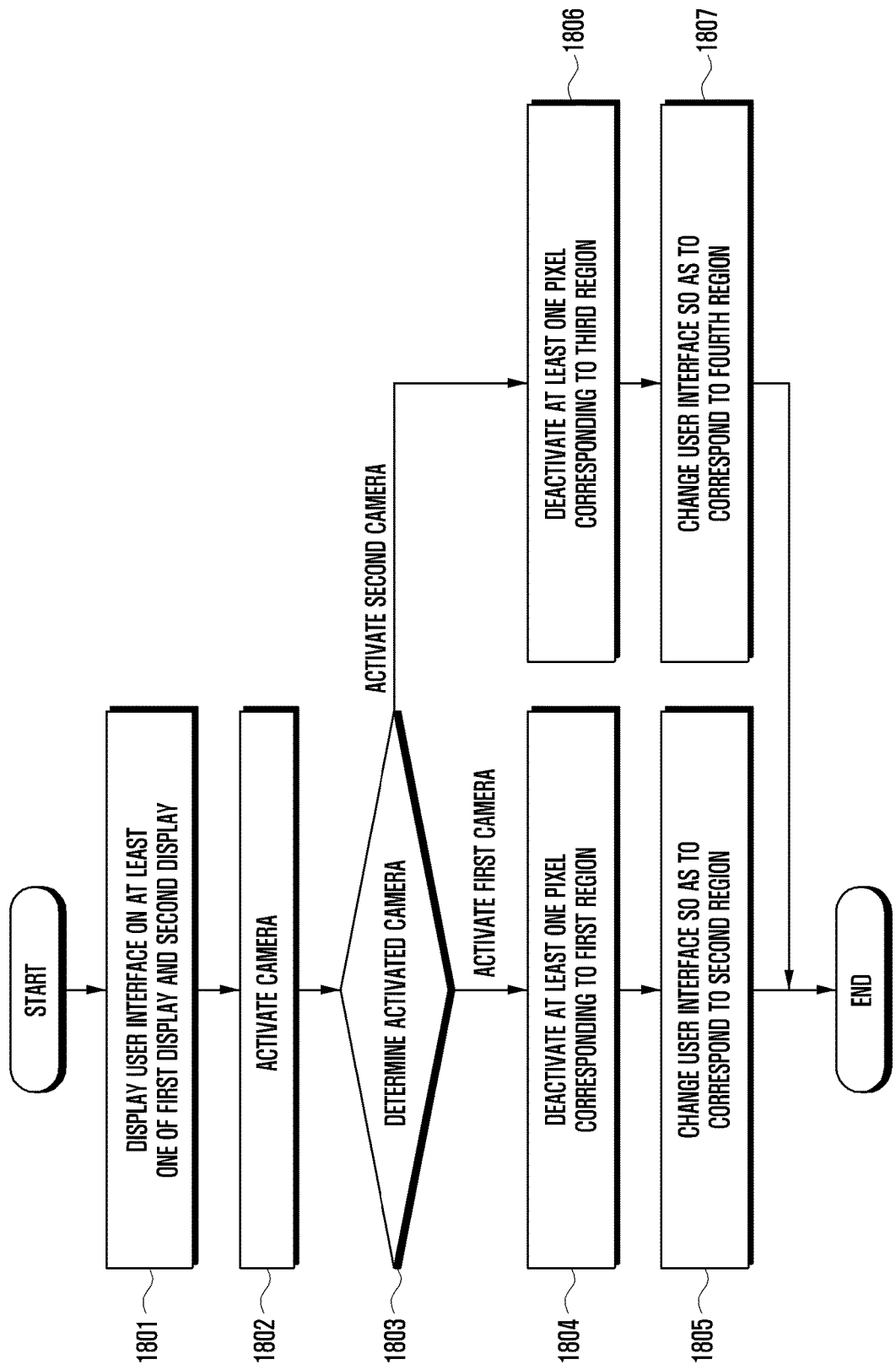
FIG. 18 is a flowchart showing operations of changing a user interface by an electronic device including multiple displays and multiple cameras according to certain embodiments.

FIG. 18 is a flowchart showing operations of changing a user interface by an electronic device (e.g., the electronic device 101 in FIG. 7 or the electronic device 1700 in FIG. 17A) including multiple displays (e.g., the first display 1730 and the second display 1751 in FIG. 17A) (e.g., the first display 161 and the second display 162 in FIG. 7) and multiple cameras (e.g., the first camera device 1716a, the third camera device 1716b, and/or the second camera device 1725 in FIG. 17A) (e.g., the first camera 181 and the second camera 182 in FIG. 7) according to certain embodiments.

Referring to FIG. 18, multiple operations of changing a user interface by an electronic device (e.g., the electronic device 101 in FIG. 1, the electronic device 101 in FIG. 7, or the electronic device 1700 in FIG. 17A) may be considered to be operations performed by a processor (e.g., the processor 120 in FIG. 7) of the electronic device (e.g., 101). Operations in FIG. 18 may be changed, may be replaced, and/or may be switched in the order thereof, and a new operation may be added.

Referring to operation 1801, the processor 120 may display a user interface on at least one of a first display (e.g., the first display 1730 in FIG. 17A or the first display 161 in FIG. 7) and a second display (e.g., the second display 1751 in FIG. 17B or the second display 162 in FIG. 7). According to certain embodiments, the processor 120 may control the first display 161 to display a user interface. The user interface may include at least one graphical object which is visually displayed. According to an embodiment, the user interface may include a graphical user interface. At least one object included in the user interface may include an image object which may be visually displayed on a display (e.g., the first display 161). According to certain embodiments, the processor 120 may control the second display 162 to display a user interface. The user interface may include at least one graphical object which is visually displayed. According to an embodiment, the processor 120 may activate at least one of the first display 161 and the second display 162, and may display the user interface including the at least one object on the first display 161 and/or the second display 162. According to an embodiment, the processor 120 may activate one of the first display 161 and the second display 162, and may switch one of the first display 161 and the second display 162 from the activated state to a deactivated state while switching the other deactivated display to an activated state. According to another embodiment, the processor 120 may simultaneously activate the first display 161 and the second display 162 to display a user interface on each display.

Referring to operation 1802, the processor 120 may activate a camera (e.g., the first camera 181 and/or the second camera 182 in FIG. 7). According to certain embodiments, the processor 120 may capture an image. According to an embodiment, the processor 120 may use the first camera 181 and/or the second camera 182 to capture a still image and/or a moving image. The processor 120 may receive an input regarding still-image and/or moving-image capturing, and may control, based on the received input, the camera to capture a still image and/or a moving image. According to an embodiment, the input regarding image capturing, received by the processor 120, may include an input for activating a camera (e.g., the first camera 181 and/or the second camera 182). The processor 120 may receive the input regarding image capturing to activate the camera.

Referring to operation 1803, the processor 120 may determine which camera was activated from among the multiple cameras equipped in the electronic device For example, the processor 120 may determine which of a first camera (e.g., the first camera 181 in FIG. 7 or the first camera device 1716a in FIG. 17A), a second camera (e.g., the second camera 182 in FIG. 7 or the second camera device 1725 in FIG. 17A) or a third camera (e.g., the third camera device 1716b in FIG. 17A) is the activated camera. According to certain embodiments, the processor 120 may activate one of multiple cameras (e.g., the first camera, the second camera, and/or the third camera), and may determine the activated camera. According to an embodiment, the processor 120 may determine whether the activated camera is the first camera, the second camera, or the third camera. The processor 120 may move to operation 1804 when the activated camera is determined to be the first camera, may move to operation 1806 when the activated camera is determined to be the second camera, and may end operations according to FIG. 18 when the activated camera is determined to be the third camera.

Referring to operation 1804 in which the first camera was activated, the processor 120 may deactivate at least one pixel corresponding to a first region (e.g., the first region A1 in FIG. 5B or the first region 801 in FIG. 8). According to certain embodiments, the processor 120 may deactivate at least a partial region (e.g., the first region) of the region of the first display 161. According to an embodiment, when the camera (e.g., the first camera 181) is activated, the processor 120 may deactivate a pixel included in at least a partial region of the first display 161 that corresponds to the camera or the field of view of the camera. According to an embodiment, the first display 161 may include a first region (e.g., the first region A1 in FIG. 5B or the first region 801 in FIG. 8) overlapping an effective aperture or the field of view of the first camera 181 and a second region (e.g., the second region A2 in FIG. 5B or the second region 802 in FIG. 8) surrounding the first region 801. According to an embodiment, the first region 801 may be formed to have light transmittance utilized by the first camera 181 by adjusting a pixel density and/or a wiring density to be relatively low. According to an embodiment, the second region 802 may include a normal active area, that is, a region in which a pixel density and/or a wiring density is high compared with the first region 801. According to an embodiment, the second region 802 may be a region in which the light transmittance for the camera (e.g., the first camera 181) is not considered. According to an embodiment, when the first camera 181 is activated, the processor 120 may deactivate at least one pixel corresponding to the first region 801 on the first display 161. According to an embodiment, the processor 120 may deactivate at least some of multiple pixels corresponding to the first region 801. According to an embodiment, the processor 120 may deactivate all pixels corresponding to the first region 801.

Referring to operation 1805, the processor 120 may change the user interface so at least a portion of the same is moved to the second region 802. According to certain embodiments, the processor 120 may change the user interface so as to correspond to at least a part of the remaining region, which is not deactivated, in the region of the first display 161. According to an embodiment, the processor 120 may change the user interface so as to correspond to the second region 802 on the first display 161. The second region may include at least a partial region of the remaining region of the first display 161, which surrounds the first region 801. The processor 120 may distinguish the first region 801 and the second region 802 in the remaining region other than the first region 801 on the first display 161. According to an embodiment, the processor 120 may read data designated about the range of the second region 802 in a memory (e.g., the memory 130 in FIG. 1) to determine the second region 802. According to an embodiment, the processor 120 may determine the first region 801, and may determine that a region within a designated distance from the first region 801 in the region of the first display 161 is the second region. According to an embodiment, the processor 120 may determine that a region including a graphical object (e.g., a window or a tool bar), which overlaps the first region 801 or is displayed in a region within the designated distance from the first region 801, among graphical objects displayed on the first display 161 is the second region. In this case, the shape and/or size of the second region 802 may be changed based on the user interface.

Referring to operation 1806 in which the second camera is activated, the processor 120 may deactivate at least one pixel corresponding to a third region. According to an embodiment, the second display 162 may include at least two regions (e.g., a third region and/or a fourth region) (e.g., the first region A1 and/or the second region A2 in FIG. 6) which are different from each other, in the arrangement density of multiple pixels. The third region and the fourth region on the second display 162 may have different pixel arrangement densities, and thus the respective regions may have different light transmittances. For example, the third region may include multiple pixels with a relatively low arrangement density (e.g., a first arrangement density) compared with the fourth region, and the fourth region may include multiple pixels with a relatively high arrangement density (e.g., a second arrangement density) compared with the third region. In a region (e.g., the third region) having a relatively lower arrangement density among the regions of the second display 162, the light transmittance of a display may be higher than in the other region. According to an embodiment, a partial region (e.g., the third region) of the second display 162 may be deactivated. For example, the third region, among the regions of the second display 162, may be deactivated, and the fourth region may be activated. When a partial region of the second display 162 is deactivated, at least one pixel disposed in the deactivated region may be deactivated. The deactivated or activated state of the partial region of the second display 162 may be controlled and switched by the processor 120 and/or the driving circuit, which are connected to the second display 162. According to an embodiment, the third region of the second display 162 may be disposed to at least partially overlap a field-of-view region corresponding to the field of view (FOV) of the second camera device 182. According to certain embodiments, the processor 120 may deactivate at least a partial region (e.g., the third region) in the region of the second display 162. According to an embodiment, when a camera (e.g., the second camera 182) is activated, the processor 120 may deactivate a pixel included in at least a partial region of the second display 162, which corresponds to the camera or the field of view of the camera. According to an embodiment, the second display 162 may include a third region (e.g., the first region A1 in FIG. 5B or the first region 801 in FIG. 8) overlapping the effective aperture or the field of view of the second camera 182 and a fourth region (e.g., the second region A2 in FIG. 5B or the second region 802 in FIG. 8) surrounding the third region. According to an embodiment, the third region may be formed to have light transmittance utilized by the second camera 182 by adjusting a pixel density and/or a wiring density to be relatively low. According to an embodiment, the fourth region may include a normal active area, that is, a region in which a pixel density and/or a wiring density is high compared with the third region. According to an embodiment, the fourth region may be a region in which the light transmittance for the camera (e.g., the second camera 182) is not considered. According to an embodiment, when the second camera 182 is activated, the processor 120 may deactivate at least one pixel corresponding to the third region on the second display 162. According to an embodiment, the processor 120 may deactivate at least some of multiple pixels corresponding to the third region. According to an embodiment, the processor 120 may deactivate all pixels corresponding to the third region.

Referring to operation 1807, the processor 120 may change the user interface so at least a portion of the same is moved to the fourth region. According to certain embodiments, the processor 120 may change the user interface so as to correspond to at least a part of the remaining region, which is not deactivated, in the region of the second display 162. According to an embodiment, the processor 120 may change the user interface so as to correspond to the fourth region on the second display 162. The fourth region may include at least a partial region of the remaining region of the second display 162, which surrounds the third region. The processor 120 may distinguish the third region and the fourth region in the remaining region other than the third region on the second display 162. According to an embodiment, the processor 120 may read data designated about the range of the fourth region in a memory (e.g., the memory 130 in FIG. 1) to determine the fourth region. According to an embodiment, the processor 120 may determine the third region, and may determine that a region within a designated distance from the third region in the region of the second display 162 is the fourth region. According to an embodiment, the processor 120 may determine that a region including a graphical object (e.g., a window or a tool bar), which overlaps the third region or is displayed in a region within the designated distance from the third region, among graphical objects displayed on the second display 162 is the fourth region. In this case, the shape and/or size of the fourth region may be changed based on the user interface.

An electronic device according to certain embodiments disclosed herein may include a first camera, a first display panel including multiple pixels and disposed to overlap, in at least a partial region thereof, a field-of-view region corresponding to the field of view of the first camera, and a processor, in which the processor is configured to display a graphic user interface on the first display panel, sense activation of the first camera, deactivate at least one pixel, among the multiple pixels, corresponding to a first region which is at least a partial region of the first display panel, and change the graphic user interface so as to correspond to a second region on the first display panel, which is at least partially in contact with the first region.

Furthermore, the first region of the first display panel may have a first transmittance, may at least partially overlap the first camera, and may include the field-of-view region, and the second region may have a second transmittance lower than the first transmittance.

Furthermore, the graphic user interface may include at least one object including a first object, and the processor may be configured to determine information about a position in which the first object is displayed on the first display panel, and change the graphic user interface, based on the information about the position in which the first object is displayed on the first display panel and information about a position of the first region.

Furthermore, the at least one object may include at least one among at least a part of an execution screen of an application executed by the processor, an icon, a widget, and a state display window.

Furthermore, the processor may be configured to change the graphic user interface by moving the position of the first object.

Furthermore, the processor may be configured to change the graphic user interface when the position in which the first object is displayed on the first display panel overlaps the position of the first region.

Furthermore, the graphic user interface may include multiple objects including the first object, and the processor may be configured to, when a position in which one of the multiple objects is displayed on the first display panel overlaps the first region, change the graphic user interface by moving a position in which an object, positioned within a designated distance from the first region, among the multiple objects, is displayed on the first display panel.

Furthermore, the processor may be configured to change the graphic user interface, based on the form of the second region.

Furthermore, the processor may be configured to execute a first application and control the first display panel to display a first graphic user interface including an execution screen of the first application, and the graphic user interface may include at least one object displayed by the execution screen of the first application.

Furthermore, the processor may be configured to determine whether to change the first graphic user interface, based on the first application, and change the first graphic user interface, based on the determination.

Furthermore, the processor may be configured not to change the first graphic user interface when the first application includes a moving-image playback function.

Furthermore, the processor may be configured to further execute a second application simultaneously with the first application, control the first display panel to display, simultaneously with the first graphic user interface, a second graphic user interface including an execution screen of the second application, determine a region overlapping the first region among a region of the first display panel corresponding to the first graphic user interface and a region of the first display panel corresponding to the second graphic user interface, and change a graphic user interface corresponding to the overlapping region among the first graphic user interface and the second graphic user interface.

Furthermore, the electronic device may further include a second camera disposed in a partial region of the electronic device which does not overlap the first display panel, in which the processor is configured to sense activation of a camera, determine whether the activated camera is the first camera, deactivate at least one pixel corresponding to the first region when the activated camera is the first camera as a result of the determination, and change the graphic user interface so as to correspond to the second region.

Furthermore, the electronic device may include a housing structure, which includes a hinge, a first housing connected to the hinge and including a first surface and a second surface facing a direction opposite to a direction faced by the first surface, and a second housing connected to the hinge and including a third surface and a fourth surface facing a direction opposite to a direction faced by the third surface, the first housing and the second housing being connected so as to be folded or unfolded with reference to a folding axis through the hinge, the first surface and the third surface facing an identical direction in an unfolded first state, and the first surface facing the third surface in a folded second state, a second display panel exposed outside through at least a part of the fourth surface, and a second camera disposed in the third surface or the fourth surface, in which the first display panel includes a flexible display disposed across the first surface and the third surface, and the processor is configured to sense activation of a camera, determine whether the activated camera is the first camera, deactivate at least one pixel corresponding to the first region when the activated camera is the first camera as a result of the determination, and change the graphic user interface so as to correspond to the second region.

A method of changing a graphic user interface by an electronic device, according to certain embodiments disclosed herein, including a first camera and a first display panel disposed to overlap, in at least a partial region thereof, a field-of-view region corresponding to the field of view of the first camera, the first display panel including a first region which has a first transmittance, at least partially overlaps the first camera, and includes the field-of-view region, the method including displaying a graphic user interface on the first display panel, sensing activation of the first camera, deactivating at least one pixel of the first display panel, corresponding to a first region, and changing the graphic user interface so as to correspond to a second region on the first display panel, which is at least partially in contact with the first region.

Furthermore, the graphic user interface may include at least one object including a first object, and the method may include changing the graphic user interface, based on information about a position in which the first object is displayed on the first display panel and information about a position of the first region.

Furthermore, the at least one object may include at least one among at least a part of an execution screen of an application executed by the processor, an icon, a widget, and a state display window.

Furthermore, the graphic user interface may include multiple objects including the first object, and the method may include, when a position in which one of the multiple objects is displayed on the first display panel overlaps the first region, changing the graphic user interface by moving a position in which an object, positioned within a designated distance from the first region, among the multiple objects, is displayed on the first display panel.

Furthermore, the method may include changing the graphic user interface, based on the form of the second region.

Furthermore, the method may further include executing a first application, and controlling the first display panel to display a first graphic user interface including an execution screen of the first application, and the graphic user interface may include at least one object displayed by the execution screen of the first application.

Furthermore, the method may include determining whether to change the graphic user interface, based on the first application, and changing the graphic user interface, based on the determination.

Furthermore, the electronic device may further include a second camera disposed in a region of the electronic device which does not overlap the first display panel, and the method may include sensing activation of a camera, determining whether the activated camera is the first camera, deactivating at least one pixel corresponding to the first region when the activated camera is the first camera as a result of the determination, and changing the graphic user interface so as to correspond to the second region.

The electronic device according to certain embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that certain embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Certain embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each element (e.g., a module or a program) of the above-described elements may include a single entity or multiple entities, and some of the multiple entities may be separately disposed in any other element. According to certain embodiments, one or more of the above-described elements may be omitted, or one or more other elements may be added. Alternatively or additionally, a plurality of elements (e.g., modules or programs) may be integrated into a single element. In such a case, according to certain embodiments, the integrated element may still perform one or more functions of each of the plurality of elements in the same or similar manner as they are performed by a corresponding one of the plurality of elements before the integration. According to certain embodiments, operations performed by the module, the program, or another element may be carried out sequentially, in parallel, repeatedly, or heuristically, or one or more of the operations may be executed in a different order or omitted, or one or more other operations may be added.

What is claimed is:

1. An electronic device, comprising:
 a first camera;
 a first display panel including multiple pixels and disposed to overlap the first camera, the first display panel including a first region overlapping a field of view of the first camera and a second region which is outside of the first region; and
 a processor,
 wherein the processor is configured to:
 display a graphic user interface comprising at least a partial of a first object overlapping the first region and a second object on the second region of the first display panel,
 control to activate the first camera in response to an input by a user while displaying the graphic user interface,
 deactivate at least one pixel, among the multiple pixels, corresponding to the first region, and
 change the graphic user interface by moving, the first object overlapping the field of view of the first camera in a direction toward the second object into the second region and rearranging with the second object on the first display panel.

2. The electronic device of claim 1, wherein the first region of the first display panel includes a first transmittance, at least partially overlaps the first camera, and is disposed within a field-of-view region corresponding to a field-of-view of the first camera, and
 wherein the second region includes a second transmittance that is lower than the first transmittance.

3. The electronic device of claim 1, wherein the graphic user interface includes the first object, and
 wherein the processor is configured to:
 determine a position at which the first object is displayed on the first display panel, and
 change the graphic user interface, based on the determined position in which the first object is displayed, and a position of the first region.

4. The electronic device of claim 3, wherein changing the graphic user interface includes moving the position of the first object.

5. The electronic device of claim 3, wherein the graphic user interface is changed when the position at which the first object is displayed overlaps with the position of the first region.

6. The electronic device of claim 3, wherein changing the graphic user interface includes moving a display position of the second object, based on detecting the second object disposed within a predesignated distance of the first region.

7. The electronic device of claim 1, wherein the processor is further configured to change the graphic user interface, based on a configuration of the second region.

8. The electronic device of claim 1, wherein the processor is further configured to:
 execute a first application, and
 control the first display panel to display a first graphic user interface of the first application, including at least one object.

9. The electronic device of claim 8, wherein the processor is further configured to:
 determine whether to change the first graphic user interface, based on a configuration of the first application.

10. The electronic device of claim 9, wherein the processor is further configured to maintain the first graphic user interface in an absence of change, when a configuration of the first application includes a video playback function.

11. The electronic device of claim 8, wherein the processor is further configured to:
 execute a second application simultaneously with the first application,
 control the first display panel to display, a second graphic user interface of the second application simultaneously with the first graphic user interface,
 determine whether any portion of the first graphic user interface or the second graphic user interface overlaps the first region, and
 change the first graphic user interface and/or the second graphic user interface based on detecting a respective overlap with the first region.

12. The electronic device of claim 1, further comprising a second camera disposed in a non-display region of the electronic device,
 wherein the processor is further configured to:
 detect activation of one of the first camera and the second camera, and
 determine whether the first camera is activated based on the detected activation,
 wherein the at least one pixel is deactivated and the graphic user interface is changed based on determining that the first camera is activated.

13. The electronic device of claim 12, further comprising:
 a housing structure, including a hinge,
 a first housing connected to the hinge and including a first surface and a second surface facing a direction opposite to a direction faced by the first surface, and
 a second housing connected to the hinge and including a third surface and a fourth surface facing a direction opposite to a direction faced by the third surface,
 wherein the first housing and the second housing are foldable along a folding axis defined by the hinge,
 wherein the first surface and the third surface face a same direction in an unfolded first state, and wherein the first surface faces the third surface in a folded second state, and a second display panel visually exposed to an exterior environment through at least a part of the fourth surface; and a second camera disposed in the third surface or the fourth surface, and wherein the first display panel includes a flexible display spanning across the first surface and the third surface.

14. A method of changing a graphic user interface by an electronic device comprising a first camera and a first display panel disposed to overlap the first camera, the first display panel comprising a first region which has a first transmittance and at least partially overlaps the first camera, and a second region which is outside of the first region, the method comprising:

displaying the graphic user interface comprising at least a partial of a first object overlapping the first region and a second object on the second region of the first display panel;

controlling to activate the first camera in response to an input by a user while displaying the graphic user interface;

deactivating at least one pixel, among multiple pixels, corresponding to the first region; and changing the graphic user interface by moving, the first object overlapping a field of view of the first camera in a direction toward the second object into the second region and rearranging with the second object on the first display panel.

15. The method of claim 14, wherein the graphic user interface includes the first object, the method further comprising:

determining a position at which the first object is displayed on the first display panel, and changing the graphic user interface, based on the determined position in which the first object is displayed, and a position of the first region.

16. The method of claim 15, wherein changing the graphic user interface includes moving a display position of the second object, based on detecting the second object disposed within a predesignated distance of the first region.

17. The method of claim 14, further comprising changing the graphic user interface, based on a configuration of the second region.

18. The method of claim 14, further comprising:
executing a first application; and
controlling the first display panel to display a first graphic user interface of the first application, including at least one object.

19. The method of claim 18, comprising:
determining whether to change the first graphic user interface, based on a configuration of the first application.

20. The method of claim 14, wherein the electronic device further comprises a second camera disposed in a non-display region of the electronic device,
the method further comprising:
detecting activation of one of the first camera and the second camera; and
determining whether the first camera is activated based on the detected activation, wherein the at least one pixel is deactivated and the graphic user interface is changed based on determining that the first camera is activated.

* * * * *